(12) United States Patent
Ito et al.

(10) Patent No.: US 10,335,685 B2
(45) Date of Patent: Jul. 2, 2019

(54) STORAGE MEDIUM HAVING STORED THEREIN GAME PROGRAM, INFORMATION PROCESSING APPARATUS, INFORMATION PROCESSING SYSTEM, AND GAME PROCESSING METHOD

(71) Applicant: NINTENDO CO., LTD., Kyoto (JP)

(72) Inventors: Jun Ito, Kyoto (JP); Shintaro Jikumaru, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 114 days.

(21) Appl. No.: 15/798,834

(22) Filed: Oct. 31, 2017

(65) Prior Publication Data
US 2018/0353857 A1 Dec. 13, 2018

(30) Foreign Application Priority Data
Jun. 13, 2017 (JP) .................. 2017-116003

(51) Int. Cl.
| | |
|---|---|
| *A63F 13/56* | (2014.01) |
| *A63F 13/577* | (2014.01) |
| *A63F 13/833* | (2014.01) |
| *A63F 13/211* | (2014.01) |
| *A63F 13/5252* | (2014.01) |
| *A63F 13/573* | (2014.01) |
| *A63F 13/5255* | (2014.01) |

(Continued)

(52) U.S. Cl.
CPC ............ *A63F 13/56* (2014.09); *A63F 13/211* (2014.09); *A63F 13/5252* (2014.09); *A63F 13/5255* (2014.09); *A63F 13/5258* (2014.09); *A63F 13/573* (2014.09); *A63F 13/577* (2014.09); *A63F 13/833* (2014.09); *A63F 13/428* (2014.09); *A63F 2300/64* (2013.01)

(58) Field of Classification Search
USPC .......................................... 463/31
See application file for complete search history.

(56) References Cited

U.S. PATENT DOCUMENTS

| | | | | |
|---|---|---|---|---|
| 2011/0098114 A1* | 4/2011 | Ishida | ................ | A63F 13/56 463/36 |
| 2013/0102381 A1* | 4/2013 | Nelson | ................ | A63F 13/12 463/25 |

(Continued)

FOREIGN PATENT DOCUMENTS

JP      11-300045      11/1999

*Primary Examiner* — Pierre E Elisca
(74) *Attorney, Agent, or Firm* — Nixon & Vanderhye PC

(57) ABSTRACT

An exemplary information processing apparatus arranges, in a virtual three-dimensional space, first to fourth objects, a first connection object connecting the first object and the second object, and a second connection object connecting the third object and the fourth object. The information processing apparatus controls actions of the first object and the second object, with restriction being imposed on movements of the first object and the second object based on the first connection object. Further, the information processing apparatus controls actions of the third object and the fourth object, with restriction being imposed on movements of the third object and the fourth object based on the second connection object. A virtual camera is arranged in the virtual three-dimensional space such that at least one of the third object and the fourth object is included in a field-of-view range of the virtual camera.

21 Claims, 38 Drawing Sheets

(51) Int. Cl.
*A63F 13/5258* (2014.01)
*A63F 13/428* (2014.01)

(56) References Cited

U.S. PATENT DOCUMENTS

| | | | | |
|---|---|---|---|---|
| 2014/0364194 A1* | 12/2014 | Kusano | ............... | A63F 13/35 463/22 |
| 2015/0105139 A1* | 4/2015 | Nelson | ............... | A63F 13/12 463/20 |
| 2016/0023115 A1* | 1/2016 | Takeda | ............... | A63F 13/58 463/31 |
| 2016/0110960 A1* | 4/2016 | Paradise | ............... | A63F 13/00 463/42 |
| 2016/0189473 A1* | 6/2016 | Nelson | ............... | A63F 13/12 463/20 |
| 2017/0186275 A1* | 6/2017 | Nelson | ............... | A63F 13/12 |
| 2018/0078861 A1* | 3/2018 | Borggren | ............... | A63F 13/2145 |

* cited by examiner

Fig.12
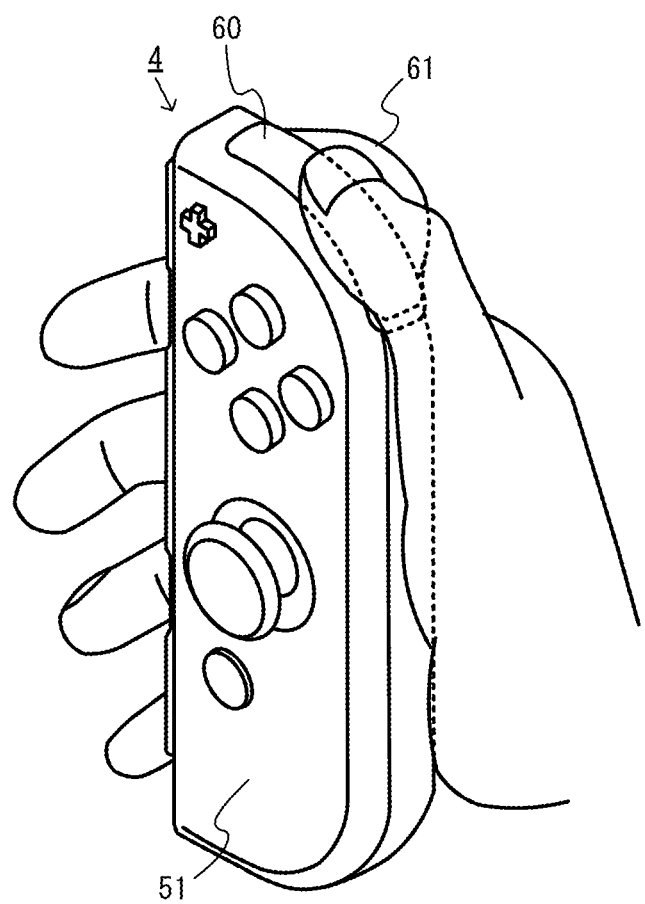
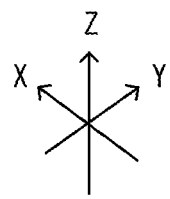

STORAGE MEDIUM HAVING STORED THEREIN GAME PROGRAM, INFORMATION PROCESSING APPARATUS, INFORMATION PROCESSING SYSTEM, AND GAME PROCESSING METHOD

CROSS REFERENCE TO RELATED APPLICATION

The disclosures of Japanese Patent Application No. 2017-116003, filed on Jun. 13, 2017, are incorporated herein by reference.

FIELD

The technique shown here relates to a storage medium having stored therein a game program, an information processing apparatus, an information processing system, and a game processing method for controlling actions of a plurality of objects.

BACKGROUND AND SUMMARY

Conventionally, there is a group vs. group competition game in which a plurality of objects that appear in a game space are separated into some groups and compete in groups.

In the group vs. group competition game, when each object freely moves in the game space, it may be difficult for a user to understand the game situation. For example, it may be difficult for the user to understand which object is a friend object and which object is an enemy object.

Therefore, the present specification discloses a storage medium having stored therein a game program, an information processing apparatus, an information processing system, and a game processing method that are capable of presenting the game situation in an easy-to-understand manner to the user.

(1) An example of a game program described in the present specification is a game program executed by a computer included in an information processing apparatus for performing game processing in which a first group including a first object and a second object operated by a user competes with a second group including a third object and a fourth object.

The game program causes the computer to function as object arrangement means, action control means, virtual camera control means, virtual space image generation means, and display control means. The object arrangement means arranges, in a virtual three-dimensional space, the first object, the second object, the third object, the fourth object, a first connection object connecting the first object and the second object, and a second connection object connecting the third object and the fourth object. The action control means controls actions of the first object and the second object, with restriction being imposed on movements of the first object and the second object based on the first connection object, and controls actions of the third object and the fourth object, with restriction being imposed on movements of the third object and the fourth object based on the second connection object. The virtual camera control means controls a virtual camera arranged in the virtual three-dimensional space such that at least one of the third object and the fourth object is included in a field-of-view range of the virtual camera. The virtual space image generation means generates a virtual space image acquired based on the virtual camera. The display control means causes a display to display the virtual space image.

According to the configuration of the above (1), since the objects included in the same group are connected to each other by the connection object, it is possible to present the game situation in an easy-to-understand manner to the user. In addition, since the third object and the fourth object are restricted in movement by the second connection object, when one of the third object and the fourth object is included in a display range, the other object is also likely to be included in the display range. Thus, it is possible to present a game image that allows the user to easily understand the positions of the third object and the fourth object.

(2) The action control means may control the actions of the first object and the second object, with the restriction being imposed on the movements of the first object and the second object based on a state of the first connection object, and control the actions of the third object and the fourth object, with the restriction being imposed on the movements of the third object and the fourth object based on a state of the second connection object.

According to the configuration of the above (2), each player object is restricted in movement, based on the length of the connection object connected thereto. For example, greater restriction is imposed on the movement of the player object when the length of the connection object is a first length than when the length of the connection object is a second length shorter than the first length. Thus, it is possible to reduce the risk that the objects connected to each other by the connection object are excessively separated from each other, and therefore, both the third object and the fourth object can be easily included in the display range.

(3) The action control means may impose the restriction on the movements of the first object and the second object by using a virtual first tension that is applied to the first object and the second object by the first connection object. In addition, the action control means may impose the restriction on the movements of the third object and the fourth object by using a virtual second tension that is applied to the third object and the fourth object by the second connection object.

According to the configuration of the above (3), since an virtual tension regarding to the connection object is calculated, and the restriction is imposed on the movement of the object by using the tension, it is possible to reduce the risk that the movement of the object becomes unnatural.

(4) The action control means may set the first tension in a case where the length of the first connection object is a first length, to be greater than the tension in a case where the length of the first connection object is a second length shorter than the first length. In addition, the action control means may set the second tension in a case where the length of the second connection object is the first length, to be greater than the tension in a case where the length of the second connection object is the second length.

According to the above (4), since the greater tension is set when the connection object is longer than when the connection object is shorter, it is possible to easily reduce the distance between the two objects connected to each other by the connection object.

(5) The action control means may calculate the first tension by decreasing a component of a tension directed in a direction to the first connected object, the component regarding a second direction orthogonal to a first direction in the virtual three-dimensional space. In addition, the action control means may calculate the second tension by decreasing a component, regarding the second direction, of a tension directed in a direction to the second connected object.

According to the configuration of the above (5), the restriction of the tension applied to the object is smaller in the second direction in the virtual three-dimensional space than in the first direction in the virtual three-dimensional space. Thus, the action of the object regarding the second direction can be expressed more naturally.

(6) The second direction may be a vertical direction in the virtual three-dimensional space.

According to the configuration of the above (6), the action of the object regarding the vertical direction in the virtual three-dimensional space can be expressed more naturally. Therefore, for example, a jumping action of the object can be expressed more naturally.

(7) The action control means may determine the state of the first connection object, based on the first object and the second object, regardless of whether the first connection object comes into contact with another object in the virtual three-dimensional space.

According to the configuration of the above (7), since contact of the connection object with another object is not considered, it is possible to inhibit the movements of the objects connected to each other by the connection object from being excessively restricted by the connection object.

(8) The virtual space image generation means may generate the virtual space image by changing the display mode of the first connection object in accordance with the distance between the first object and the second object, and changing the display mode of the second connection object in accordance with the distance between the third object and the fourth object.

According to the configuration of the above (8), the display mode of the connection object allows the player to recognize the distance between the two objects connected to each other by the connection object.

(9) The action control means may control the action of the first object, with the restriction regarding the movement of the first object being canceled while a cancellation condition regarding the first object is satisfied.

According to the configuration of the above (9), the action of the object can be naturally expressed while the cancellation condition is satisfied.

(10) The cancellation condition may be that the first object is performing a first action.

According to the configuration of the above (10), since the motion of first object is not restricted by the first connection object while the first object is performing the first action, the first action of the first object can be naturally expressed.

(11) The action control means may control the action of the second object, with the restriction regarding the movement of the second object being canceled while the second object is performing a second action that is the same as or different from the first action. In addition, in a case where the first object is performing the first action and the second object is performing the second action, and if the direction of the first action and the direction of the second action satisfy a correction condition, the action control means may correct at least one of the direction of the first action and the direction of the second action.

According to the configuration of the above (11), in the case where the first object is performing the first action and the second object is performing the second action, the restriction by the connection object is canceled. Here, according to the configuration of the above (11), since at least one of the direction of the first action and the direction of the second action is corrected under the correction condition, it is possible to reduce the risk that the action becomes unnatural because of great restriction being suddenly imposed after the first action and/or the second action is finished (in other words, after the restriction becomes to be imposed again).

(12) The action control means may include movement control means configured to cause a moving object regarding the first object to move from the first object toward the third object or the fourth object, in accordance with an operation performed by the user.

According to the configuration of the above (12), the first object can have influence on the objects (i.e., the third object and the fourth object) in the second group from a position distant to some extent. Therefore, the objects in the first group are not likely to be close to the objects in the second group, thereby presenting the grouping by the connection object in an easy-to-understand manner.

(13) The movement control means may change the moving direction of a moving object that is moving, in accordance with an operation performed by the user while the moving object is moving.

According to the configuration of the above (13), even when the first object have influence on the objects in the second group from the distant position, a first user can operate the moving object freely to a certain extent. That is, according to the configuration of the above (13), inconvenience is not likely to occur on the game even when the first object is distant from the objects in the second group, it is possible to provide a game having enhanced interest.

(14) The action control means may stop the movement of the moving object in a case where, while the moving object is moving, the first object is caused to move in the virtual three-dimensional space by an action of the third object or the fourth object.

According to the configuration of the above (14), the moving action of the moving object due to the first object can be canceled by the action of the object in the second group. Thus, the interest of the game can be enhanced.

(15) The game program may further cause the computer to function as acquisition means configured to acquire motion data indicating a motion of an input device. The action control means may control the action of the first object based on the motion data.

According to the configuration of the above (15), the first user can operate the object by an intuitive operation of moving the input device.

(16) In a case where the second object is caused to move in the virtual three-dimensional space by an action of the third object or the fourth object, the action control means may cause the first object to move in conjunction with the movement of the second object so that the length of the first connection object maintains a predetermined state.

According to the configuration of the above (16), when the second object is influenced by the objects in the second group, the first object connected to the second object by the connection object is also influenced by the objects in the second group. In this case, since the first user plays the game while understanding the situation of the second object as well as the situation of the first object operated by himself/herself, strategic characteristics of the game can be enhanced, thereby providing the game having enhanced interest.

(17) The virtual camera control means may control the virtual camera such that the virtual camera is directed in a direction from the first object to one of the third object and the fourth object.

According to the configuration of the above (17), since the virtual camera is controlled so as to face one of objects in the second group, which is an opponent for the first user, it is possible to present the game image in an easy-to-understand manner to the user. In the case where the first user performs an operation of moving the input device as in the configuration of the above (15), the fact that the first user further operates the virtual camera precisely may cause the operation by the first user to be complicated. In this regard, according to a combination of the configuration of the above (17) and the configuration of the above (15), since the first user need not control the virtual camera precisely, it is possible to provide the user with an intuitive and easy game operation.

(18) The virtual camera control means may control the virtual camera such that an object to which the virtual camera is directed is switched between the third object and the fourth object, in accordance with an operation performed by the user.

According to the configuration of the above (18), the user can easily select an object to be displayed from among the objects in the second group (however, other objects can be included in the display range).

It should be noted that the present specification discloses an example of an information processing apparatus and an example of an information processing system, each including the respective means in the above (1) to (18). In addition, the present specification discloses an example of a game processing method executed in an information processing apparatus according to the above (1) to (18).

According to the storage medium having stored therein the game program, the information processing apparatus, the information processing system, and the game processing method, it is possible to present a game situation in an easy-to-understand manner to the user.

These and other objects, features, aspects and advantages of the exemplary embodiment will become more apparent from the following detailed description when taken in conjunction with the accompanying drawings.

BRIEF DESCRIPTION OF THE DRAWINGS

FIG. 12 is a diagram showing a non-limiting example of the state where the single user uses the information processing system 1 by holding the set of the left controller 3 and the right controller 4 in the separate state;

DETAILED DESCRIPTION OF NON-LIMITING EXAMPLE EMBODIMENTS

1. Structure of Information Processing System

Figure 1:
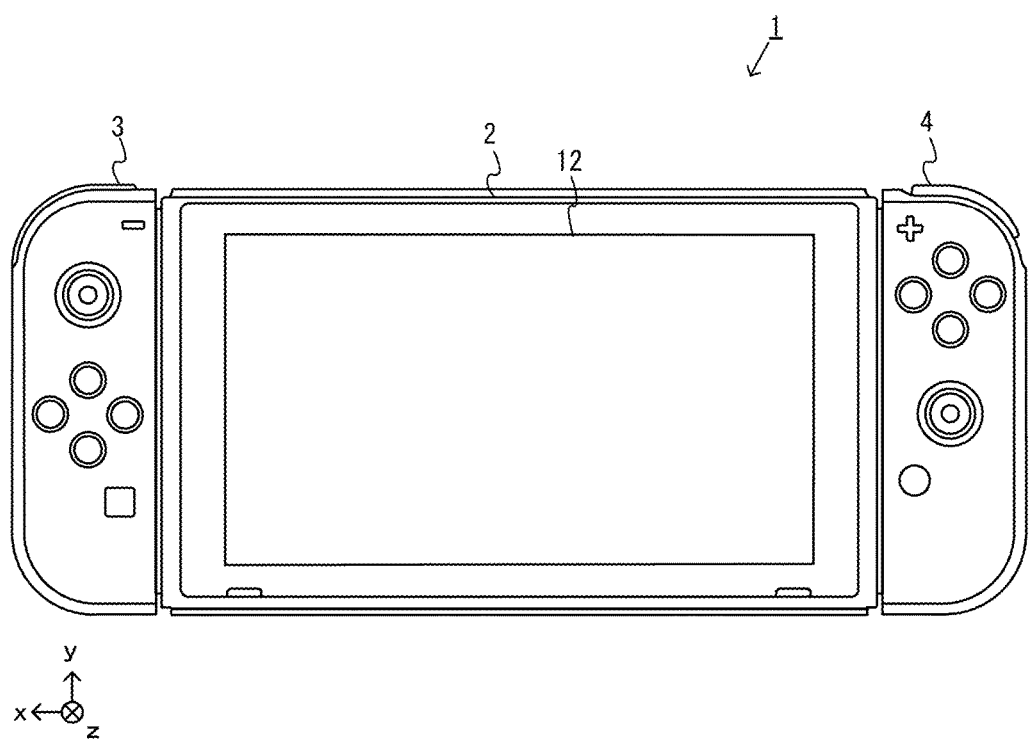
FIG. 1 is a diagram showing a non-limiting example of the state where a left controller 3 and a right controller 4 are attached to a main body apparatus 2 in an example of an information processing system 1 according to an exemplary embodiment.

A description is given below of an information processing system, an information processing apparatus, a game program, and a game processing method according to an exemplary embodiment. In the exemplary embodiment, an information processing system 1 includes a main body apparatus (information processing apparatus; which functions as a game apparatus main body in the exemplary embodiment) 2, a left controller 3, and a right controller 4. Further, in another form, the information processing system may further include a cradle 5 (see FIGS. 6 and 7 and the like) in addition to the above configuration. In the information processing system 1 according to the exemplary embodiment, the left controller 3 and the right controller 4 are attachable to and detachable from the main body apparatus 2. The information processing system 1 can be used as a unified apparatus obtained by attaching each of the left controller 3 and the right controller 4 to the main body apparatus 2. Further, the main body apparatus 2, the left controller 3, and the right controller 4 can also be used as separate bodies (see FIG. 2). Further, the information processing system 1 can be used in the form in which an image is displayed on the main body apparatus 2, and in the form in which an image is displayed on another display device such as a television. In the first form, the information processing system 1 can be used as a mobile apparatus (e.g., a mobile game apparatus). Further, in the second form, the information processing system 1 can be used as a stationary apparatus (e.g., a stationary game apparatus).

FIG. 1 is a diagram showing the state where the left controller 3 and the right controller 4 are attached to the main body apparatus 2 in an example of the information processing system 1 according to the exemplary embodiment. As shown in FIG. 1, the information processing system 1 includes the main body apparatus 2, the left controller 3, and the right controller 4. Each of the left controller 3 and the right controller 4 is attached to and unified with the main body apparatus 2. The main body apparatus 2 is an apparatus for performing various processes (e.g., game processing) in the information processing system 1. The main body apparatus 2 includes a display 12. Each of the left controller 3 and the right controller 4 is an apparatus including operation sections with which a user provides inputs.

Figure 2:
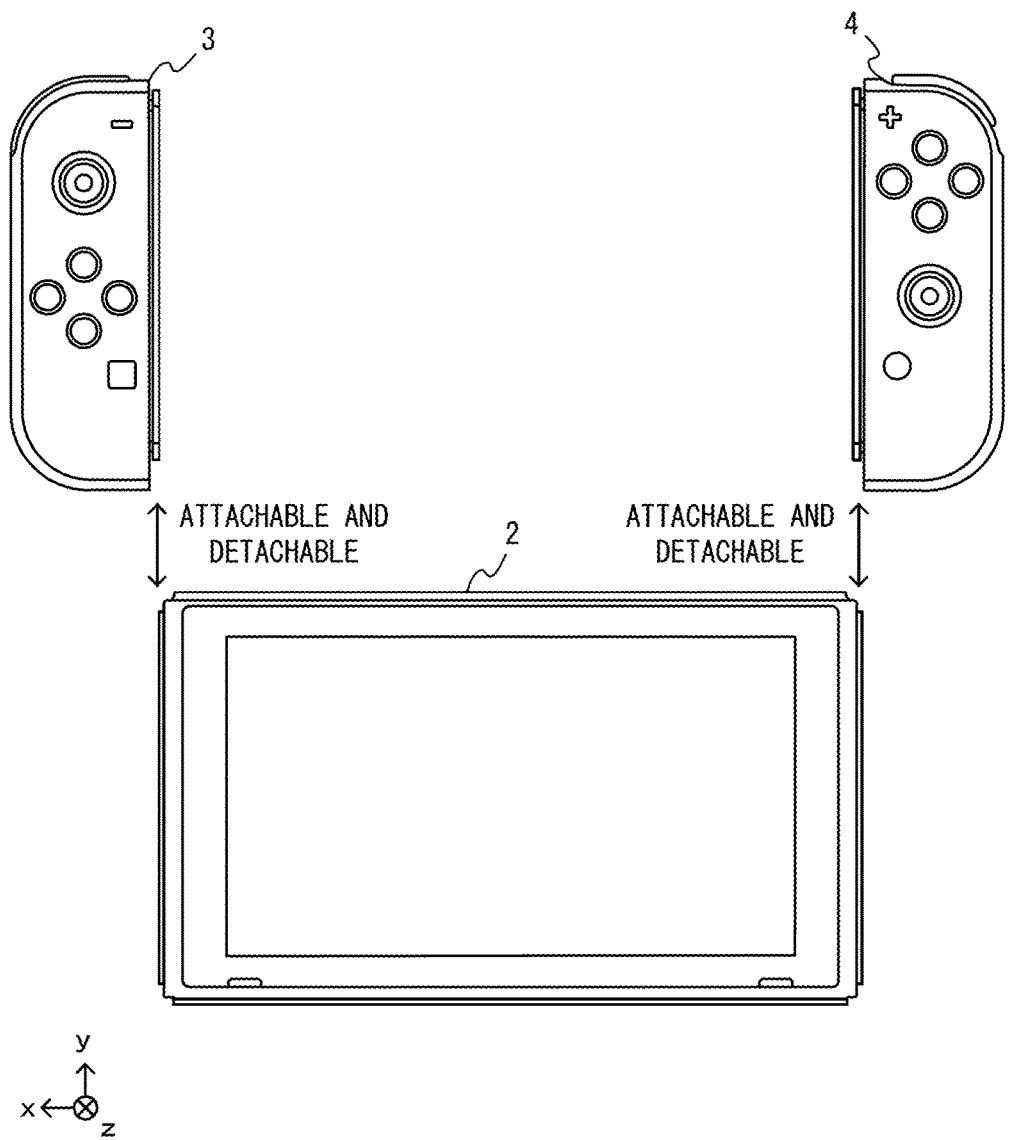
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller". It should be noted that in the exemplary embodiment, an "operation device" operated by a single user may be a single controller (e.g., one of the left controller 3 and the right controller 4) or a plurality of controllers (e.g., both the left controller 3 and the right controller 4, or these controllers and another controller), and the "operation device" can be configured by one or more controllers. A description is given below of examples of the specific configurations of the main body apparatus 2, the left controller 3, and the right controller 4.

Figure 3:
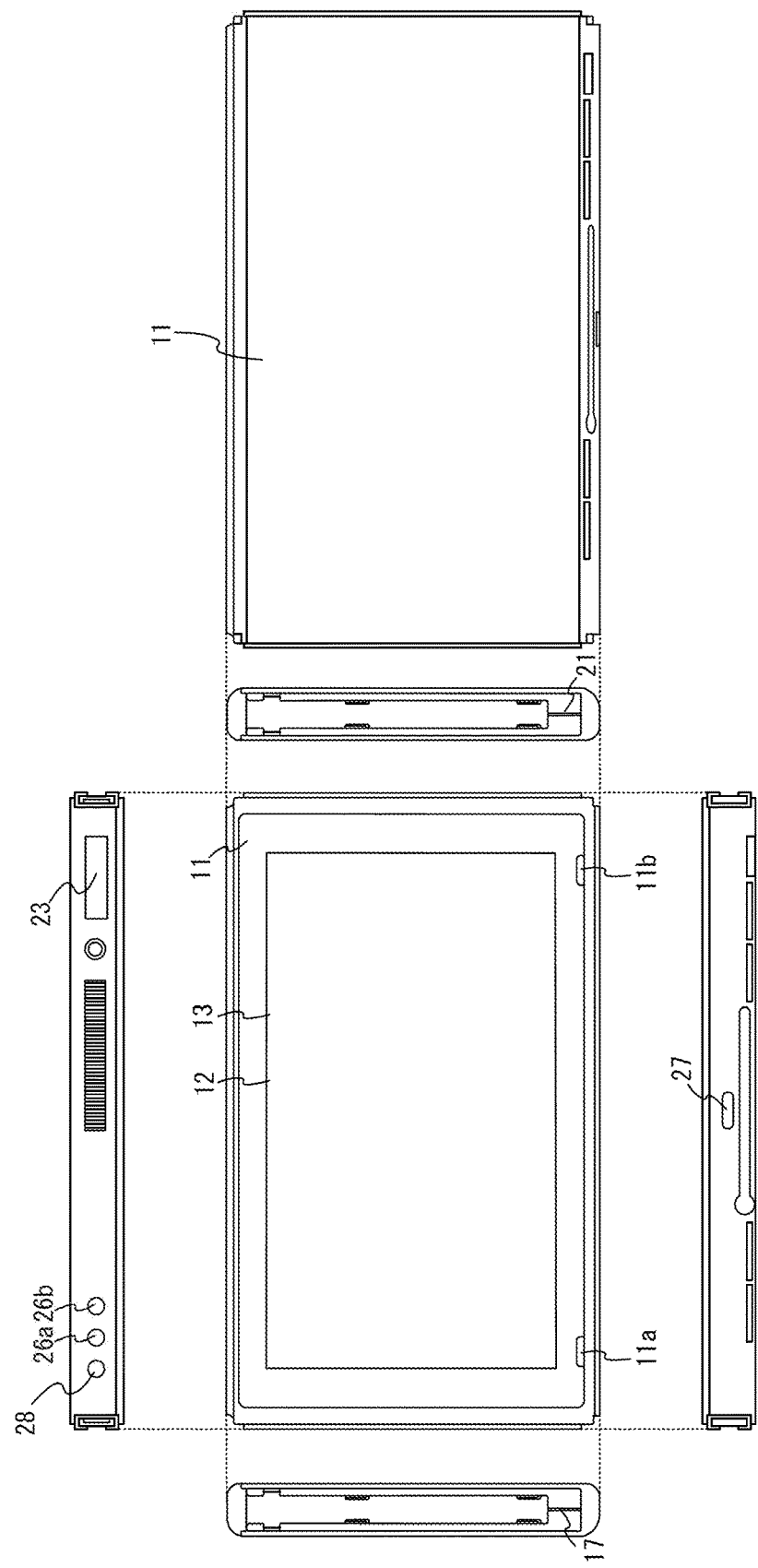
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape. In the exemplary embodiment, the housing 11 has a horizontally long shape. That is, in the exemplary embodiment, the longitudinal direction of the main surface of the housing 11 (i.e., an x-axis direction shown in FIG. 1) is referred to as a "horizontal direction" (also as a "left-right direction"), the short direction of the main surface (i.e., a y-axis direction shown in FIG. 1) is referred to as a "vertical direction" (also as an "up-down direction"), and a direction perpendicular to the main surface (i.e., a z-axis direction shown in FIG. 1) is referred to as a depth direction (also as a "front-back direction"). The main body apparatus 2 can be used in the orientation in which the main body apparatus 2 is horizontally long. Further, the main body apparatus 2 can also be used in the orientation in which the main body apparatus 2 is vertically long. In this case, the housing 11 may be considered as having a vertically long shape.

It should be noted that the housing 11 are optional. As an example, the housing 11 may have a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image (a still image or a moving image) acquired or generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 8) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17 for the main body apparatus 2 to perform wired communication with the left controller 3, and a right terminal 21 for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the information processing system 1 and an information processing apparatus of the same type as the information processing system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28 and sound volume buttons 26a and 26b.

The main body apparatus 2 includes a lower terminal 27. The lower terminal 27 is a terminal for the main body apparatus 2 to communicate with the cradle 5, which will be described later. In the exemplary embodiment, the lower terminal 27 is a USB connector (more specifically, a female connector).

Figure 4:
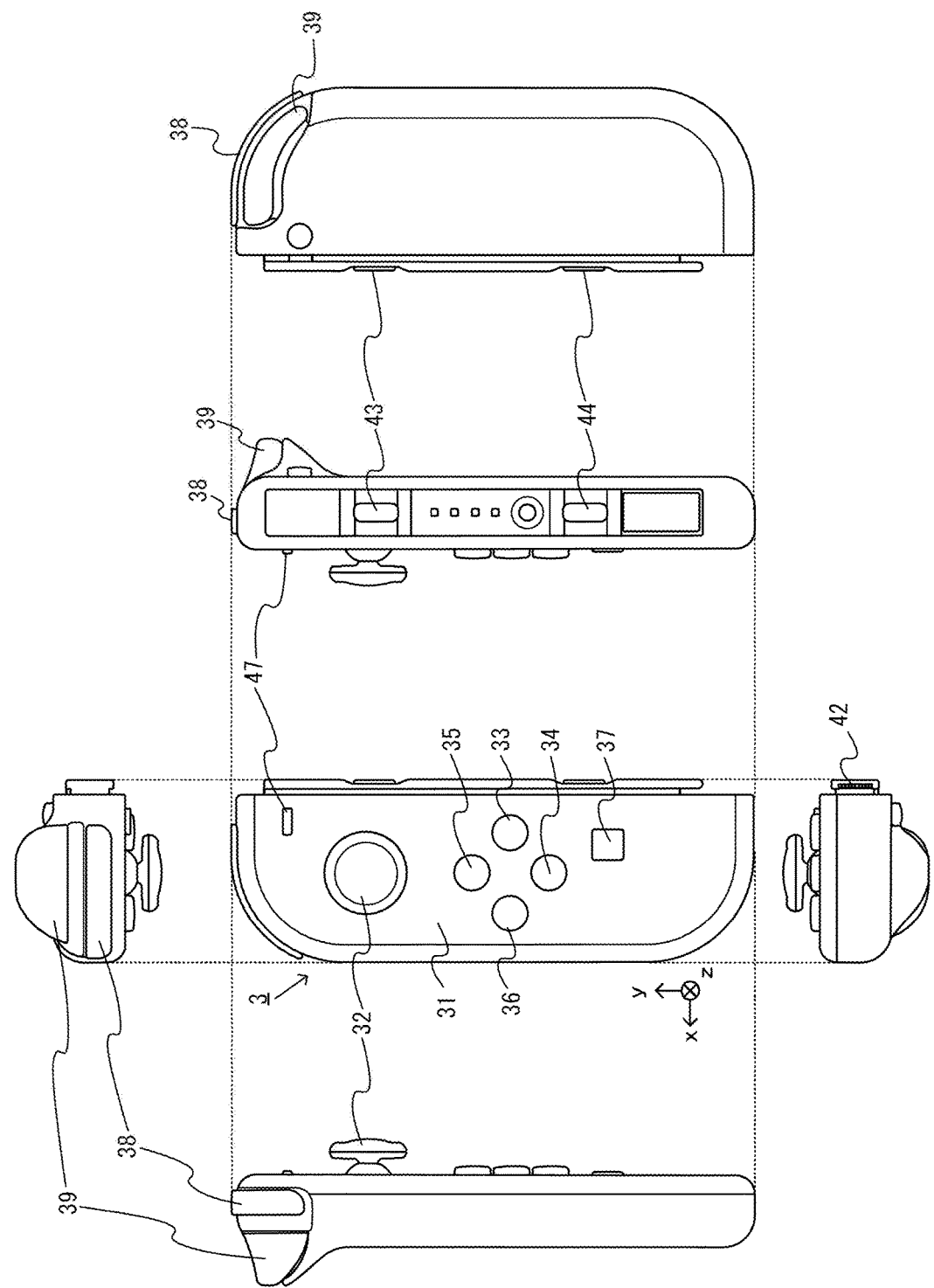
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 is approximately plate-shaped. In the exemplary embodiment, the housing 31 has a vertically long shape, i.e., is shaped to be long in the up-down direction (i.e., the y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
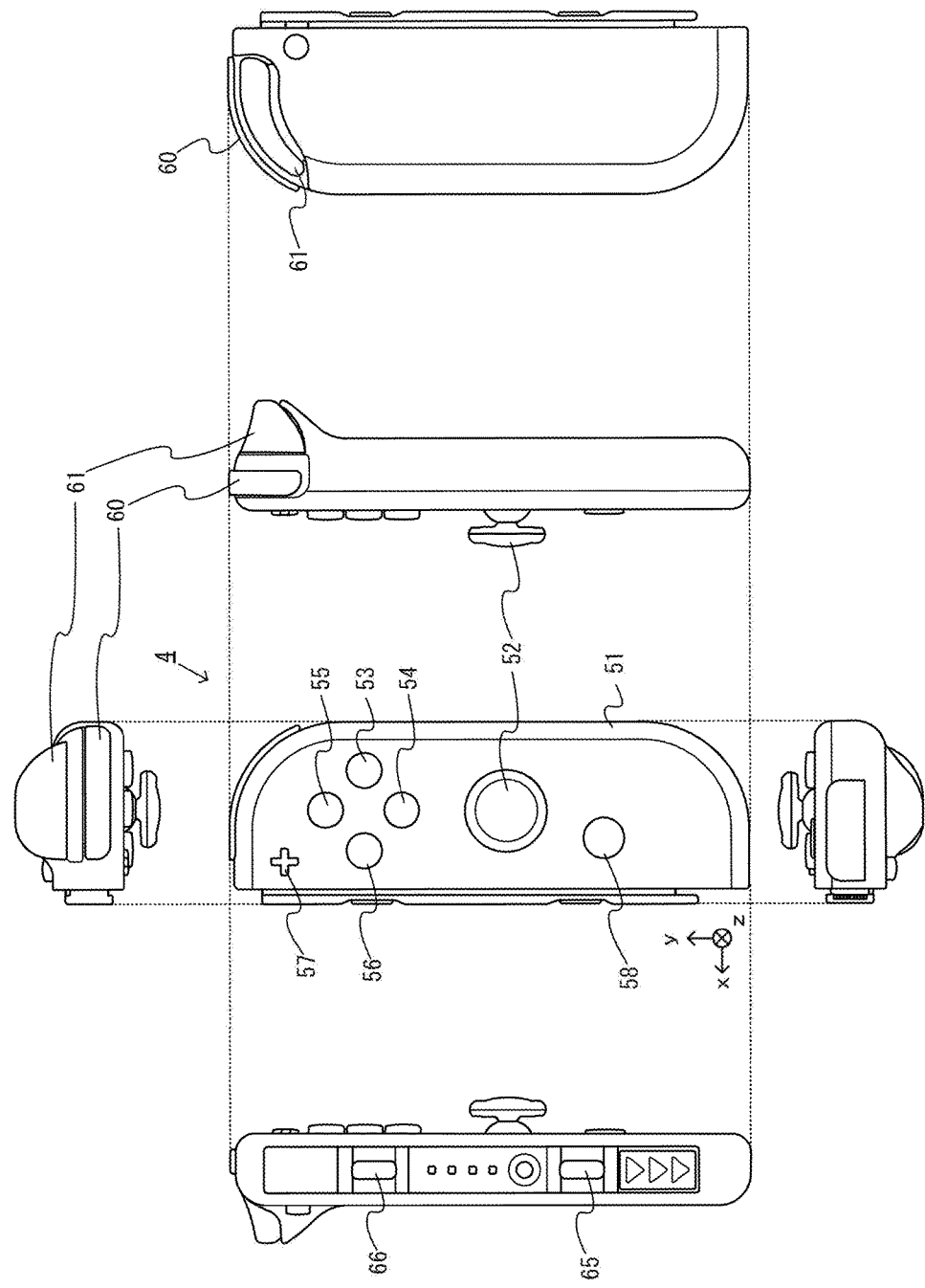
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
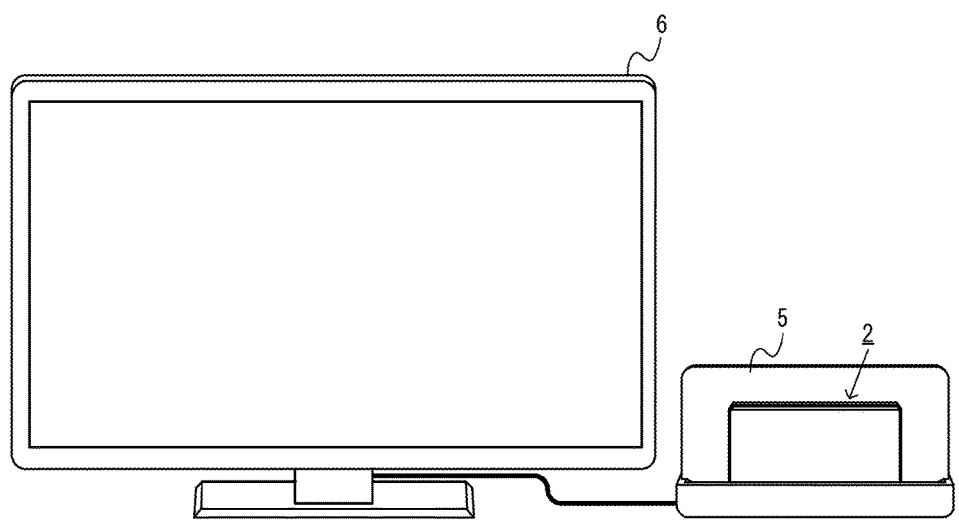
FIG. 6 is a diagram showing the overall configuration of another non-limiting example of the information processing system according to the exemplary embodiment.

FIG. 6 is a diagram showing the overall configuration of another example of the information processing system according to the exemplary embodiment. As shown in FIG. 6, as an example, the unified apparatus obtained by attaching the left controller 3 and the right controller 4 to the main body apparatus 2 can be mounted on the cradle 5. Further, as yet another example, only the main body apparatus 2 can also be mounted on the cradle 5 in the state where the left controller 3 and the right controller 4 are detached from the main body apparatus 2. Further, the cradle 5 can communicate (through wired communication or wireless communication) with a stationary monitor 6 (e.g., a stationary television), which is an example of an external display device separate from the display 12. Although the details will be described later, when the unified apparatus or the main body apparatus 2 alone is mounted on the cradle 5, the information processing system can display on the stationary monitor 6 an image acquired or generated by the main body apparatus 2. Further, in the exemplary embodiment, the cradle 5 has the function of charging the unified apparatus or the main body apparatus 2 alone mounted on the cradle 5. Further, the cradle 5 has the function of a hub device (specifically, a USB hub).

Figure 7:
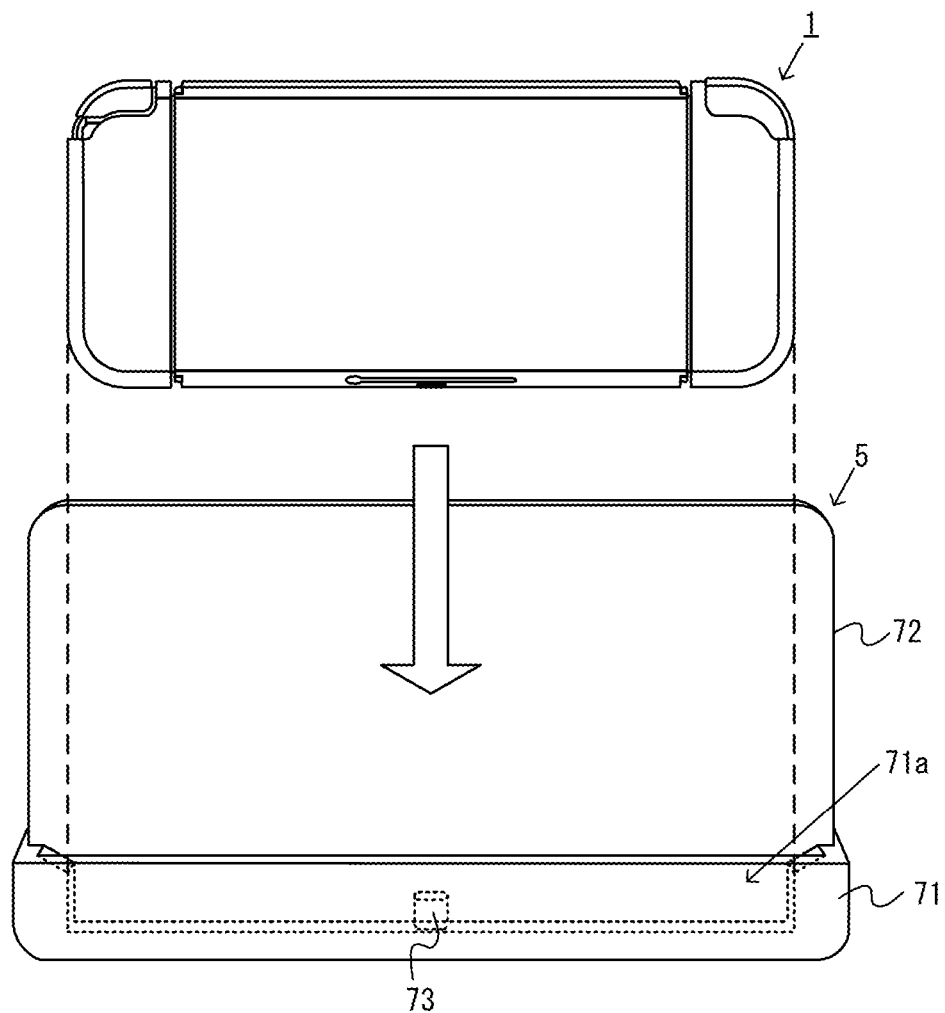
FIG. 7 is a diagram showing a non-limiting example of the external configuration of a cradle 5.

FIG. 7 is a diagram showing an example of the external configuration of the cradle 5. The cradle 5 includes a housing on which the unified apparatus or the main body apparatus 2 alone can be detachably mounted (or attached). In the exemplary embodiment, as shown in FIG. 7, the housing includes a first supporting portion 71, in which a groove 71a is formed, and an approximately planar second supporting portion 72.

As shown in FIG. 7, the groove 71a formed in the first supporting portion 71 has a shape corresponding to the shape of a lower portion of the unified apparatus. Specifically, the groove 71a is so shaped as to allow the lower portion of the unified apparatus to be inserted into the groove 71a, and more specifically, is so shaped as to approximately coincide with the lower portion of the main body apparatus 2. Thus, the lower portion of the unified apparatus is inserted into the groove 71a, whereby it is possible to mount the unified apparatus on the cradle 5. Further, the second supporting portion 72 supports a front surface of the unified apparatus (i.e., the surface on which the display 12 is provided) of which the lower portion is inserted into the groove 71a. With the second supporting portion 72, the cradle 5 can support the unified apparatus more stably. It should be noted that the shape of the housing shown in FIG. 7 is merely illustrative. In another exemplary embodiment, the housing of the cradle 5 may have any shape that allows the main body apparatus 2 to be mounted on the housing.

As shown in FIG. 7, further, the cradle 5 includes a main body terminal 73 for the cradle 5 to communicate with the unified apparatus. As shown in FIG. 7, the main body terminal 73 is provided on a bottom surface of the groove 71a, which is formed in the first supporting portion 71. More specifically, the main body terminal 73 is provided at the position where the lower terminal 27 of the main body apparatus 2 comes into contact with the main body terminal 73 when the unified apparatus is attached to the cradle 5. In the exemplary embodiment, the main body terminal 73 is a USB connector (more specifically, a male connector).

Figure 10:
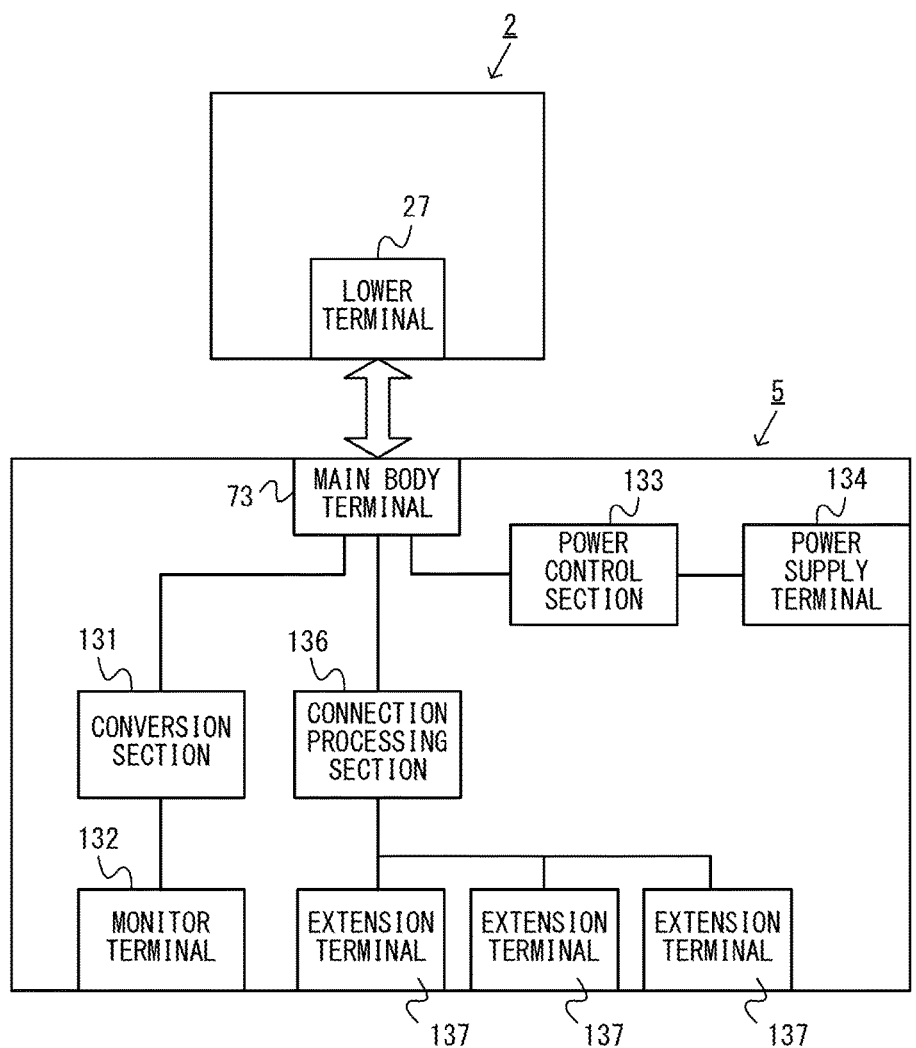
FIG. 10 is a block diagram showing a non-limiting example of the internal configuration of the cradle 5.

Although not shown in FIG. 7, the cradle 5 includes a terminal (includes a plurality of terminals, specifically, a monitor terminal 132, a power supply terminal 134, and extension terminals 137, which are shown in FIG. 10 in the exemplary embodiment) on a back surface of the housing. The details of these terminals will be described later.

Figure 8:
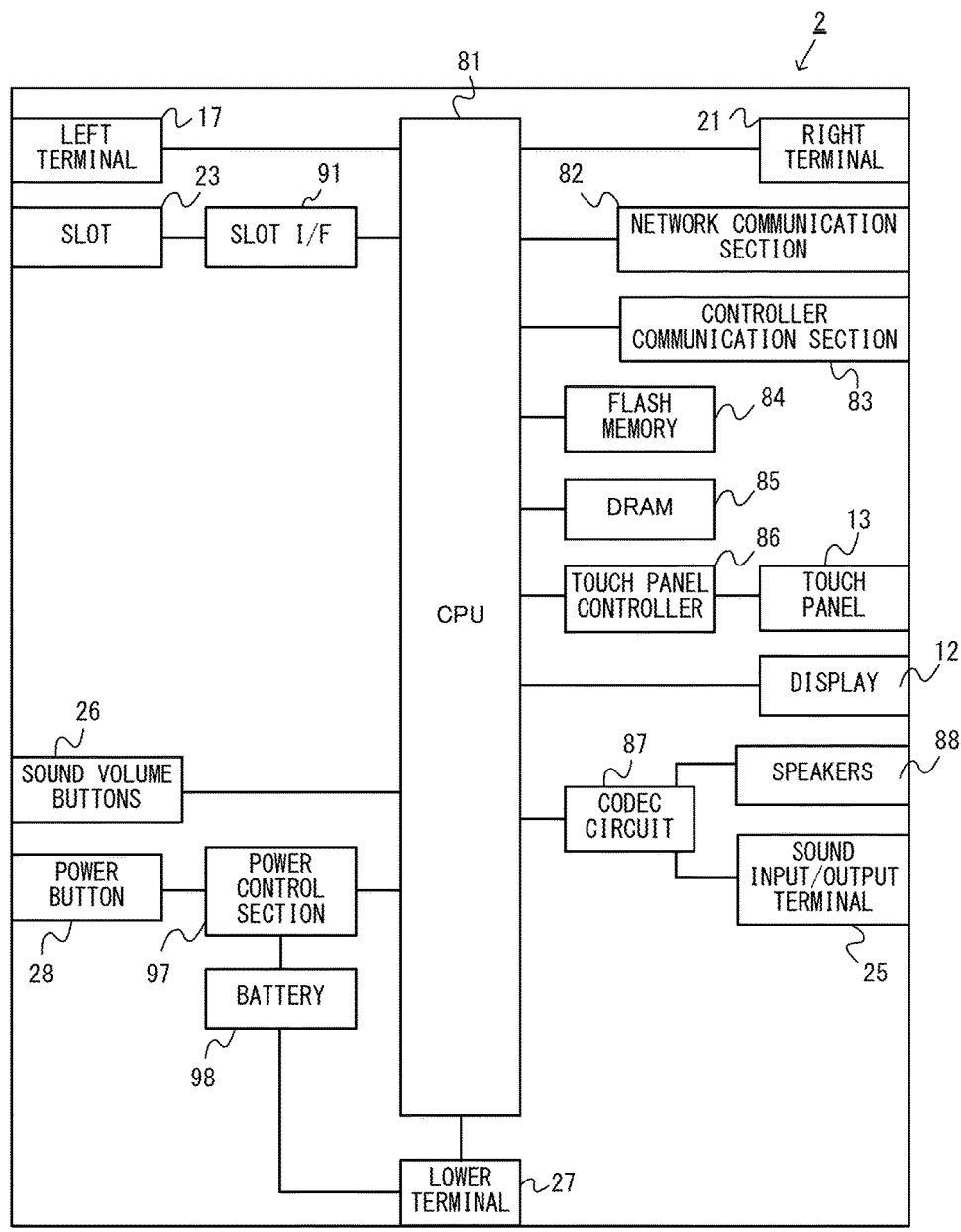
FIG. 8 is a block diagram showing a non-limiting example of the internal configuration of the main body apparatus 2.

FIG. 8 is a block diagram showing an example of the internal configuration of the main body apparatus 2. The main body apparatus 2 includes components 81 to 98 shown in FIG. 8 in addition to the components shown in FIG. 3. Some of the components 81 to 98 may be mounted as electronic components on an electronic circuit board and accommodated in the housing 11.

The main body apparatus 2 includes a CPU (Central Processing Unit) 81. The CPU 81 is an information processing section for executing various types of information processing to be executed by the main body apparatus 2. The CPU 81 executes an information processing program (e.g., a game program) stored in a storage section (specifically, an internal storage medium such as a flash memory 84, an external storage medium attached to each of the slots 23 and 24, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the slot 23, and in accordance with an instruction from the CPU 81, reads and writes data from and to the predetermined type of storage medium (e.g., a dedicated memory card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle 5, the CPU 81 transmits data to the cradle 5 via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle 5, the main body apparatus 2 can output data (e.g., image data or sound data) to the stationary monitor 6 via the cradle 5.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, the user can provide inputs to the main body apparatus 2 using a plurality of left controllers 3 and a plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25. That is, if receiving sound data from the CPU 81, the codec circuit 87 outputs sound signals obtained by performing D/A conversion on the sound data to the speakers 88 or the sound input/output terminal 25. Consequently, sounds are output from the speakers 88 or a sound output section (e.g., earphones) connected to the sound input/output terminal 25. Further, if receiving a sound signal from the sound input/output terminal 25, the codec circuit 87 performs A/D conversion on the sound signal and outputs sound data in a predetermined format to the CPU 81. Further, the sound volume buttons 26 are connected to the CPU 81. Based on an input to the sound volume buttons 26, the CPU 81 controls the volume of sounds output from the speakers 88 or the sound output section.

The main body apparatus 2 includes a power control section 97 and a battery 98. The power control section 97 is connected to the battery 98 and the CPU 81. Further, although not shown in FIG. 8, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle 5) is connected to the lower terminal 27, and power is supplied to the main body apparatus 2 via the lower terminal 27, the battery 98 is charged with the supplied power.

Figure 9:
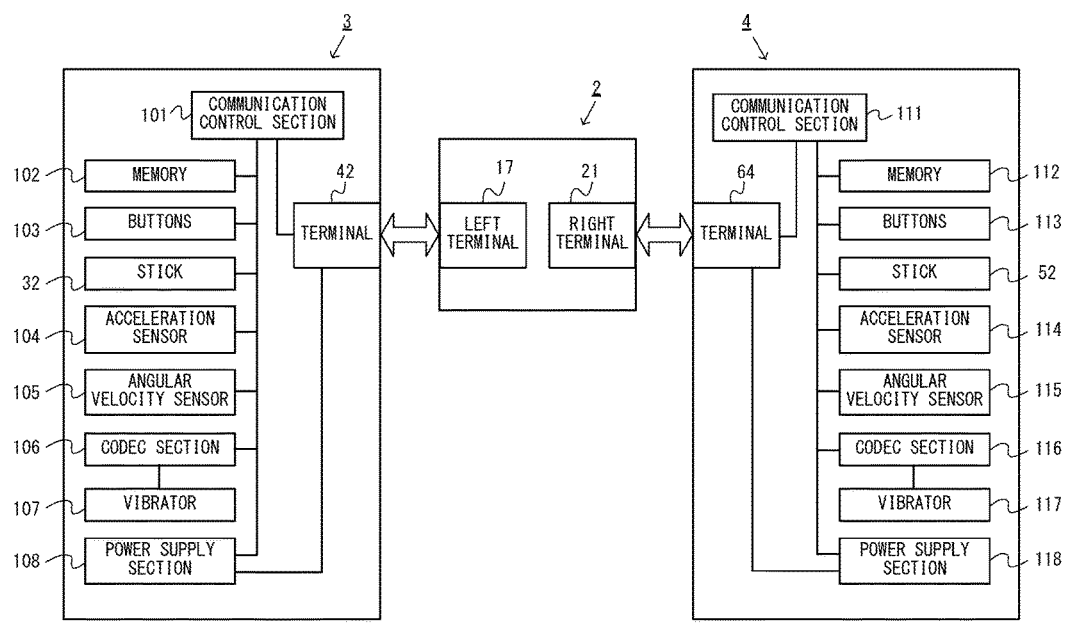
FIG. 9 is a block diagram showing a non-limiting example of the internal configuration of the information processing system 1.

FIG. 9 is a block diagram showing an example of the internal configuration of the information processing system 1. It should be noted that the details of the internal configuration of the main body apparatus 2 in the information processing system 1 are shown in FIG. 8 and therefore are omitted in FIG. 9.

The left controller 3 includes a communication control section 101, which communicates with the main body apparatus 2. As shown in FIG. 9, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, and 44). Further, the left controller 3 includes the analog stick ("stick" in FIG. 9) 32. Each of the buttons 103 and the analog stick 32 outputs information regarding an operation performed on itself to the communication control section 101 repeatedly at appropriate timing.

The left controller 3 includes an acceleration sensor 104. In the exemplary embodiment, the acceleration sensor 104 detects the magnitudes of linear accelerations along predetermined three axial (e.g., XYZ axes shown in FIG. 11) directions. It should be noted that the acceleration sensor 104 may detect an acceleration along one axial direction or accelerations along two axial directions. Further, the left controller 3 includes an angular velocity sensor 105. In the exemplary embodiment, the angular velocity sensor 105 detects angular velocities about predetermined three axes (e.g., the XYZ axes shown in FIG. 11). It should be noted that the angular velocity sensor 105 may detect an angular velocity about one axis or angular velocities about two axes. Each of the acceleration sensor 104 and the angular velocity sensor 105 is connected to the communication control section 101. Then, the detection results by the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 by amplifying the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 9, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections (specifically, buttons 113, the analog stick 52, an acceleration sensor 114, and an angular velocity sensor 115) of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

FIG. 10 is a block diagram showing an example of the internal configuration of the cradle 5. It should be noted that the details of the internal configuration of the main body apparatus 2 are shown in FIG. 8 and therefore are omitted in FIG. 10.

As shown in FIG. 10, the cradle 5 includes a conversion section 131 and a monitor terminal 132. The conversion section 131 is connected to the main body terminal 73 and the monitor terminal 132. The conversion section 131 converts the formats of signals of an image (or video) and a sound received from the main body apparatus 2 into formats in which the image and the sound are output to the stationary monitor 6. Here, in the exemplary embodiment, the main body apparatus 2 outputs signals of an image and a sound as display port signals (i.e., signals compliant with the DisplayPort standard) to the cradle 5. Further, in the exemplary embodiment, as the communication between the cradle 5 and the stationary monitor 6, communication based on the HDMI (registered trademark) standard is used. That is, the monitor terminal 132 is an HDMI terminal, and the cradle 5 and the stationary monitor 6 are connected together by an HDMI cable. Then, the conversion section 131 converts the display port signals (specifically, the signals representing the video and the sound) received from the main body apparatus 2 via the main body terminal 73 into HDMI signals. The converted HDMI signals are output to the stationary monitor 6 via the monitor terminal 132.

The cradle 5 includes a power control section 133 and a power supply terminal 134. The power supply terminal 134 is a terminal for connecting a charging device (e.g., an AC adapter or the like) (not shown). In the exemplary embodiment, an AC adapter is connected to the power supply terminal 134, and mains electricity is supplied to the cradle 5. When the main body apparatus 2 is attached to the cradle 5, the power control section 133 supplies power from the power supply terminal 134 to the main body apparatus 2 via the main body terminal 73. Consequently, the battery 98 of the main body apparatus 2 is charged.

Further, the cradle 5 includes a connection processing section 136 and extension terminals 137. Each of the extension terminals 137 is a terminal for connecting to another apparatus. In the exemplary embodiment, the cradle 5 includes a plurality of (more specifically, three) USB terminals as the extension terminals 137. The connection processing section 136 is connected to the main body terminal 73 and the extension terminals 137. The connection processing section 136 has a function as a USB hub and for example, manages the communication between an apparatus connected to each of the extension terminals 137 and the main body apparatus 2 connected to the main body terminal 73 (i.e., transmits a signal from a certain apparatus to another apparatus by appropriately distributing the signal). As described above, in the exemplary embodiment, the information processing system 1 can communicate with another apparatus via the cradle 5. It should be noted that the connection processing section 136 may be able to change the communication speed, or supply power to the apparatus connected to the extension terminal 137.

As describe above, in the information processing system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle 5 and thereby can output an image (and a sound) to the stationary monitor 6. A description is given below using the information processing system in use forms in which an image (and a sound) is output to the stationary monitor 6 by attaching the main body apparatus 2 alone to the cradle 5 in the state where the left controller 3 and the right controller 4 are detached from the main body apparatus 2.

As described above, in the exemplary embodiment, the information processing system 1 can also be used in the state where the left controller 3 and the right controller 4 are detached from the main body apparatus 2 (referred to as a "separate state"). As a form in a case where an operation is performed on the same application (e.g., a game application) using the information processing system 1 in the separate state, a form in which a single user uses both the left controller 3 and the right controller 4 is possible. It should be noted that when a plurality of users perform operations using the same application in this use form, a form is possible in which a plurality of sets of the left controller 3 and the right controller 4 are prepared, and each user uses one of the plurality of sets.

Figure 11:
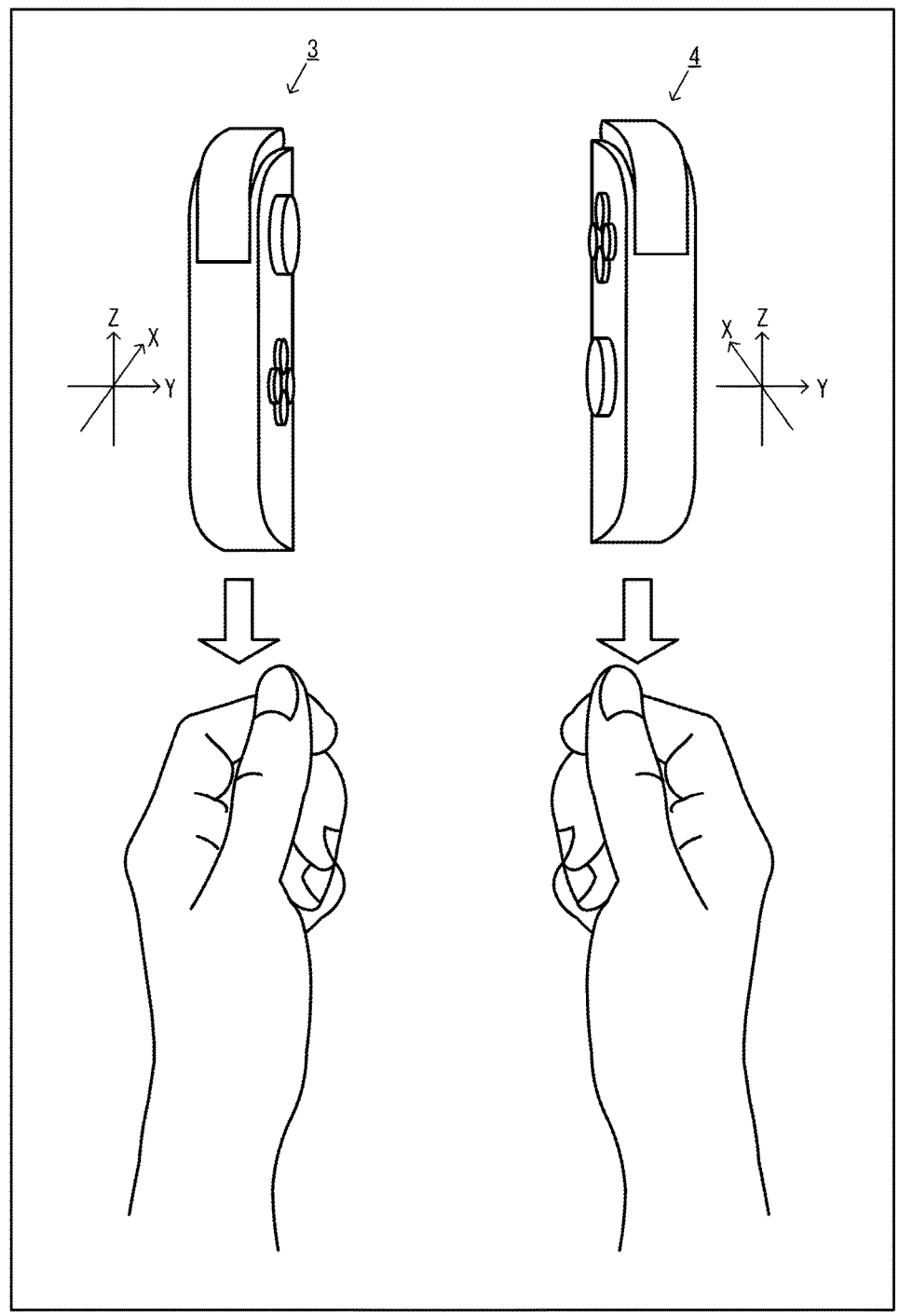
FIG. 11 is a diagram showing a non-limiting example of the state where a single user uses the information processing system 1 by holding a set of the left controller 3 and the right controller 4 in a separate state.
Figure 13:
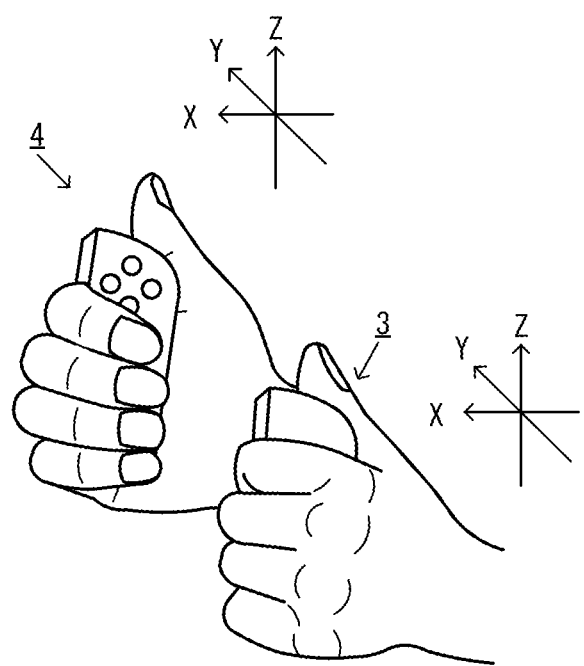
FIG. 13 is a diagram showing a non-limiting example of the state where a single user uses the information processing system 1 by holding the set of the left controller 3 and the right controller 4 in the separate state.

FIGS. 11 to 13 are diagrams showing an example of the state where a single user uses the information processing system 1 by holding a set of the left controller 3 and the right controller 4 in the separate state. As shown in FIGS. 11 to 13, in the separate state, the user can view an image displayed on the stationary monitor 6 while operating the left controller 3 and the right controller 4 by holding the left controller 3 with their left hand and the right controller 4 with their right hand.

For example, in the exemplary embodiment, the user holds the left controller 3 with their left hand such that the down direction of the longitudinal direction of the left controller 3 (the down direction (the negative y-axis direction) shown in FIG. 1), which is vertically long and approximately plate-shaped, is the vertical direction, also the side surface (the side surface on which a slider 40 is provided) that is in contact with the main body apparatus 2 when the left controller 3 is attached to the main body apparatus 2 is directed forward, and also the main surface of the left controller 3 (the surface on which the analog stick 32 is provided) is directed to the right. Further, the user holds the right controller 4 with their right hand such that the down direction of the longitudinal direction of the right controller 4 (the up-down direction (the negative y-axis direction) shown in FIG. 1), which is vertically long and approximately plate-shaped, is the vertical direction, also the side surface (the side surface on which the slider 40 is provided) that is in contact with the main body apparatus 2 when the right controller 4 is attached to the main body apparatus 2 is directed forward, and also the main surface of the right controller 4 (the surface on which the analog stick 52 is provided) is directed to the left. In the state where the left controller 3 is held with the left hand, and the right controller 4 is held with the right hand (hereinafter, the orientations of the left controller 3 and the right controller 4 held in these directions will occasionally be referred to as "basic orientations"), each controller is moved in up, down, left, right, front, and back directions, rotated, or swung, whereby game play is performed in accordance with the motion or the orientation of the controller.

It should be noted that to facilitate the understanding of the directions of accelerations and angular velocities generated in the left controller 3, a front direction in the above holding state (the direction from a round side surface to the side surface in contact with the main body apparatus 2, and the negative x-axis direction shown in FIG. 1) is defined as a positive X-axis direction. A right direction in the above holding state (the direction from a back surface to the main surface, and the negative z-axis direction shown in FIG. 1) is defined as a positive Y-axis direction. An up direction in the above holding state (the direction toward the up direction of the longitudinal direction, and the positive y-axis direction shown in FIG. 1) is defined as a positive Z-axis direction. Then, the acceleration sensor 104 of the left controller 3 can detect accelerations in the XYZ-axis directions, and the angular velocity sensor 105 can detect angular velocities about the XYZ-axis directions. Further, to facilitate the understanding of the directions of accelerations and angular velocities generated in the right controller 4, a front direction in the above holding state (the direction from a round side surface to the side surface in contact with the main body apparatus 2, and the positive x-axis direction shown in FIG. 1) is defined as a positive X-axis direction. A right direction in the above holding state (the direction from the main surface to a back surface, and the positive z-axis direction shown in FIG. 1) is defined as a positive Y-axis direction. An up direction in the above holding state (the direction toward the up direction of the longitudinal direction, and the positive y-axis direction shown in FIG. 1) is defined as a positive Z-axis direction. Then, the acceleration sensor 114 of the right controller 4 can detect accelerations in the XYZ-axis directions, and the angular velocity sensor 115 can detect angular velocities about the XYZ-axis directions.

2. Outline of Game Operation

Next, an outline of a game operation according to the exemplary embodiment is described with reference to FIGS. 14 to 20. In the exemplary embodiment, four objects, namely, first to fourth player objects, to be operated by players (in other words, users of the information processing system) appear in a three-dimensional game space. In the exemplary embodiment, each of four users operates one of the player objects. Specifically, a first user operates the first player object, a second user operates the second player object, a third user operates the third player object, and a fourth user operates the fourth player object. Although the details will be described later, a game of the exemplary embodiment is a competition game, and the respectively player objects are separated into two groups to compete. Here, the first player object and the second player object make a first group (a friend group for the first player object), the third player object and the fourth player object make a second group (an enemy group for the first player object), and the first group and the second group compete against each other. A description is given below of the game operation in a case where the first user operates the first player object by using the left controller 3 and the right controller 4.

Figure 14:
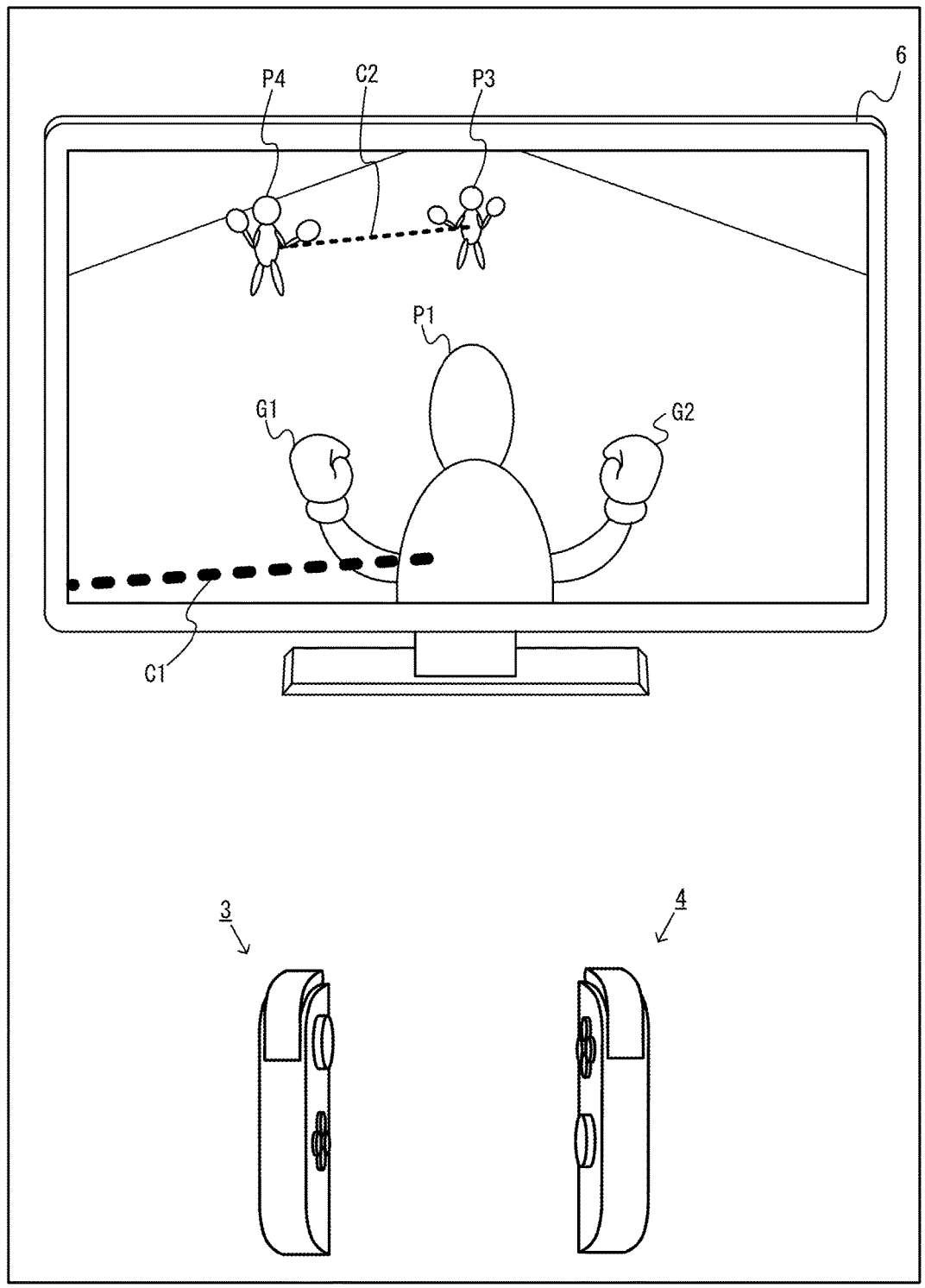
FIG. 14 is a diagram showing a non-limiting example of a game image displayed in a game played by moving the left controller 3 and the right controller 4.

FIGS. 14 to 19 are diagrams showing examples of a game image displayed in a game played by moving the left controller 3 and the right controller 4. As shown in FIG. 14, in this exemplary game, an image of a game (e.g., a boxing game) in which a first player object P1 and a second player object (not shown) compete against a third player object P3 and a fourth player object P4 is displayed on the stationary monitor 6.

The user operating the left controller 3 and the right controller 4 can operate the first player object P1 by swinging the main body of the left controller 3 and/or the main body of the right controller 4, or changing the orientations of the main body of the left controller 3 and/or the main body of the right controller 4. For example, the user swings the left controller 3 and thereby can control the action of a left-fist object G1, which represents a left glove (a left first) of the first player object P1. The user swings the right controller 4 and thereby can control the action of a right-fist object G2, which represents a right glove (a right first) of the first player object P1. Specifically, when the user performs the operation of swinging so as to throw a left punch using the left hand holding the left controller 3, the left-fist object G1, which represents the left glove of the first player object P1, moves toward the place where the third player object P3 or the fourth player object P4 as an enemy object is placed. Further, when the user performs the operation of swinging so as to throw a right punch using the right hand holding the right controller 4, the right-fist object G2, which represents the right glove of the first player object P1, moves toward the place where the enemy object is placed (see FIGS. 15 and 16).

Figure 15:
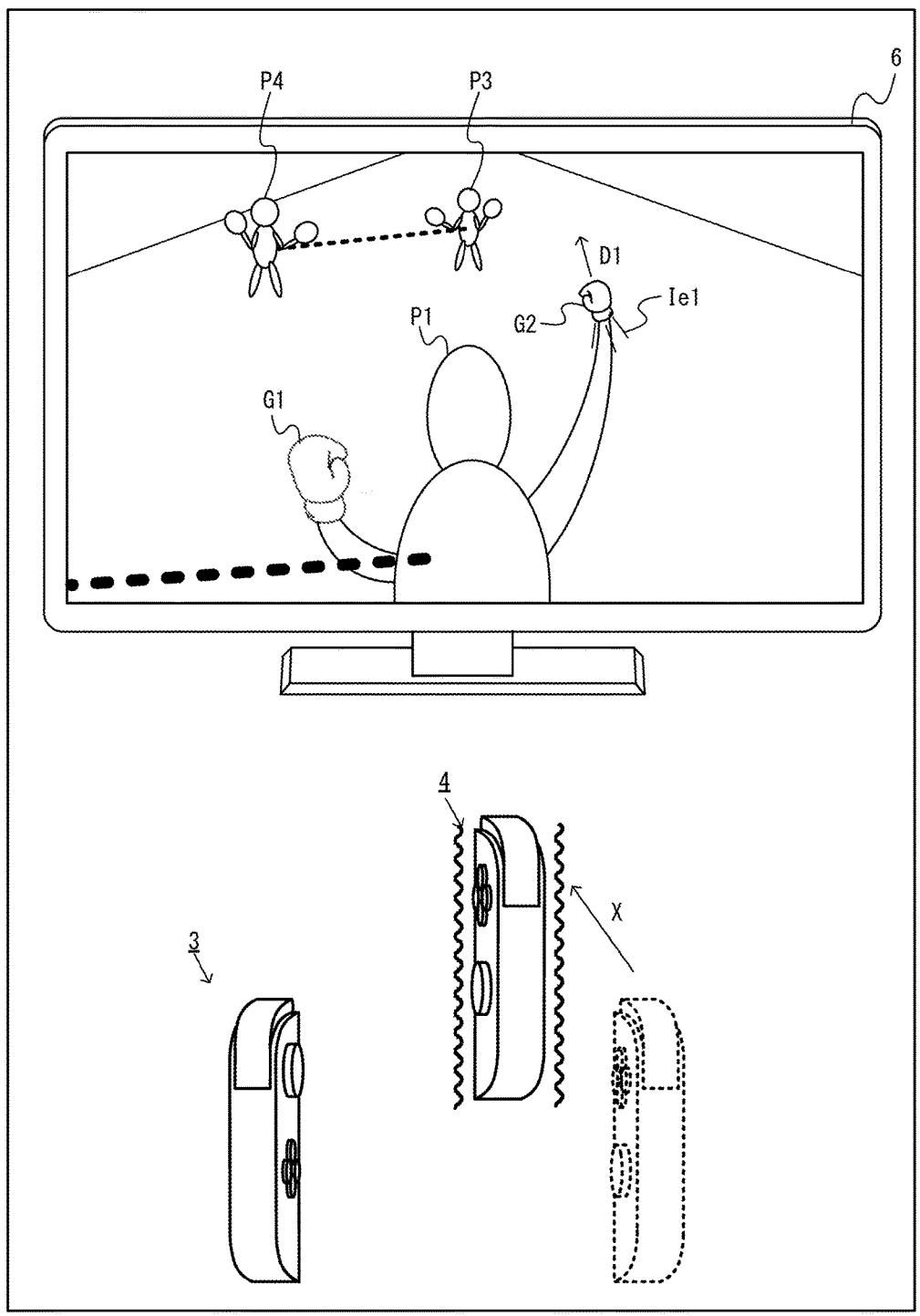
FIG. 15 is a diagram showing a non-limiting example of the game image displayed in the game played by moving the left controller 3 and the right controller 4.
Figure 16:
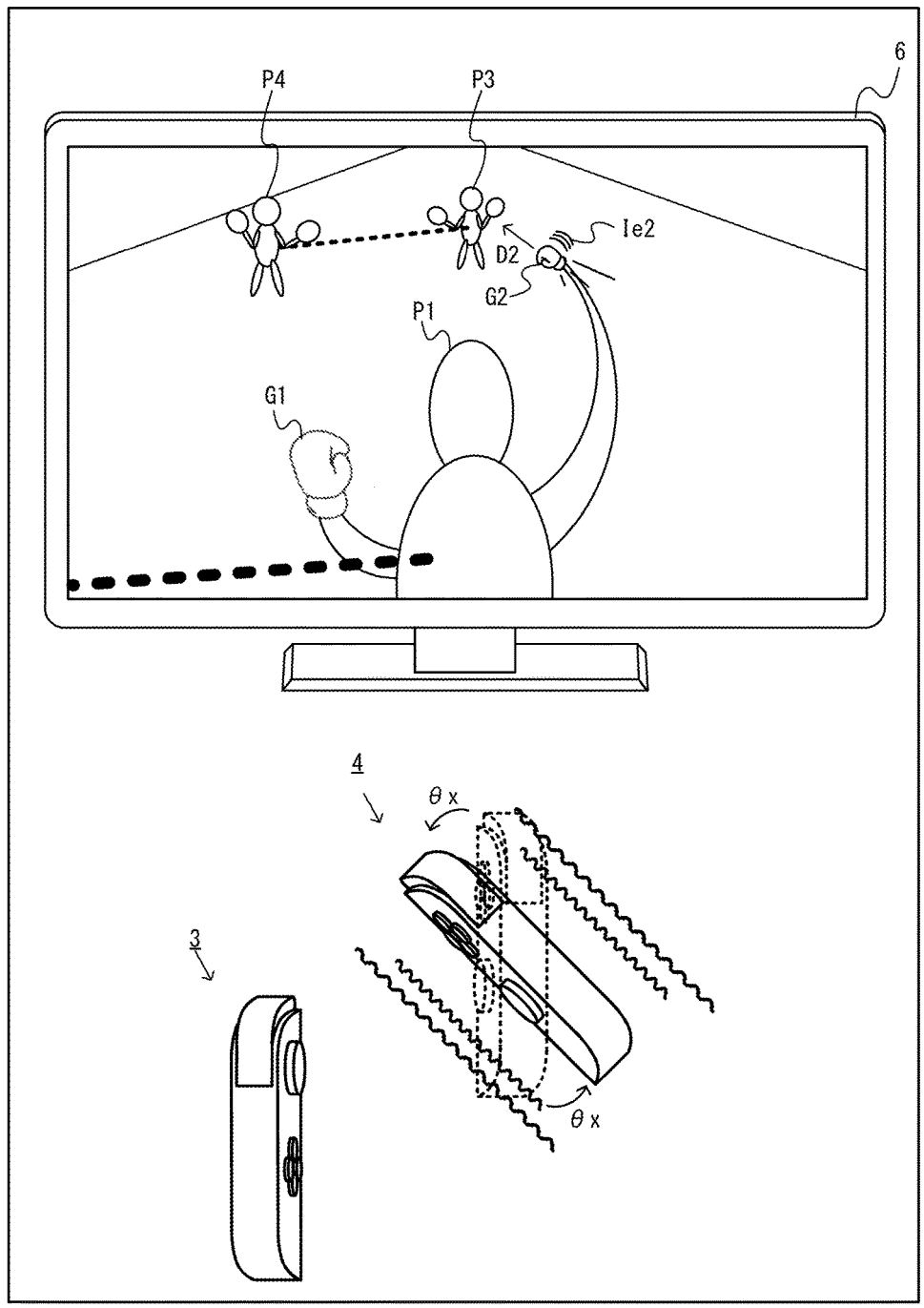
FIG. 16 is a diagram showing a non-limiting example of the game image displayed in the game played by moving the left controller 3 and the right controller 4.

For example, when the right controller 4 is swung so as to be pushed forward (in the positive X-axis direction of the right controller 4) in the state where neither of the left controller 3 and the right controller 4 moves (the state shown in FIG. 14), then as shown in FIG. 15, the right-fist object G2 of the first player object P1 moves toward the enemy object in accordance with the motion of the right controller 4 in the state where an effect image Ie1 is provided. Consequently, a game image is displayed such that the first player object P1 throws a right punch at the enemy object.

Here, the moving direction of the left-fist object G1 starting moving is set by the orientation of the left controller 3 when the left controller 3 is swung so as to be pushed forward. Further, the moving direction of the right-fist object G2 starting moving is set by the orientation of the right controller 4 when the right controller 4 is moved so as to be pushed forward. For example, when the right controller 4 moves in the positive X-axis direction as shown in FIG. 15, a moving direction D1 of the right-fist object G2 is set in accordance with the orientation in a roll direction of the right controller 4 in this movement. As an example, in the exemplary embodiment, in the period in which the right controller 4 moves, the tilt in the Y-axis direction of the right controller 4 with respect to the direction in which a gravitational acceleration acts in real space is calculated, and the moving direction D1 of the right-fist object G2 is calculated based on the tilt in the Y-axis direction. Specifically, when the tilt in the Y-axis direction indicates that the right controller 4 is in the orientation in which the right controller 4 roll-rotates in the right direction with respect to the above reference orientation, the right-fist object G2 moves in the right direction in a virtual space. Further, when the tilt in the Y-axis direction indicates that the right controller 4 is in the orientation in which the right controller 4 roll-rotates in the left direction with respect to the reference orientation, the right-fist object G2 moves in the left direction in the virtual space. Then, the angle at which the moving direction shifts in the right direction or the left direction is calculated in accordance with the tilt angle in the Y-axis direction.

In this exemplary game, even when the distance between the first player object P1 and the enemy object is relatively long in the virtual space, it is possible to throw a punch. The arms of the first player object P1 extend, whereby the left-fist object G1 and the right-fist object G2 can move by a relatively long distance. Then, the left-fist object G1 or the right-fist object G2 collides with another object (e.g., the enemy object) or moves by a predetermined distance, then finishes the movement, and returns to a movement start position where the left-fist object G1 or the right-fist object G2 starts moving (e.g., a hand portion of the first player object P1 shown in FIG. 14). The left-fist object G1 and the right-fist object G2 return to the movement start positions and thereby can make a next movement toward the enemy object. In other words, it is possible to throw a next punch. Thus, the time from when the left-fist object G1 or the right-fist object G2 starts moving from the movement start position to when the left-fist object G1 or the right-fist object G2 returns to the movement start position again is longer than in a general boxing game.

In this exemplary game, when the left-fist object G1 and/or the right-fist object G2 move in the virtual space, the controllers for operating the objects vibrate. For example, when the left-fist object G1 moves in accordance with the fact that the left controller 3 is swung so as to be pushed forward, the left controller 3 vibrates in accordance with the fact that the left-fist object G1 moves in the virtual space. Further, when the right-fist object G2 moves in accordance with the fact that the right controller 4 is swung so as to be pushed forward, the right controller 4 vibrates in accordance with the fact that the right-fist object G2 moves in the virtual space (the state in FIG. 15). Specifically, when the left controller 3 and/or the right controller 4 are swung so as to be pushed forward, the main body apparatus 2 generates outward vibration data in accordance with the types, the moving velocities, the moving directions, and the like of the left-fist object G1 and/or the right-fist object G2 moving in the virtual space, and transmits the outward vibration data to the left controller 3 and/or the right controller 4. Further, when the left-fist object G1 and/or the right-fist object G2 collide with another object, the main body apparatus 2 generates vibration data indicating vibrations corresponding to the collision and transmits the vibration data to the left controller 3 and/or the right controller 4. Further, when the left-fist object G1 and/or the right-fist object G2 move on homeward paths for returning to the movement start positions, the main body apparatus 2 generates homeward vibration data in accordance with the types, the moving velocities, the moving directions, and the like of the left-first object G1 and/or the right-fist object G2 moving on the homeward paths and transmits the homeward vibration data to the left controller 3 and/or the right controller 4. Consequently, the left controller 3 and/or the right controller 4 receiving various vibration data vibrate based on the vibration data.

In this exemplary game, even while the left-fist object G1 or the right-fist object G2 is moving using the movement time of the left-fist object G1 or the right-fist object G2 (typically, the period in which the left-fist object G1 or the right-fist object G2 is moving in the direction of the enemy object), it is possible to change a trajectory moving in accordance with the orientation or the motion of the left controller 3 or the right controller 4. For example, when the left controller 3 or the right controller 4 rotates in the roll direction or rotates in a yaw direction from the orientation of the left controller 3 or the right controller 4 when the left-fist object G1 or the right-fist object G2 starts moving, the trajectory of the left-fist object G1 or the right-fist object G2 is changed in accordance with the rotation. For example, in the example shown in FIG. 16, after the right controller 4 is swung so as to be pushed forward in the positive X-axis direction, the moving direction of the right-fist object G2 changes to D2 in accordance with the fact that the right controller 4 rotationally moves in the left roll direction (θx in FIG. 16) during the movement of the right-fist object G2. Further, when the moving direction of the right-fist object G2 changes, an effect image Ie2 is provided for the right-fist object G2.

As an example, in the exemplary embodiment, in the state where the rotational velocity (the angular velocity) about the X-axis of the left controller 3 or the right controller 4 after the left-fist object G1 or the right-fist object G2 starts moving is the rotation in the roll direction, the trajectory of the left-fist object G1 or the right-fist object G2 moving based on this rotational velocity about the X-axis is changed. Specifically, when the rotational velocity of the left controller 3 roll-rotating in the right direction about the X-axis while the left-fist object G1 is moving is obtained, the trajectory of the left-fist object G1 is changed in the right direction in the virtual space. When the rotational velocity of the left controller 3 roll-rotating in the left direction about the X-axis is obtained, the trajectory of the left-fist object G1 is changed in the left direction in the virtual space. Further, when the rotational velocity of the right controller 4 roll-rotating in the right direction about the X-axis while the right-fist object G2 is moving is obtained, the trajectory of the right-fist object G2 is changed in the right direction in the virtual space. When the rotational velocity of the right controller 4 roll-rotating in the left direction about the X-axis is obtained, the trajectory of the right-fist object G2 is changed in the left direction in the virtual space.

As another example, in the exemplary embodiment, in the state where the rotational velocity (the angular velocity) of the left controller 3 or the right controller 4 with respect to the direction of gravity in real space after the left-fist object G1 or the right-fist object G2 starts moving is the rotation in the yaw direction, the trajectory of the left-fist object G1 or the right-fist object G2 moving based on this rotational velocity about the direction of gravity is changed. Specifically, when the rotational velocity of the left controller 3 yaw-rotating in the right direction about the direction of gravity while the left-fist object G1 is moving is obtained, the trajectory of the left-fist object G1 is changed in the right direction in the virtual space. When the rotational velocity of the left controller 3 yaw-rotating in the left direction about the direction of gravity is obtained, the trajectory of the left-fist object G1 is changed in the left direction in the virtual space. Further, when the rotational velocity of the right controller 4 yaw-rotating in the right direction about the direction of gravity while the right-fist object G2 is moving is obtained, the trajectory of the right-fist object G2 is changed in the right direction in the virtual space. When the rotational velocity of the right controller 4 yaw-rotating in the left direction about the direction of gravity is obtained, the trajectory of the right-fist object G2 is changed in the left direction in the virtual space.

As described above, when the trajectories of the left-fist object G1 and/or the right-fist object G2 change, the vibrations of the left controller 3 and/or the right controller 4 also change. For example, when the outward trajectories of the left-fist object G1 and/or the right-first object G2 change, the main body apparatus 2 calculates change parameters for the amplitudes and/or the frequencies of the vibrations in accordance with changes in the motions or the orientations of the left controller 3 and/or the right controller 4 (e.g., the angular velocities in the roll direction or the yaw direction), temporarily changes the outward vibration data using the change parameters, and then changes back the outward vibration data again. Consequently, receiving the outward vibration data that temporarily changes, the left controller 3 and/or the right controller 4 change the amplitudes and/or the frequencies of the vibrations based on the outward vibration data.

Further, in this exemplary game, using the magnitude of an acceleration generated in the left controller 3 or the right controller 4, it is determined whether or not the left controller 3 or the right controller 4 is swung. Then, when it is determined that the left controller 3 is swung in the positive X-axis direction in the state where the left-fist object G1 is placed at the movement start position (hereinafter referred to as a "first movement-start-allowed state"), the left-fist object G1 starts moving from the movement start position toward the enemy object. Further, when it is determined that the right controller 4 is swung in the positive X-axis direction in the state where the right-fist object G2 is placed at the movement start position (hereinafter referred to as a "second movement-start-allowed state"), the right-fist object G2 starts moving from the movement start position toward the enemy object. In the exemplary embodiment, however, even when the left controller 3 is not in the first movement-start-allowed state, but when the left controller 3 enters the first movement-start-allowed state within a predetermined time from when it is determined that the left controller 3 is swung in the positive X-axis direction, it is possible to start the movement of the left-fist object G1 from the movement start position toward the enemy object in accordance with the operation of swinging the left controller 3. Further, even when the right controller 4 is not in the second movement-start-allowed state, but when the right controller 4 enters the second movement-start-allowed state within a predetermined time from when it is determined that the right controller 4 is swung in the positive X-axis direction, it is possible to start the movement of the right-fist object G2 from the movement start position toward the enemy object in accordance with the operation of swinging the right controller 4. As described above, in the exemplary embodiment, even when the left controller 3 and/or the right controller 4 are not in the first movement-start-allowed state and/or the second movement-start-allowed state, the left controller 3 and/or the right controller 4 are swung, whereby it is possible to give an instruction to start the movements of the left-fist object G1 and/or the right-fist object G2. Thus, it is possible to facilitate an operation even in a game where the state where an operation instruction can be given intermittently occurs. That is, as described above, in the exemplary game, the time from when the left-fist object G1 or the right-first object G2 starts moving from the movement start position to when the left-fist object G1 or the right-fist object G2 returns to the movement start position again is longer than that in a general boxing game. Thus, it is possible that the operation of swinging the left controller 3 or the right controller 4 precedes in the state where the user cannot wait until the first movement-start-allowed state or the second movement-start-allowed state. However, even when such a preceding operation is performed, it is possible to aid the preceding operation without invalidating the preceding operation and make use of the preceding operation for a game operation.

Figure 17:
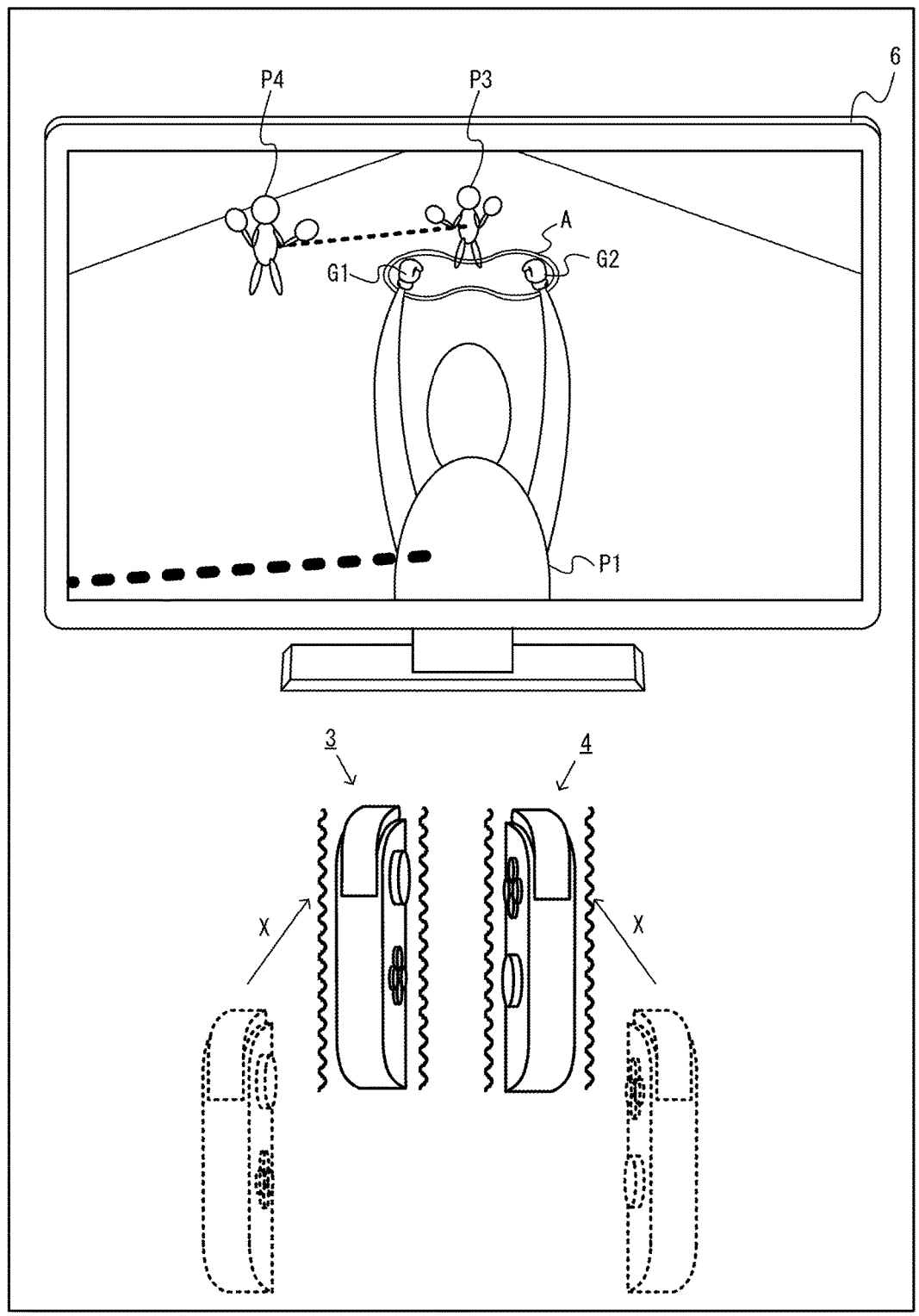
FIG. 17 is a diagram showing a non-limiting example of the game image displayed in the game played by moving the left controller 3 and the right controller 4.
Figure 18:
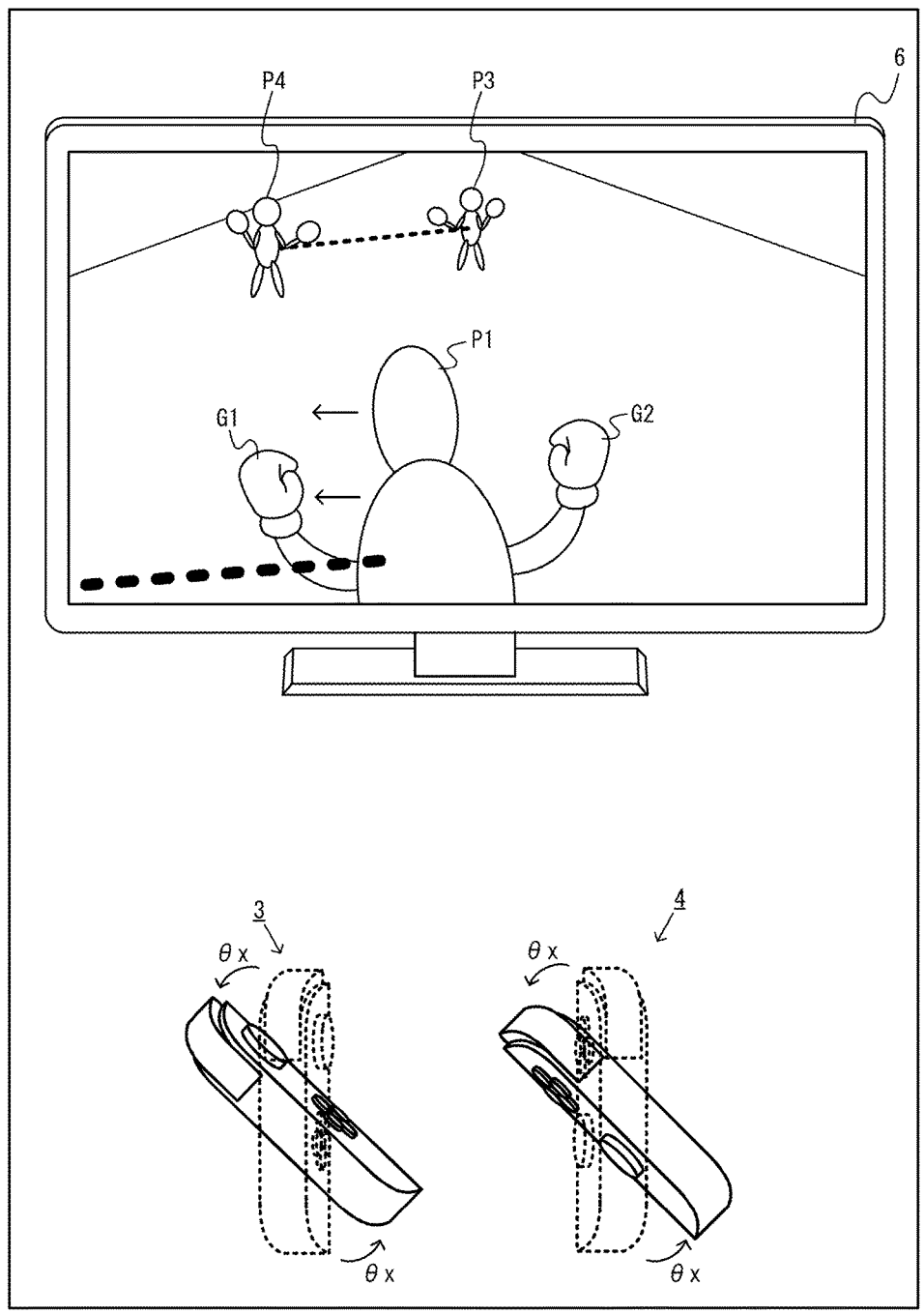
FIG. 18 is a diagram showing a non-limiting example of the game image displayed in the game played by moving the left controller 3 and the right controller 4.

In this exemplary game, as shown in FIG. 17, the left-fist object G1 and the right-first object G2 are caused to simultaneously start moving from the movement start positions, whereby a predetermined action is performed. For example, when, within a predetermined period from when one of the left-fist object G1 and the right-fist object G2 starts moving, the other starts moving, a "both-hand punch action" is started in which the left-fist object G1 and the right-fist object G2 are a set. Here, in the "both-hand punch action", the state where a collision area A is formed between the left-fist object G1 and the right-fist object G2 moving in the virtual space is represented as a game image, and the left-fist object G1 and the right-fist object G2 move toward the enemy object in the state where the collision area A is formed. Then, when the left-fist object G1 or the right-fist object G2 that is moving or the collision area A collides with the enemy object, a predetermined action is performed in which damage greater than that in the case where the left-fist object G1 or the right-fist object G2 solely collides with the enemy object is imparted to the enemy object. In the exemplary embodiment, in the "both-hand punch action", when the left-fist object G1, the right-fist object G2, or the collision area A collides with the enemy object, the action of throwing the enemy object is performed. The "both-hand punch action" may be an action of putting the enemy object out of action. It should be noted that even during the execution of the "both-hand punch action", the trajectories of the movements of the left-fist object G1 and/or the right-fist object G2 can be changed in accordance with the orientations or the motions of the left controller 3 and/or the right controller 4. Thus, the trajectories of the movements of the left-fist object G1 and/or the right-fist object G2 are changed, whereby it is possible to also change the range of the collision area A. Thus, it is possible to make a more strategic attack on the enemy object.

As described above, in the exemplary embodiment, the operation display mode in the case where the actions of both the left-fist object G1 and the right-fist object G2 are performed (FIG. 17) is different from the operation display mode in the case where the punching action of one of the left-fist object G1 and the right-fist object G2 is performed (FIG. 15). That is, in the former case, an effect image Ie2 is provided for the first object performing the action. In the latter case, an effect image (i.e., the collision area A) different from the effect image Ie2 is provided for the first object. Thus, which action is being performed can be presented in an easy-to-understand manner to the user.

Even when the left-fist object G1 and the right-fist object G2 move in the state where such an action is performed, the left controller 3 and/or the right controller 4 vibrate in accordance with the movements of the objects. Specifically, when the left-fist object G1 and the right-fist object G2 move by the both-hand punch action, the main body apparatus 2 generates action outward vibration data in accordance with the types, the moving velocities, the moving directions, and the like of the left-fist object G1 and the right-fist object G2 moving in the virtual space and transmits the action outward vibration data to the left controller 3 and the right controller 4. Further, when the collision area A, the left-fist object G1, or the right-fist object G2 collides with another object, the main body apparatus 2 generates vibration data indicating a vibration corresponding to the collision and transmits the vibration data to the left controller 3 and the right controller 4. Further, when the left-fist object G1 and the right-fist object G2 move on the homeward paths for returning to the movement start positions, the main body apparatus 2 generates homeward vibration data in accordance with the types, the moving velocities, the moving directions, and the like of the left-fist object G1 and the right-fist object G2 moving on the homeward paths and transmits the homeward vibration data to the left controller 3 and the right controller 4. Consequently, even when the both-hand punch action is performed, the left controller 3 and the right controller 4 receiving various vibration data vibrate based on the vibration data.

Further, when the trajectories of the left-fist object G1 and the right-fist object G2 change during the execution of the both-hand punch action, the vibrations of the left controller 3 and the right controller 4 also change. For example, when the outward trajectories of the left-first object G1 and the right-fist object G2 change during the execution of the both-hand punch action, the main body apparatus 2 calculates change parameters for the amplitudes and/or the frequencies of the vibrations in accordance with the changes in the motions or the orientations of the left controller 3 and/or the right controller 4, temporarily changes the action outward vibration data using the change parameters, and then changes back the action outward vibration data again. Consequently, receiving the action outward vibration data that temporarily changes, the left controller 3 and the right controller 4 change the amplitudes and/or the frequencies of the vibrations based on the action outward vibration data.

In this exemplary game, it is possible to move the first player object P1 in the virtual space in accordance with the motions and/or the orientations of both the left controller 3 and the right controller 4. For example, when both the left controller 3 and the right controller 4 rotate in a pitch direction or rotate in the roll direction in real space, the first player object P1 is caused to move in accordance with the tilts of the rotations (e.g., $\theta x$ shown in FIG. 18) (see FIG. 18). Specifically, the tilts in the X-axis direction and the Y-axis direction of the left controller 3 and the tilts in the X-axis direction and the Y-axis direction of the right controller 4 with respect to the direction of gravity in real space are calculated. Then, based on these tilts, when it is determined that both the left controller 3 and the right controller 4 are in the orientations in which the left controller 3 and the right controller 4 are tilted forward, the first player object P1 is caused to move forward in the virtual space by the amount of movement corresponding to the angles at which both the left controller 3 and the right controller 4 are tilted forward (e.g., the average value of the tilt angle of the left controller 3 and the tilt angle of the right controller 4). In the exemplary embodiment, the first player object P1 moves in a direction with respect to the front direction of the first player object P1. That is, in the above case, the first player object P1 moves in the front direction of the first player object P1. In another exemplary embodiment, the first player object P1 may move in a direction with respect to a direction in accordance with a line-of-sight direction of a virtual camera (i.e., a depth direction of the screen).

Further, based on these tilts, when it is determined that both the left controller 3 and the right controller 4 are in the orientations in which the left controller 3 and the right controller 4 are tilted backward, the first player object P1 is caused to move backward (i.e., backward with respect to the front direction of the first player object P1) in the virtual space by the amount of movement corresponding to the angles at which both the left controller 3 and the right controller 4 are tilted backward (e.g., the average value of these angles). Further, based on these tilts, when it is determined that both the left controller 3 and the right controller 4 are in the orientations in which the left controller 3 and the right controller 4 are tilted to the left, the first player object P1 is caused to move to the left (i.e., to the left with respective to the front direction of the first player object P1) in the virtual space by the amount of movement corresponding to the angles at which both the left controller 3 and the right controller 4 are tilted to the left (e.g., the average value of these angles) (see FIG. 18). Further, based on these tilts, when it is determined that both the left controller 3 and the right controller 4 are in the orientation in which the left controller 3 and the right controller 4 are tilted to the right, the first player object P1 is caused to move to the right (i.e., to the right with respective to the front direction of the first player object P1) in the virtual space by the amount of movement corresponding to the angles at which both the left controller 3 and the right controller 4 are tilted to the right (e.g., the average value of these angles).

In the exemplary game, it is possible to cause the first player object P1 to perform a guard action in accordance with the motions and/or the orientations of both the left controller 3 and the right controller 4. While performing the guard action, the first player object P1 is not damaged even if a punch of another object hits the first player object P1. However, the first player object P1 cannot avoid, even with the guard action, the throw action due to the both-hand punch action of another player object (that is, the first player object P1, even during the guard action, is thrown by the both-hand punch action of the other player object). In addition, while performing the guard action, the first player object P1 cannot throw a punch, and cannot perform the both-hand punch action.

Figure 19:
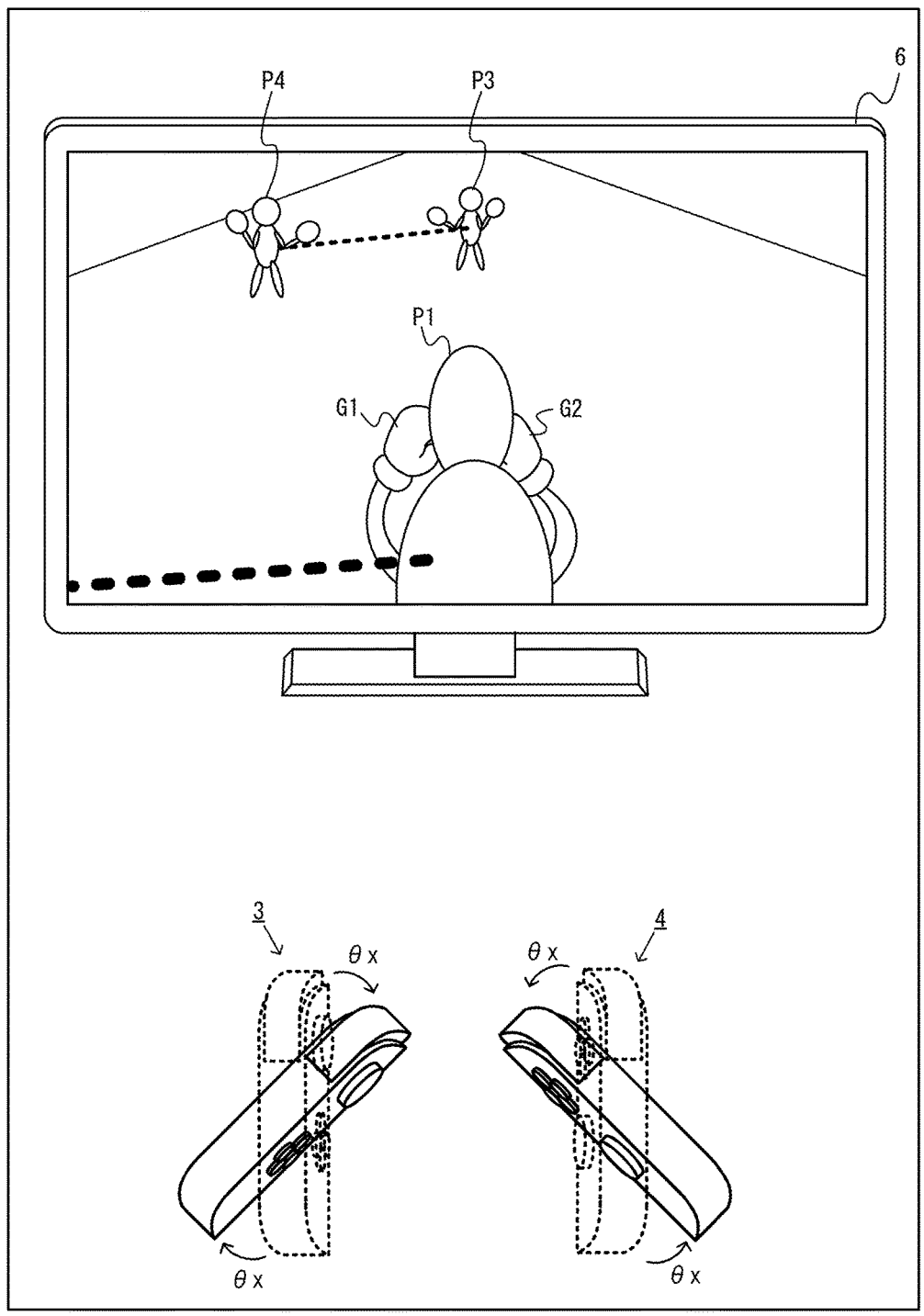
FIG. 19 is a diagram showing a non-limiting example of the game image displayed in the game played by moving the left controller 3 and the right controller 4.

In the exemplary embodiment, based on the tilts described above, when it is determined that both the left controller 3 and the right controller 4 are in the orientations in which the left controller 3 and the right controller 4 are tilted inward, the first player object P1 performs the guard action (FIG. 19). Specifically, the main body apparatus 2 calculates a tilt of the left controller 3 in the X-axis direction and a tilt of the right controller 4 in the X-axis direction with respect to the direction of gravity in the real space. Then, based on these tilts, when it is determined that both the left controller 3 and the right controller 4 are in the orientations in which the left controller 3 and the right controller 4 are tilted inward at a predetermined angle or more (e.g., θx shown in FIG. 19), the main body apparatus 2 causes the first player object P1 to perform the guard action.

In the exemplary game, it is possible to cause the first player object P1 to perform an action in accordance with an operation using the analog stick and/or the operation buttons of the controller, in addition to the operation of moving the controller. For example, the main body apparatus 2 causes the first player object P1 to perform a jumping action in accordance with a pressing input to a predetermined operation button of the controller.

While the operation method for the first player object P1 has been described above, operation methods for the second to fourth player objects are the same as the operation method for the first player object P1 in the exemplary embodiment. That is, in the exemplary embodiment, each user performs an operation for the corresponding player object by using one set of controllers composed of a left controller and a right controller. In another exemplary embodiment, the operation methods for the second to fourth player objects may be different from the operation method for the first player object P1. For example, actions of some of the second to fourth player objects may be controlled based on an input (e.g., an input to the analog stick or a button) to one left controller or one right controller.

Further, the game of the exemplary embodiment may be a communication competition game. In this case, some of the second to fourth player objects (e.g., the third player object P3 and the fourth player object P4 as enemy objects) may be controlled by a user of another external device capable of communicating with the main body apparatus 2 via a network. For example, the external devices may be another main body apparatus of the same type as the main body apparatus 2 shown in FIG. 1, and the actions of the player objects may be controlled based on inputs to controllers communicable with the other main body apparatus. At this time, the main body apparatus 2 performs communication with two sets of controllers to acquire operation data from the two sets of controllers, while the other main body apparatus performs communication with other two sets of controllers to acquire operation data from the other two sets of controllers. It should be noted that, when a plurality of users use one main body apparatus, the display area of the stationary monitor 6 may be split into two display areas, and an image for each user (i.e., an image in which the game space is viewed in the line-of-sight direction from a player object operated by one user to a player object operated by the other user) may be displayed on each split display area.

In the exemplary embodiment, non-player characters may be used instead of some of the second to fourth player objects. That is, the main body apparatus 2 may use, instead of some of the second to fourth player objects, an object whose action is automatically controlled based on an algorithm determined in the game program. That is, the number of users who play the game of the exemplary embodiment is not limited to four, and may be one to three.

In the exemplary embodiment, it is also possible to play the above game using an attachment (an accessory device) for joining the left controller 3 and the right controller 4 to cause the left controller 3 and the right controller 4 to function as a single operation apparatus.

Figure 20:
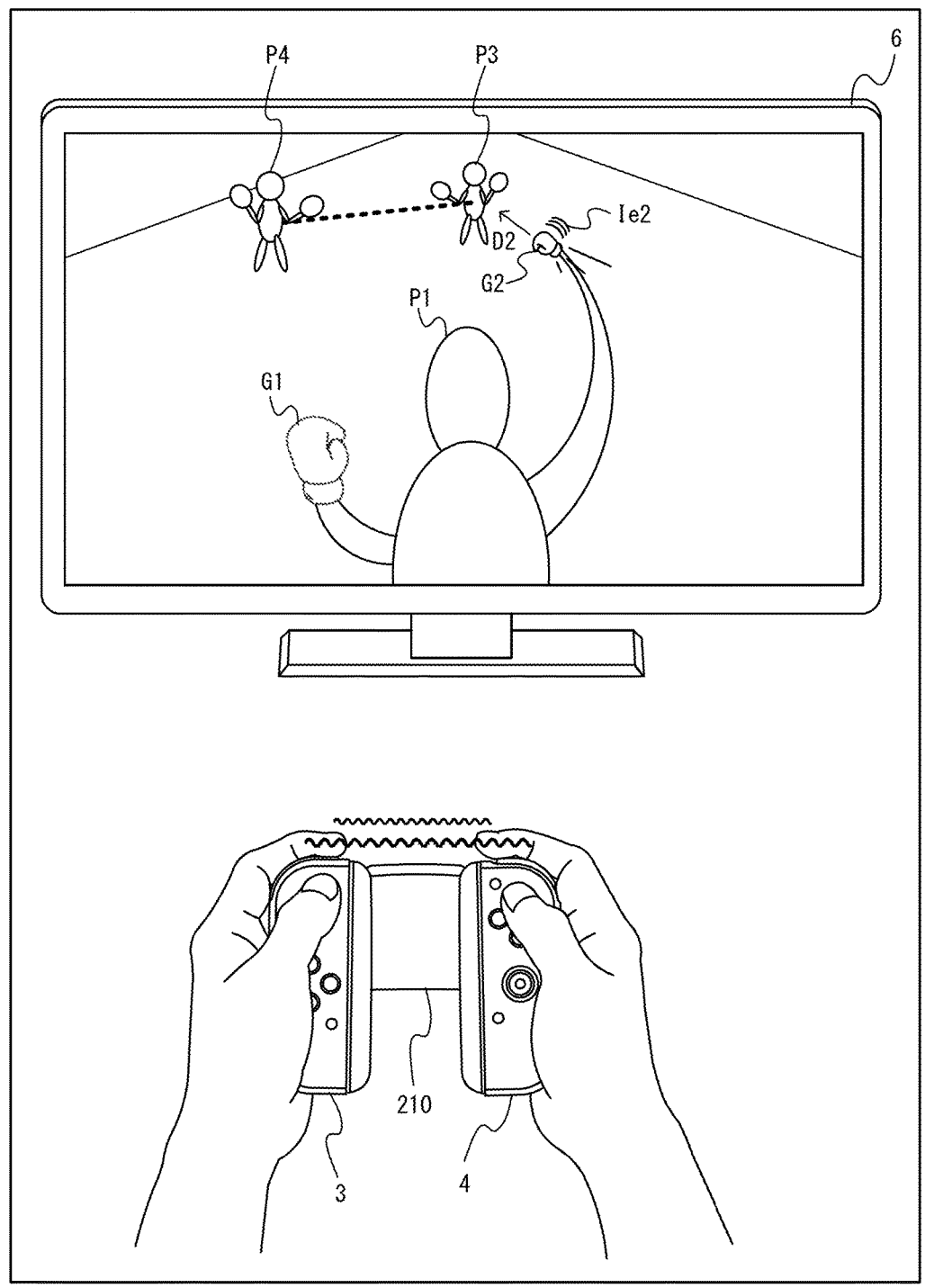
FIG. 20 is a diagram showing a non-limiting example of an accessory device to which the left controller 3 and the right controller 4 can be mounted.

FIG. 20 is a diagram showing an example of an accessory device to which the left controller 3 and the right controller 4 are attachable. As shown in FIG. 20, an extension grip 210, which is an example of the accessory device, is an accessory device used by the user to perform an operation. The left controller 3 is attachable to the extension grip 210, and the right controller 4 is also attachable to the extension grip 210. Thus, with the extension grip 210, the user can perform an operation by holding, in a unified manner, the two controllers 3 and 4 detached from the main body apparatus 2.

The extension grip 210 has mechanisms similar to those of the main body apparatus 2 (specifically, the left rail member 15, the right rail member 19, and the like) as mechanisms for attaching the left controller 3 and the right controller 4. Thus, similarly to the case where the left controller 3 and the right controller 4 are attached to the main body apparatus 2, the left controller 3 and the right controller 4 can be attached to the extension grip 210. Specifically, in the extension grip 210, mechanisms for attaching the left controller 3 and the right controller 4 are provided on both left and right sides across a main body portion having a predetermined width, and rail members for attaching the left controller 3 and the right controller 4 are provided in parallel. Consequently, the left controller 3 and the right controller 4 are attached to the extension grip 210 such that the xyz-axis directions of the left controller 3 and the right controller 4 are parallel to each other. Then, the user holds with both hands the left controller 3 and the right controller 4 attached to the extension grip 210 and unified. Consequently, the user can hold in a unified manner the two controllers, namely the left controller 3 and the right controller 4, detached from the main body apparatus 2.

When the above game is played using the left controller 3 and the right controller 4 unified by such an extension grip 210, an operation is performed using the operation buttons and the sticks provided in the left controller 3 and the right controller 4. For example, when the B-button 54 of the right controller 4 is subjected to a pressing operation, the first player object P1 throws a left punch, and the left-fist object G1 starts moving. When the A-button 53 of the right controller 4 is subjected to a pressing operation, the first player object P1 throws a right punch, and the right-fist object G2 starts moving. When the analog stick 32 of the left controller 3 is subjected to a tilt operation while the left-fist object G1 and/or the right-fist object G2 are moving in a virtual game world, the moving directions of the left-fist object G1 and/or the right-fist object G2 that are moving change in accordance with the direction of the tilt operation and the tilt angle. When the analog stick 32 of the left controller 3 is subjected to a tilt operation in a case where both the left-fist object G1 and the right-fist object G2 are placed at the movement start positions, the first player object P1 moves in the virtual game world in accordance with the direction of the tilt operation and the tilt angle. When the A-button 53 and the B-button 54 of the right controller 4 are subjected to pressing operations at substantially the same timing, the left-fist object G1 and the right-fist object G2 start to move. That is, the first player object P1 performs the both-hand punch action. In another exemplary embodiment, the first player object P1 may be caused to perform the both-hand punch action in accordance with a pressing operation to any one of the buttons of the controllers. Further, when the operation of pushing in the analog stick 32 of the left controller 3 is performed in a case where both the left-first object G1 and the right-fist object G2 are placed at the movement start positions, the first player object P1 defends against an attack from the enemy object in the virtual game world. When the X-button 55 of the right controller 4 is subjected to a pressing operation, the first player object P1 performs the action of jumping in the virtual game world. Then, when the Y-button 56 of the right controller 4 is subjected to a pressing operation, the first player object P1 dashes (moves rapidly) in the virtual game world.

Also when game play is performed using the extension grip 210, vibrations are imparted to the left controller 3 and/or the right controller 4 attached to the extension grip 210 in accordance with the states of the left-fist object G1 and/or the right-fist object G2 in the virtual game world. As an example, also when game play is performed using the extension grip 210, the main body apparatus 2 generates outward vibration data in accordance with the type, the moving velocity, the moving direction, and the like of the left-fist object G1 in accordance with the fact that the left-fist object G1 moves in the virtual space, and transmits the outward vibration data to the left controller 3. Further, the main body apparatus 2 generates outward vibration data in accordance with the type, the moving velocity, the moving direction, and the like of the right-fist object G2 in accordance with the fact that the right-fist object G2 moves in the virtual space, and transmits the outward vibration data to the right controller 4. Further, also when game play is performed using the extension grip 210, and when the left-fist object G1 and/or the right-fist object G2 collide with another object, the main body apparatus 2 generates vibration data indicating vibrations corresponding to the collision and transmits the vibration data to the left controller 3 and/or the right controller 4. Further, also when game play is performed using the extension grip 210, and when the left-fist object G1 and/or the right-fist object G2 move on the homeward paths for returning to the movement start positions, the main body apparatus 2 generates homeward vibration data in accordance with the types, the moving velocities, the moving directions, and the like of the left-fist object G1 and/or the right-fist object G2 moving on the homeward paths, and transmits the homeward vibration data to the left controller 3 and/or the right controller 4. Consequently, also when game play is performed using the extension grip 210, the left controller 3 and/or the right controller 4 receiving various vibration data vibrate based on the vibration data.

Further, also when game play is performed using the extension grip 210, and when the trajectories of the left-fist object G1 and/or the right-fist object G2 change due to the fact that the analog stick 32 is subjected to a tilt operation, the vibrations of the left controller 3 and/or the right controller 4 also change. For example, when the outward trajectories of the left-fist object G1 and/or the right-fist object G2 change, the main body apparatus 2 calculates change parameters for the amplitudes and/or the frequencies of the vibrations in accordance with the angle of the tilt operation (an analog input value) on the analog stick 32, temporarily changes the outward vibration data using the change parameters, and then changes back the outward vibration data again. Consequently, receiving the outward vibration data that temporarily changes, the left controller 3 and/or the right controller 4 change the amplitudes and/or the frequencies of the vibrations based on the outward vibration data.

It should be noted that when an operation is performed using an accessory device to which the left controller 3 and the right controller 4 are attachable, an operation using not only the analog stick 32 of the left controller 3 but also the analog stick 52 of the right controller 4 may be allowed. In this case, an operation using a pair of analog sticks is allowed. Thus, independent direction indications for changing the trajectory of the left-fist object G1 using the analog stick 32, and changing the trajectory of the right-fist object G2 using the analog stick 52 may be allowed.

3. Connection Object

[3-1. Outline of Connection Object]

Next, a description is given of a connection object with reference to FIG. 14 and FIGS. 21 to 26. As described above, in the exemplary embodiment, the first player object P1 and the second player object P2 (see FIG. 21) make the first group, and the third player object P3 and the fourth player object P4 make the second group. In the exemplary embodiment, a connection object connects the player objects belonging to the same group to each other. That is, friend player objects are connected to each other by the connection object.

Specifically, as shown in FIG. 14, the third player object P3 and the fourth player object P4 as enemy objects are connected to each other by a second connection object C2. The first player object P1 is connected to the second player object P2 as a friend object (not shown in FIG. 14) by a first connection object C1. The connection object allows the user to easily recognize the player objects belonging to the same group, in other words, to easily understand which player object is a friend object and which object is an enemy object.

In the exemplary embodiment, the second player object P2 as a friend object for the first player object P1 may not be included in the display range as shown in FIG. 14. In the exemplary embodiment, since the first connection object C1 connecting the first player object P1 to the second player object P2 is displayed, even when the second player object P2 is not included in the display range, the user can understand the rough position of the second player object P2. For example, in the example shown in FIG. 14, the user can understand that the second player object P2 is located on the left rear side of the first player object P1 by recognizing the direction of the first connection object C1. Thus, the user can perform the game operation while taking care that a punch of the second player object P2 as a friend object does not hit the first player object P1.

Although the details will be described later, in the exemplary embodiment, each player object is restricted in movement by the connection object connected to the player object. Specifically, the actions of the two player objects connected to each other by the connection object are controlled such that one of the player objects is not likely to move to a position distant from the other player object. That is, in the exemplary embodiment, the player objects belonging to the same group are restricted in movement by the connection object such that the player objects are located close to each other.

On the other hand, although the details will be described later, in the exemplary embodiment, a virtual camera is set so as to be directed to one of the third player object P3 and the fourth player object P4 (see FIG. 14). Therefore, when the third player object P3 and the fourth player object P4 are located close to each other by the second connection object C2 as described above, the player object other than the player object to which the virtual camera is directed is also likely to be included in the display range. For example, in the example shown in FIG. 14, the virtual camera is set to be directed to the third player object P3, and at this time, the fourth player object P4 is likely to be included in the display range. Thus, in the exemplary embodiment, by setting the connection object, the player objects (here, the enemy objects) belonging to the same group are likely to be included in the single display range, thereby providing a game image that is easily viewable to the user.

(Display Mode of Connection Object)

Figure 21:
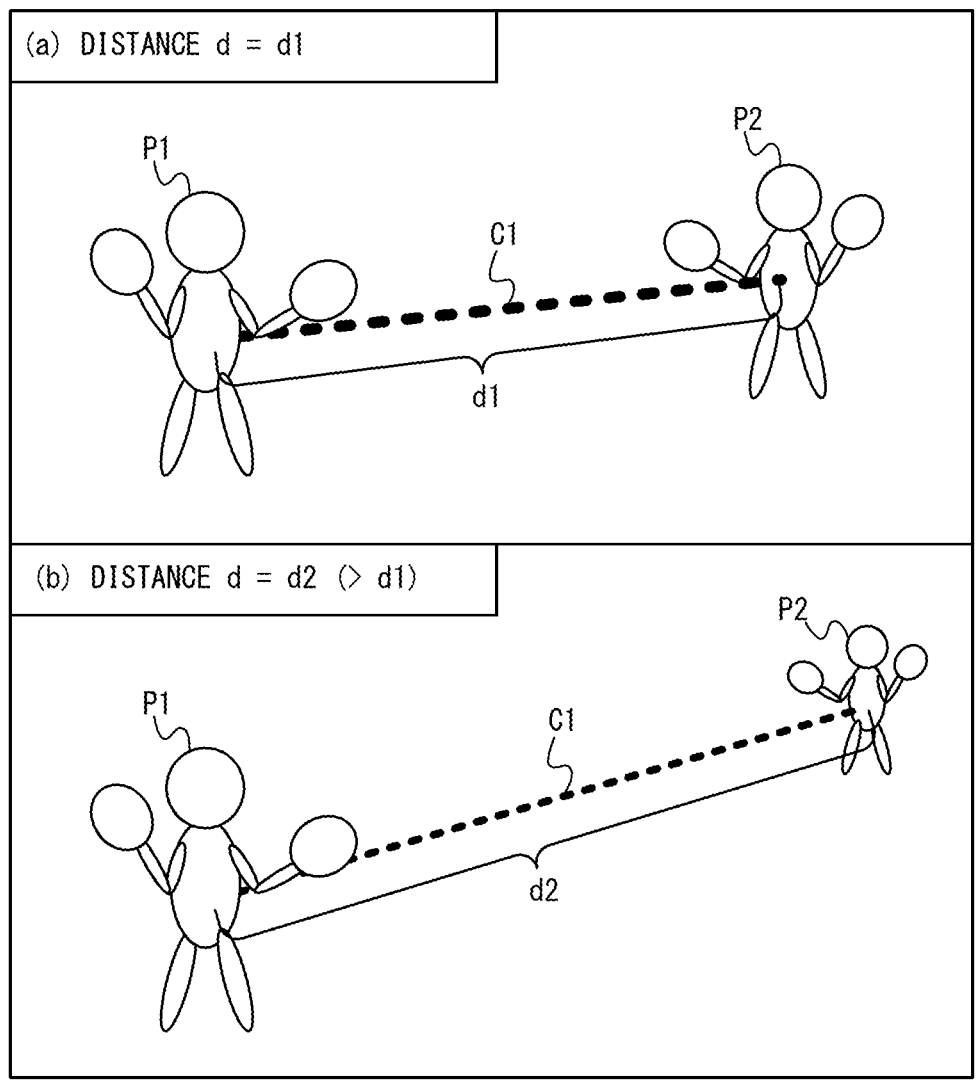
FIG. 21 is a diagram showing an example of two player objects connected to each other by a connection object.

FIG. 21 is a diagram showing an example of two player objects connected to each other by a connection object. It should be noted that (a) of FIG. 21 shows a case where the distance between the two player objects is relatively short (i.e., a case where distance d=d1), and (b) of FIG. 21 shows a case where the distance between the two player objects is relatively long (i.e., a case where distance d=d2 (>d1)). As shown in FIG. 21, in the exemplary embodiment, the first connection object C1 is an object having a rope-like appearance. Although a description is given below using the first connection object C1 as an example, the main body apparatus 2 executes, also for the second connection object C2, the same processing as that for the first connection object C1.

In the exemplary embodiment, the display mode of the first connection object C1 is changed in accordance with the distance between the two player objects connected to each other by the first connection object C1 (in other words, the length of the first connection object C1). Specifically, when distance d=d1, the thickness of the first connection object C1 is set to a first thickness ((a) of FIG. 21). When distance d=d2, the thickness of the first connection object C1 is set to a second thickness smaller than the first thickness ((b) of FIG. 21). In the exemplary embodiment, the main body apparatus 2 sets the thickness of the first connection object C1 so as to be proportional to the above distance. Thus, in the exemplary embodiment, since the display mode of the connection object is changed in accordance with the above distance, the user is allowed to understand the distance by the connection object. For example, in the example shown in FIG. 14, the user is allowed to understand, by the first connection object C1, not only the direction of the second player object P2 with respect to the first player object P1 but also how far the second player object P2 is distant from the first player object P1.

It should be noted that the main body apparatus 2 may change any display mode of the first connection object C1 in accordance with the above distance. For example, the color of the first connection object C1 may be changed in accordance with the above distance, or the interval of dots in a dotted line representing the first connection object C1 may be changed in accordance with the distance. Alternatively, when the first connection object C1 has a helical shape (e.g., spring-like shape), the pitch of the helix (in other words, assuming that a helix extends along a side surface of a cylinder, the length in the axial direction of the cylinder when the helix makes one round of the cylinder) may be changed in accordance with the distance.

Figure 22:
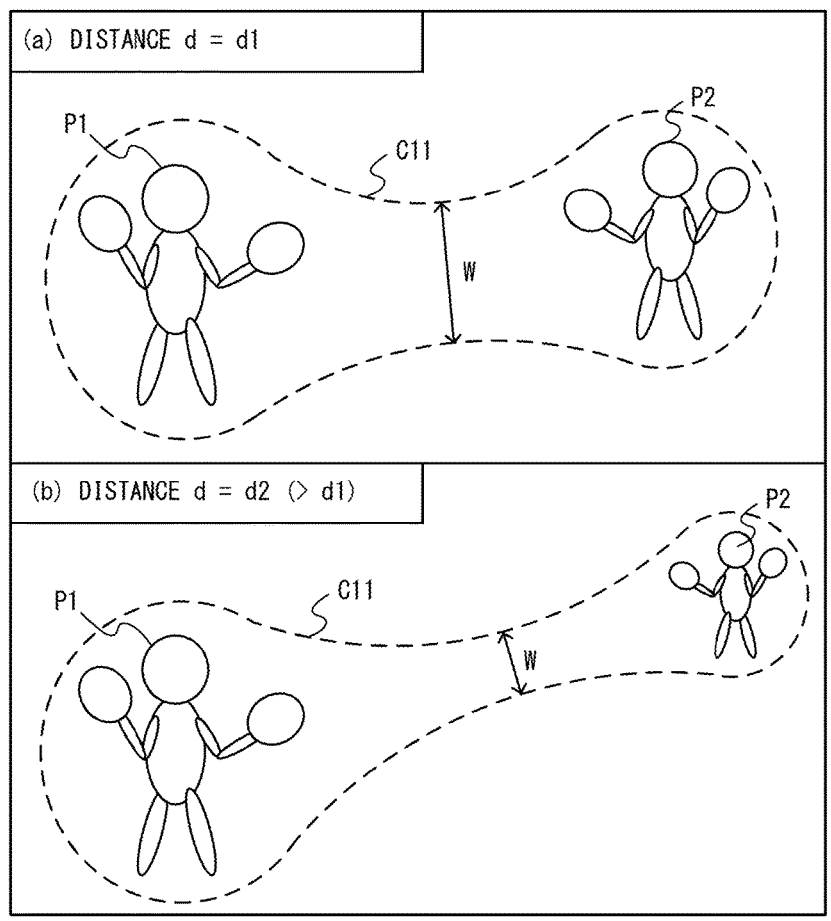
FIG. 22 is a diagram showing another example of the connection object.

In another exemplary embodiment, the connection object may have any shape representing that two player objects are connected to each other. FIG. 22 shows another example of the connection object. As shown in FIG. 22, a connection object C11 may have a shape representing a region including the first player object P1 and the second player object P2. It should be noted that, as shown in (a) and (b) of FIG. 22, a width W of a portion, of the connection object C11, between the two player objects may be changed in accordance with the distance d described above.

(Relationship Between Connection Object and Other Objects)

In the exemplary embodiment, the main body apparatus 2 does not execute a collision detection process for the connection object. That is, the main body apparatus 2 determines the state of the first connection object C1 (specifically, the position and/or the direction) based on the first player object P1 and the second player object P2, regardless of whether or not the first connection object C1 comes into contact with another object in the game space. It should be noted that the above "another object" is, for example, a player object, or a topography object or an obstacle object arranged in the game space. In the exemplary embodiment, for example, even when an obstacle is present between the first player object P1 and the second player object P2, the first connection object C1 is arranged between the first player object P1 and the second player object P2 regardless of the presence of the obstacle. It should be noted that the display method in the case where the connection object comes into contact with another object is optional. For example, in the above case, the first connection object C1 may be displayed so as to pass through (in other words, penetrate through) the obstacle.

As described above, in the exemplary embodiment, since the collision detection process is not executed for the connection object, it is possible to reduce the risk that the action of the player object is unnecessarily restricted by the connection object. For example, it is possible to prevent the movement of the player object from being restricted due to contact of the connection object with an obstacle. When the connection object comes into contact with another object, a calculation process regarding the connection object (specifically, a process of calculating the position, the direction, and/or the later-described tension of the connection object) may be complicated. In this regard, in the exemplary embodiment, the main body apparatus 2 need not execute the calculation process regarding the contact of the connection object with another object, it is possible to reduce the processing load in the game processing. In another exemplary embodiment, the main body apparatus 2 may perform collision detection between the connection object and another object.

(Setting of Virtual Camera)

In the exemplary embodiment, a virtual camera used for generating a game image is set so as to be directed to one of two enemy objects (i.e., the third player object P3 and the fourth player object P4) from the first player object P1 side. More specifically, the virtual camera is set such that one of the two enemy objects and the first player object P1 are included in the display range (see FIG. 14). In the following description, a player object, of the two enemy objects, which is used as a reference for setting the virtual camera is referred to as a "noticed object". In the exemplary embodiment, as shown in FIG. 14, the third player object P3 as a noticed object is arranged substantially in the center of the display range with respect to the left-right direction. Therefore, when the first user performs an operation to cause the first player object P1 to throw a punch to the front, the first player object P1 can throw a punch toward the noticed object, and thus the punch is easily applied to the noticed object.

In the exemplary embodiment, the noticed object is switched in accordance with a switching operation (e.g., an operation of pressing a predetermined button of the controller) performed by the first user. That is, when the switching operation is performed in the state where the noticed object is the third player object P3, the main body apparatus 2 changes the noticed object to the fourth player object P4. When the switching operation is performed in the state where the noticed object is the fourth player object P4, the main body apparatus 2 changes the noticed object to the third player object P3. Thus, the user can easily change the target enemy object.

In the exemplary embodiment, when a predetermined automatic switching condition is satisfied, the main body apparatus 2 automatically switches the noticed object even if the switching operation is not performed. Specifically, when the noticed object falls down, switching of the noticed object is performed. In the exemplary embodiment, the noticed object falls down after being flown by a punch of another player object or thrown by the both-hand punch action of another player object. In the exemplary embodiment, a punch applied to a fallen-down player object is invalid (i.e., no damage is applied), and therefore, it is less necessary to regard the fallen-down player as a target.

In another exemplary embodiment, the virtual camera may be set such that the first connection object C1 is included in the field-of-view range. That is, the first connection object C1 may be set as the noticed object described above. In still another exemplary embodiment, the first player object P1 may not be included in the field-of-view range, and a so-called first-person viewpoint game image may be generated. In yet another exemplary embodiment, the main body apparatus 2 may allow the user to freely operate the line-of-sight direction of the virtual camera. Even in the embodiment in which the user can freely operate the line-of-sight direction of the virtual camera, since the player objects belonging to the same group are arranged close to each other by the connection object, these player objects are likely to be included in the single display range. Therefore, also in the above embodiments, it is possible to provide a game image that is easily viewable to the user as in the exemplary embodiment.

[3-2. Tension Caused by Connection Object]

In the exemplary embodiment, the main body apparatus 2 imposes restriction on movement of a player object connected to a connection object, by using the connection object. In the exemplary embodiment, the main body apparatus 2 calculates a virtual tension that acts between the player object and the connection object. By controlling the action of the player object while considering the tension, the main body apparatus 2 imposes restriction on movement of the player object. That is, since the player object receives a force that pulls the player object toward the connection object (depending on a situation), it is possible to make the distance between two player objects connected to each other by the connection object not likely to increase. Hereinafter, a specific example of a tension calculation method will be described with reference to FIG. 23.

Figure 23:
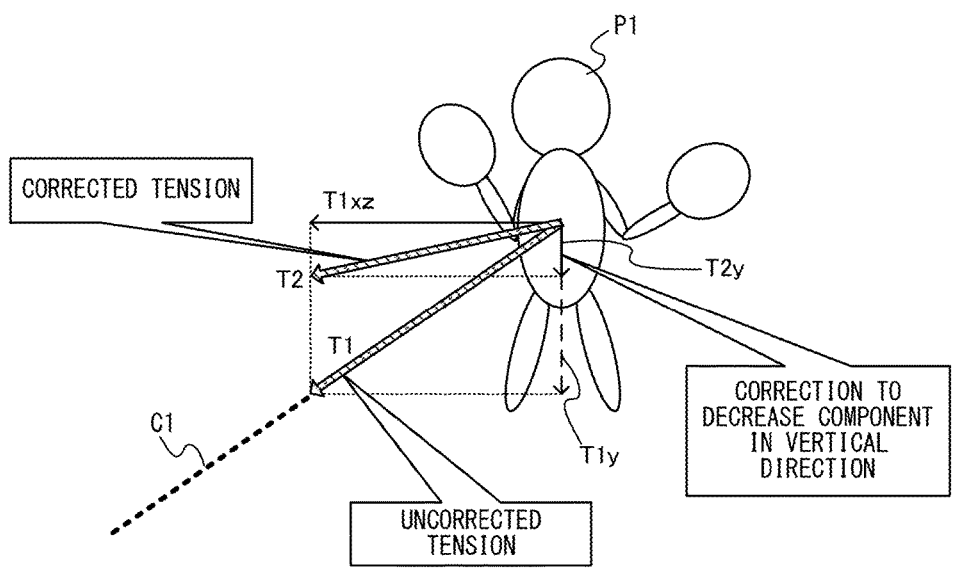
FIG. 23 is a diagram showing an example of a tension that acts on a player object.

FIG. 23 is a diagram showing an example of a tension that acts on a player object. In FIG. 23, a description is given for a tension that acts on the first player object P1 as an example, tensions that act on the respective player objects can be calculated by the same method.

In the exemplary embodiment, first, the main body apparatus 2 calculates a tension T1 (hereinafter referred to as "uncorrected tension") that acts in the direction of the first connection object C1. The uncorrected tension T1 is parallel to the direction of the first connection object C1, and is directed from the first player object P1 to the second player object P2 (see FIG. 23).

The magnitude of the uncorrected tension T1 is calculated based on a length L of the first connection object C1 (in other words, the distance between the first player object P1 and the second player object P2). Specifically, the uncorrected tension T1 is calculated in accordance with the following formula (1):

in a case where the length $L$ is smaller than a reference value $L1$: $T1=0$, and in a case where the length $L$ is equal to or greater than the reference value $L1$: $T1=k \times (L-L1)$    (1)

In the above formula (1), coefficient k is a predetermined constant. As shown in formula (1), in the exemplary embodiment, when the length L of the first connection object C1 is smaller than the reference value L1, the uncorrected tension T1 is 0 (i.e., the tension T1 is not generated). Accordingly, when the distance between the first player object P1 and the second player object P2 is smaller than the reference value L1, no restriction is imposed on the movement of each player object, whereby operability of the operation to each player object can be improved. When the length L of the first connection object C1 is equal to or greater than the reference value L1, the uncorrected tension T1 has a magnitude according to the length L. Thus, in the exemplary embodiment, the tension is calculated such that the first connection object C1 is regarded as having an elastic-body-like property.

If restriction is imposed on movement of the player object by using the uncorrected tension T1 as it is, there is a risk that the restriction may become excessively great in the vertical direction in the game space (specifically, a direction perpendicular to the ground. In other words, a direction parallel to the direction of gravity set in the game space). For example, in a case where the player object performs a jumping action, and if the player object cannot perform a sufficiently high jump due to the tension, the user may have an uncomfortable feeling to the jumping action. Further, in the game according to the exemplary embodiment, it is conceivable that the player object eludes a punch of an enemy object by the jumping action. Therefore, if the player object cannot perform a sufficiently high jump, the operability of the operation to the player object may be degraded.

Therefore, in the exemplary embodiment, the main body apparatus 2 performs correction so as to decrease a component in the vertical direction from the uncorrected tension T1. Specifically, as shown in FIG. 23, the main body apparatus 2 decreases a vertical-direction component T1$y$ of the uncorrected tension T1 to obtain a corrected vertical-direction component T2$y$. The corrected vertical-direction component T2$y$ is obtained by, for example, multiplying the uncorrected vertical-direction component T1$y$ by a predetermined coefficient a (0<a<1). The main body apparatus 2 regards a tension composed of a horizontal-direction component T1$xz$ of the uncorrected tension T1, and the corrected vertical-direction component T2$y$, as a corrected tension T2.

As described above, in the exemplary embodiment, the main body apparatus 2 calculates the corrected tension T2 by decreasing a component, of the tension directed in the direction of the first connection object C1 (i.e., the uncorrected tension T1), which regards to a second direction (i.e., the vertical direction) orthogonal to a predetermined first direction (i.e., the horizontal direction) in the game space. Thus, it is possible to reduce the risk that the user has an uncomfortable feeling to the action (e.g., jumping action) of the first player object P1 regarding the vertical direction.

In the exemplary embodiment, the main body apparatus 2 performs the correction to decrease the tension in the vertical direction. In another exemplary embodiment, the main body apparatus 2 may perform correction to decrease the tension in any direction according to the game content and/or the game setting. In addition, the method for correcting the tension is optional. In another exemplary embodiment, for example, the corrected tension T2 may be calculated by subtracting a predetermined value from the uncorrected vertical-direction component T1$y$.

The main body apparatus 2 may change the decrease amount of the tension T1 in accordance with the direction of the uncorrected tension T1. For example, in a case where the vertical-direction component T1$y$ of the uncorrected tension T1 is directed vertically upward, the main body apparatus 2 may calculate the corrected vertical-direction component T2$y$ by multiplying the vertical-direction component T1$y$ by a coefficient a1. In a case where the vertical-direction component T1$y$ of the uncorrected tension T1 is directed vertically downward, the main body apparatus 2 may calculate the corrected vertical-direction component T2$y$ by multiplying the vertical-direction component T1$y$ by a coefficient a2. It should be noted that the coefficient a1 and the coefficient a2 may be set as appropriate in accordance with the game content and/or the game setting, and the coefficient a1 may be set to be greater than the coefficient a2 or smaller than the coefficient a2.

In the exemplary embodiment, the action of the first player object P1 is controlled by using the corrected tension T2 calculated as described above. In the exemplary embodiment, the action of the first player object P1 is controlled based on factors including: operation performed by the first user (e.g., movement operation shown in FIG. 20); effect received from another object (e.g., effect of receiving a punch of another player object); force (e.g., gravity) set in the game space; and the like. The main body apparatus 2 controls the action, based on the corrected tension T2 as well as the above-described factors. Thus, when the length L of the first connection object C1 is equal to or greater than the reference value L1, since the first player object P1 is pulled by the first connection object C1, the first player object P1 is restricted in movement and thereby becomes not likely to be distant from the second player object P2.

For example, in the example shown in FIG. 23, since the first connection object C1 extends to the left from the first player object P1, the first player object P1 receives a tension T1 directed to the left and therefore is not likely to move to the right. Specifically, in a case of moving the first player object P1 by the movement operation shown in FIG. 18, the amount of movement to move the first player object p1 to the left by an operation of tilting each controller to the left by a certain angle is greater than the amount of movement to move the first player object p1 to the right by an operation of tilting each controller to the right by the same angle. Further, for example, in a case where the first player object P1 performs the jumping action directly upward from the state shown in FIG. 23, the first player object P1 is moved to the left during the jumping action by the tension applied to the first player object P1 during the jumping action.

In the exemplary embodiment, the connection object is connected to the waist of each player object. Therefore, the main body apparatus 2 controls the action of the player object on assumption that the tension acts on the waist of the player object. It should be noted that the position at which the connection object is connected to the player object is optional, and may be a position other than the waist.

As described above, in the exemplary embodiment, the main body apparatus 2 imposes restriction on the movements of the first player object P1 and the second player object P2 by using virtual tensions that are applied to the first player object P1 and the second player object P2 by the first connection object C1. In addition, the main body apparatus 2 imposes restriction on the movements of the third player object P3 and the fourth player object P4 by using virtual tensions that are applied to the third player object P3 and the fourth player object P4 by the second connection object C2. In this case, each player object, although its movement is restricted, can move freely to a certain extent if the tension is weak. Therefore, it is possible to reduce the risk that the action of the player object becomes unnatural, for example, movement of the player object is suddenly stopped due to the connection object.

As described above, in the exemplary embodiment, each player object can freely move when the length L of the connection object is short (i.e., when the length L is smaller than the reference value L1), whereas the movement of the player object is restricted because the tension acts thereon when the length L of the connection object reaches a certain length (i.e., when the length L is equal to or greater than the reference value L1). In the exemplary embodiment, an upper limit is set to the length of the connection object. Therefore, if the tension becomes significantly great as a result of increase in the length of the connection object or if the length of the connection object reaches the upper limit, the player object is inhibited from moving in the direction in which the connection object extends.

In another exemplary embodiment, the specific method for imposing restriction on the player object by the connection object is optional, and restriction may be imposed by a method other than a tension. For example, in another exemplary embodiment, restriction may be imposed such that the length of the connection object is within a predetermined range. At this time, the distance between the two player objects connected to each other by the connection object is limited within the predetermined range.

[3-3. Cancellation of Restriction of Connection Object]

In the exemplary embodiment, restriction (specifically, a tension) imposed on a player object by a connection object does not occur when a cancellation condition regarding the player object is satisfied. That is, while the cancellation condition regarding the player object is satisfied, the main body apparatus 2 controls the action of the player object, with the restriction regarding the movement of the player object being canceled. Hereinafter, a case where the restriction by the connection object is canceled is described in detail.

In the exemplary embodiment, the cancellation condition is that the player object performs a predetermined tension invalid action. That is, while the player object performs the tension invalid action, a tension does not act on the player object. In the exemplary embodiment, the following actions (A) to (C) are set as tension invalid actions:

(A) action of being flown according to the fact that the player object receives a punch of another player object (hereinafter referred to as "action of being flown");

(B) action of being thrown according to the both-hand punch action of another player object (hereinafter referred to as "action of being thrown"); and (C) action of throwing another player object by the both-hand punch action (hereinafter referred to as "throwing action").

Figure 24:
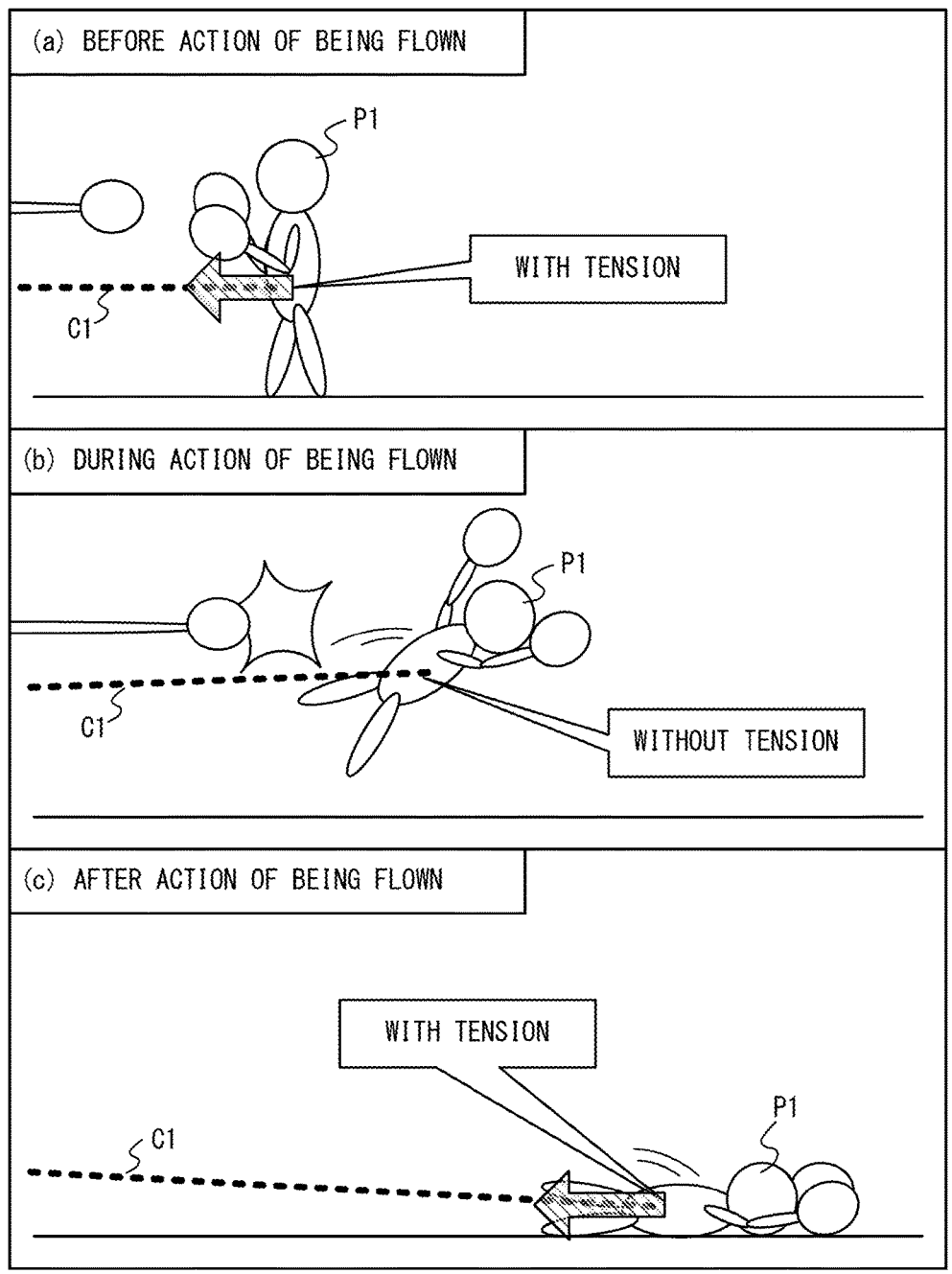
FIG. 24 is a diagram showing an example of a first player object performing an action of being flown.

FIG. 24 is a diagram showing an example of the first player object P1 performing the action of being flown. As shown in (a) of FIG. 24, before the first player object P1 receives a punch of another player object (i.e., before the action of being flown), a tension caused by the first connection object C1 acts. Then, as shown in (b) of FIG. 24, when the first player object P1 receives a punch of the other player object and performs the action of being flown, the main body apparatus 2 controls the action of being flown without causing a tension to be generated. The action of being flown is performed until the first player object P1 in its falling posture contacts the ground (i.e., until the first player object P1 falls down). As shown in (c) of FIG. 24, after the action of being flown is finished, the tension caused by the first connection object C1 acts again. Therefore, in the state after the action of being flown is finished ((c) of FIG. 24), the fallen-down first player object P1 may be pulled and moved by the first connection object C1, depending on the magnitude of the tension.

Also when the action of being thrown is performed, the main body apparatus 2 performs the same control as that for the action of being flown. That is, the main body apparatus 2 controls the action of being thrown without causing a tension to be generated, during a period from a timing when the action of being thrown is started (i.e., a timing when the player object is held by another player object) to a timing when the action of being thrown is finished (i.e., a timing when the player object in its falling posture contacts the ground).

Further, the main body apparatus 2 controls the action of the player object without causing a tension to be generated, during a period in which the player object performs the throwing action. For example, the throwing action is a series of actions in which the player object holds and shakes another player object and thereafter throws the other player object. While causing the player object to perform the series of actions, the main body apparatus 2 controls the action of the player object without generating a tension.

As described above, in the exemplary embodiment, while the player object performs the tension invalid action, the main body apparatus 2 controls the action of the player object such that a tension is not caused by the connection object. Thereby, it is possible to cause the player object to naturally perform the tension invalid action. For example, when the player object performs the action of being flown, and if the distance by which the player object is flown is decreased or increased due to the effect of the tension, the user may have an uncomfortable feeling to the action of being flown. However, in the exemplary embodiment, it is possible to reduce the risk that the user has such an uncomfortable feeling.

The type of the action set as the tension invalid action is optional. In another exemplary embodiment, an action different from the actions (A) to (C) described above may be set as the tension invalid action. In the exemplary embodiment, an operation performed by the user is not reflected in the action of the player object during any of the actions (A) to (C). Therefore, it can be said that the actions (A) to (C) are actions in which an operation performed by the user to the player object is not reflected (in other words, actions not influenced by the operation performed by the user). That is, in the exemplary embodiment, it can also be said that the cancellation condition described above is that "a player object is performing an action in which an operation performed by the user to the player object is not reflected".

In the exemplary embodiment, whether or not a player object satisfies the cancellation condition is determined for each player object. For example, determination as to whether the first player object P1 satisfies the cancellation condition and determination as to whether the second player object P2 satisfies the cancellation condition, are performed independently from each other. Accordingly, there may be cases where the cancellation condition is satisfied and therefore a tension is not caused by the first connection object C1 for the first player object P1, while the cancellation condition is not satisfied and therefore a tension is caused by the first connection object C1 for the second player object P2. Thus, determination regarding the cancellation condition is performed independently for each of the player objects connected to each other by the connection object, it is possible to cause each player object to act more naturally.

[3-4. Other Influences by Connection Object]

In the exemplary embodiment, a connection object may have an influence on each player object in a process described below, in addition to the influence on each player object due to a tension as described above. Such an influence is described below in detail.

(Chain Action Caused by Connection Object)

In the exemplary embodiment, a player object, connected to another player object by a connection object, may perform an action (referred to as a chain action) of the same type as an action performed by the other player object, in conjunction with the action of the other player object. Specifically, in the exemplary embodiment, when one of two player objects connected to each other by a connection object performs the action of being thrown (i.e., is thrown by the other player object), the other player object also performs the action of being thrown under certain conditions. The chain action is described below in detail with reference to FIG. 25.

Figure 25:
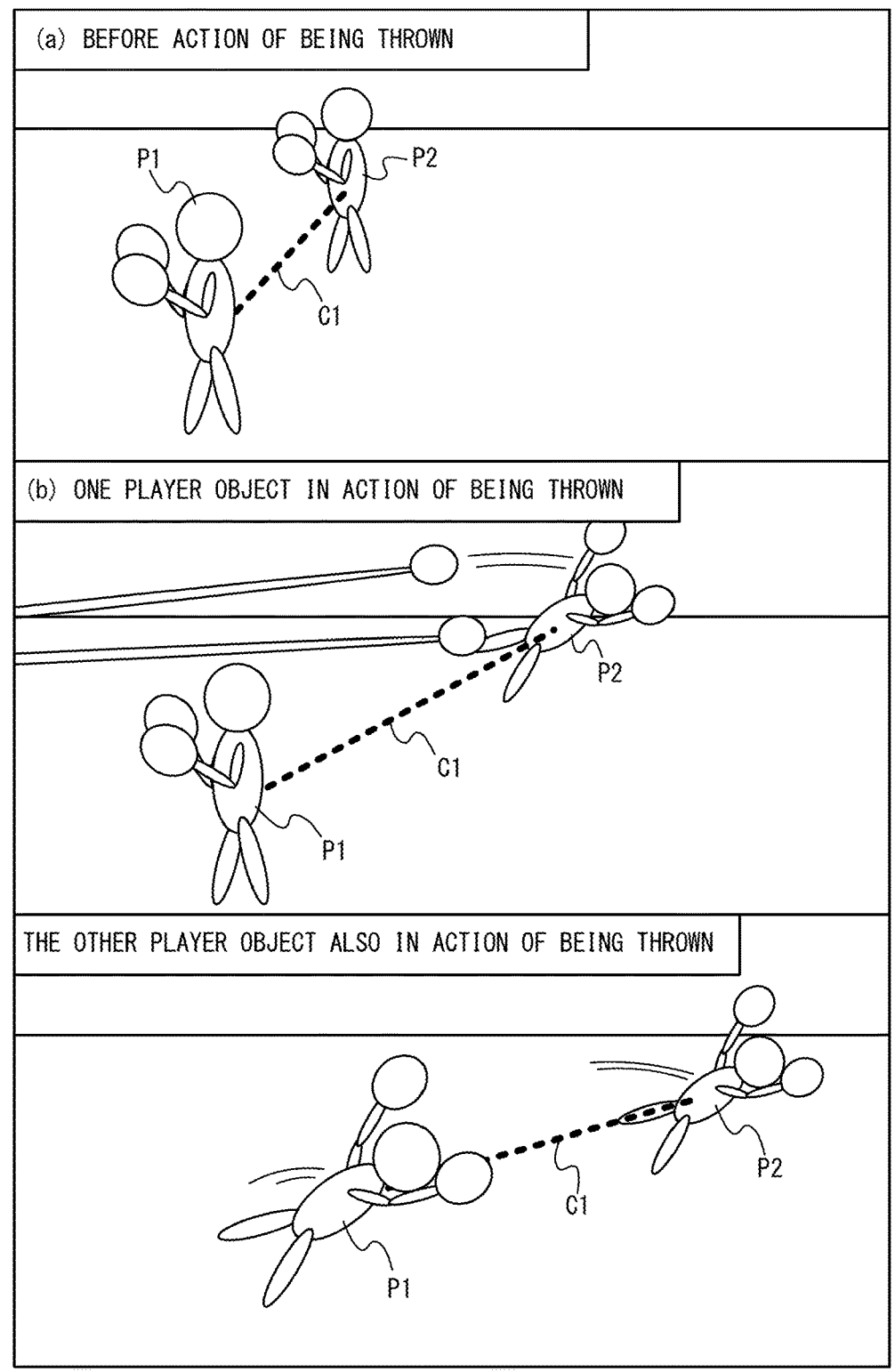
FIG. 25 is a diagram showing an example of player objects performing an action of being thrown.

FIG. 25 is a diagram showing an example of the player object performing the action of being thrown. In a state shown in (a) of FIG. 25, it is assumed that the second player object P2 receives the throwing action by an enemy object. In this case, first, the second player object P2 performs the action of being thrown in accordance with the throwing action performed by the enemy object (FIG. 25(b)). At this time, if a chain-action condition is satisfied, the first player object P1 also performs the action of being thrown (FIG. 25(c)).

In the exemplary embodiment, the chain-action condition is that the length L of the first connection object C1 becomes greater than a predetermined determination value L2 as a result of movement of the second player object P2 due to the action of being thrown. That is, the chain-action condition regarding a certain player object is that "a player object connected to the certain player object is performing the action of being thrown, and the length of the first connection object C1 becomes greater than the predetermined determination value L2". It should be noted that the determination value L2 is an optional value, and may be the same as or different from the reference value L1. The first player object P1 performs the action of being thrown so as to maintain the state where the length of the first connection object C1 is equal to or less than a predetermined length (e.g., the determination value L2).

In another exemplary embodiment, the content of the chain-action condition is optional. For example, in another exemplary embodiment, the chain-action condition may be that the tension that acts on a player object becomes equal to or greater than a predetermined value. In still another exemplary embodiment, when one of the two player objects connected to each other by the connection object performs the action of being thrown, the other player object may unconditionally perform the chain action (in other words, the action of being thrown).

As described above, in the exemplary embodiment, when one of the two player objects connected to each other by the connection object is moved due to the action of being thrown, the other player object is also moved due to the action of being thrown so as to maintain the state where the length of the connection object is equal to or less than the predetermined length. Thereby, the user have an influence on one of two enemy objects connected to each other by a connection object (specifically, the user damages one of two enemy objects by the throwing action), and simultaneously, have an influence on the other enemy object. Thus, strategic characteristics of the game can be enhanced, thereby enhancing the interest of the game. Further, even when one of the two player objects connected to each other by the connection object performs the action of being thrown, the distance between the two player objects can be maintained to be equal to or less than the predetermined length.

(Correction of Action Direction)

In the exemplary embodiment, there are cases where two player objects connected to each other by a connection object both perform the action of being flown (or the action of being thrown). Since no tension acts during the action of being flown as described above, when the two player objects simultaneously perform the action of being flown, both the two player objects perform the action without being influenced by the connection object. Therefore, when the action of being flown is finished, the distance between the two player objects may be significantly increased. In this case, a larger tension may be suddenly applied to each player object, which may cause the action of the player object to be unnatural. Therefore, in the exemplary embodiment, when the two player objects simultaneously perform the action of being flown, the main body apparatus 2 corrects the direction of the action of being flown (i.e., the direction in which the player object moves due to the action of being flown) according to need.

Figure 26:
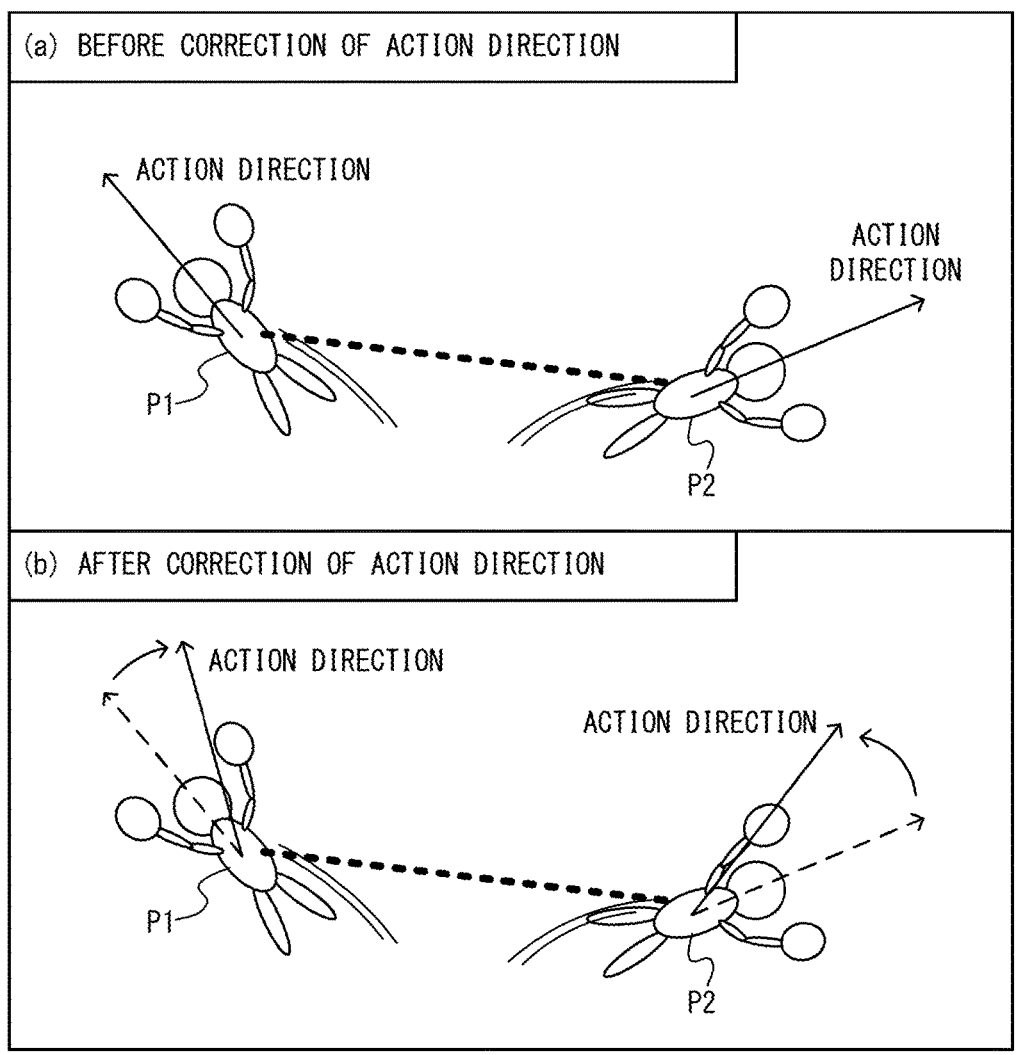
FIG. 26 is a diagram showing an example of a manner in which two player objects each perform an action of being flown.

FIG. 26 is a diagram showing an example of a manner in which two player objects perform the action of being flown. As shown in (a) of FIG. 26, when the two player objects P1 and P2 perform the action of being flown in opposite directions from each other, the length of the first connection object C1 may be excessively increased after the action of being flown. Therefore, in this case, the main body apparatus 2 corrects the directions in which the player objects perform the action of being flown. Specifically, as shown in (b) of FIG. 26, the action directions of the player objects P1 and P2 are corrected so as to approach a direction in which the action directions are parallel to each other. In FIG. 26, the main body apparatus 2 corrects the action directions of the two player objects P1 and P2. In another exemplary embodiment, the main body apparatus 2 may correct the action direction of one of the two player objects P1 and P2.

A condition for correcting the action direction is optional. For example, the correction condition may be that an angle formed between the action directions of the two player objects is equal to or greater than a predetermined value. Alternatively, the correction condition may be that the length of the connection object becomes equal to or greater than a predetermined value. Thus, the correction condition may be that the distance between two player objects at the time when the tension invalid action of one or both of the two player objects is ended becomes (or is estimated to be) greater than the predetermined value.

The timing to correct the action direction is optional. For example, in a state where one of the two player objects connected to each other by the connection object is performing the action of being flown, correction of the action direction may be started at a timing when the other player object starts the action of being flown. Alternatively, for example, correction of the action direction may be started at a timing when the correction condition is satisfied.

In FIG. 26, the two player objects both perform the action of being flown. However, also in a case where one or both of the two player objects performs the action of being thrown, the main body apparatus 2 corrects the action direction in the same manner as that for the case of the action of being flown.

As described above, according to the exemplary embodiment, in a case where one of two player objects connected to each other by a connection object performs a predetermined first action (i.e., the action of being flown or the action of being thrown) while the other player object performs a predetermined second action (i.e., the action of being flown or the action of being thrown), and if the action direction of the first action and the action direction of the second action satisfy a predetermined condition, at least one of the action direction of the first action and the action direction of the second action is corrected. Thereby, it is possible to reduce the risk that each player object takes an unnatural action after the first action or the second action. It should be noted that the first action and the second action may be actions of the same type, or may be actions of different types.

4. Specific Example of Game Processing

With reference to FIGS. 19 to 37, a description is given of a specific example of a case where the game processing, the outline of which has been described above, is executed in the information processing system. FIG. 19 is a diagram showing an example of a data area set in the DRAM 85 of the main body apparatus 2 according to the exemplary embodiment. It should be noted that in the DRAM 85, in addition to data shown in FIG. 19, data used for other processes is also stored, but is not described in detail here.

In a program storage area of the DRAM 85, various programs Pa, which are executed by the information processing system 1, are stored. In the exemplary embodiment, as the various programs Pa, a communication program for wirelessly communicating with the left controller 3 and the right controller 4, an application program for performing information processing (in the exemplary embodiment, a game program for performing game processing) based on data acquired from the left controller 3 and/or the right controller 4, a program for switching a display device for displaying an image in accordance with the attachment and detachment of the main body apparatus 2 to and from the cradle 5, and the like are stored. It should be noted that the various programs Pa may be stored in advance in the flash memory 84, or may be acquired from a storage medium attachable to and detachable from the information processing system 1 (e.g., a first type of storage medium attached to the first slot 23, a second type of storage medium attached to a second slot 24) and stored in the DRAM 85, or may be acquired from another apparatus via a network such as the Internet and stored in the DRAM 85. The CPU 81 executes the various programs Pa stored in the DRAM 85.

In a data storage area of the DRAM 85, various data used for processes such as a communication process, information processing, and the like executed by the information processing system 1 is stored. In the exemplary embodiment, in the DRAM 85, operation data Da, orientation data Db, angular velocity data Dc, acceleration data Dd, threshold data De, curve value data Df, rotational velocity data Dg, swing flag data Dh, movement flag data Di, action flag data Dj, return flag data Dk, movement-start-allowed flag data Dl, player object data Dm, collision area data Dn, left controller vibration data Do, right controller vibration data Dp, connection object data Dq, tension invalid flag data Dr, noticed object data Ds, image data Dt, and the like are stored.

The operation data Da is operation data appropriately acquired from each of the left controller 3 and the right controller 4. As described above, operation data transmitted from each of the left controller 3 and the right controller 4 includes information regarding an input (specifically, information regarding an operation or the detection result of each sensor) from each input section (specifically, each button, an analog stick, and each sensor). In the exemplary embodiment, operation data is transmitted from each of the left controller 3 and the right controller 4 in a predetermined cycle through wireless communication, and the operation data Da is appropriately updated using the received operation data. It should be noted that the update cycle of the operation data Dc may be such that the operation data Da is updated every frame, which is the cycle of the processing described later performed by the information processing system 1, or is updated every cycle in which operation data is transmitted through the above wireless communication.

The orientation data Db is data indicating each of the orientations of the left controller 3 and the right controller 4 with respect to the direction of a gravitational acceleration in real space. For example, the orientation data Db includes data indicating the direction of a gravitational acceleration acting on each of the left controller 3 and the right controller 4, data indicating XYZ-axis directions relative to the direction of the gravitational acceleration, and the like.

The angular velocity data Dc is data indicating angular velocities generated in each of the left controller 3 and the right controller 4. For example, the angular velocity data Dc includes data indicating angular velocities about the XYZ-axes generated in each of the left controller 3 and the right controller 4 and the like.

The acceleration data Dd is data indicating accelerations generated in each of the left controller 3 and the right controller 4. For example, the acceleration data Dd includes data indicating accelerations generated in the XYZ-axis directions, except for the gravitational acceleration generated in each of the left controller 3 and the right controller 4.

The threshold data De is data indicating a threshold for determining a swing operation performed on each of the left controller 3 and the right controller 4. The curve value data Df is data indicating a curve value C for calculating the moving direction and the trajectory of each of the left-fist object G1 and the right-fist object G2. The rotational velocity data Dg is data indicating the motion (a rotational velocity V) of each of the left controller 3 and the right controller 4 while the left-fist object G1 or the right-fist object G2 is moving.

The swing flag data Dh is data indicating a swing flag, which is set to on when it is determined that each of the left controller 3 and the right controller 4 is swung. The movement flag data Di is data indicating a movement flag, which is set to on when each of the left-fist object G1 and the right-fist object G2 is moving in the virtual space. The action flag data Dj is data indicating an action flag, which is set to on when an action is performed in which the left-fist object G1 and the right-fist object G2 are a set. The return flag data Dk is data indicating a return flag, which is set to on when each of the left-fist object G1 and the right-fist object G2 is moving on the homeward path in the virtual space for returning to the movement start position. The movement-start-allowed flag data Dl is data indicating a movement-start-allowed flag, which is set to on when the left-fist object G1 enters the first movement-start-allowed state, and when the right-fist object G2 enters the second movement-start-allowed state.

The player object data Dm is data indicating the state regarding the first player object P1. Specifically, the player object data Dm includes data indicating the position of the first player object P1 in the game space, and data indicating the positions of the left-fist object G1 and the right-fist object G2 in the game space. The player object data Dm further includes tension data indicating a tension that is applied to the first player object P1 by the first connection object C1. The player object data Dm further includes data indicating an action direction in a case where the first player object P1 performs the above-described action of being flown or action of being thrown. The collision area data Dn is data indicating the position in the virtual space, the shape, and the range of the collision area A.

The left controller vibration data Do is data indicating a vibration for vibrating the left controller 3. The right controller vibration data Dp is data indicating a vibration for vibrating the right controller 4.

The connection object data Dq is data indicating the state regarding the first connection object C1. Specifically, the connection object data Dq includes data indicating the position, the direction, and the length of the first connection object C1. The tension invalid flag data Dr is data indicating a tension invalid flag that indicates whether or not the first player object P1 is performing the tension invalid action described above.

The noticed object data Ds is data indicating the noticed object described above. In a case of generating a game image for the user operating the first player object P1, the noticed object data Ds indicates any of the enemy objects (i.e., the third player object P3 and the fourth player object P4) that are enemies of the first player object P1.

The image data Dt is data for displaying an image (e.g., an image of a virtual object, a field image, or a background image) on the display 12 of the main body apparatus 2 or the display screen of the stationary monitor 6 when a game is performed.

Figure 27:
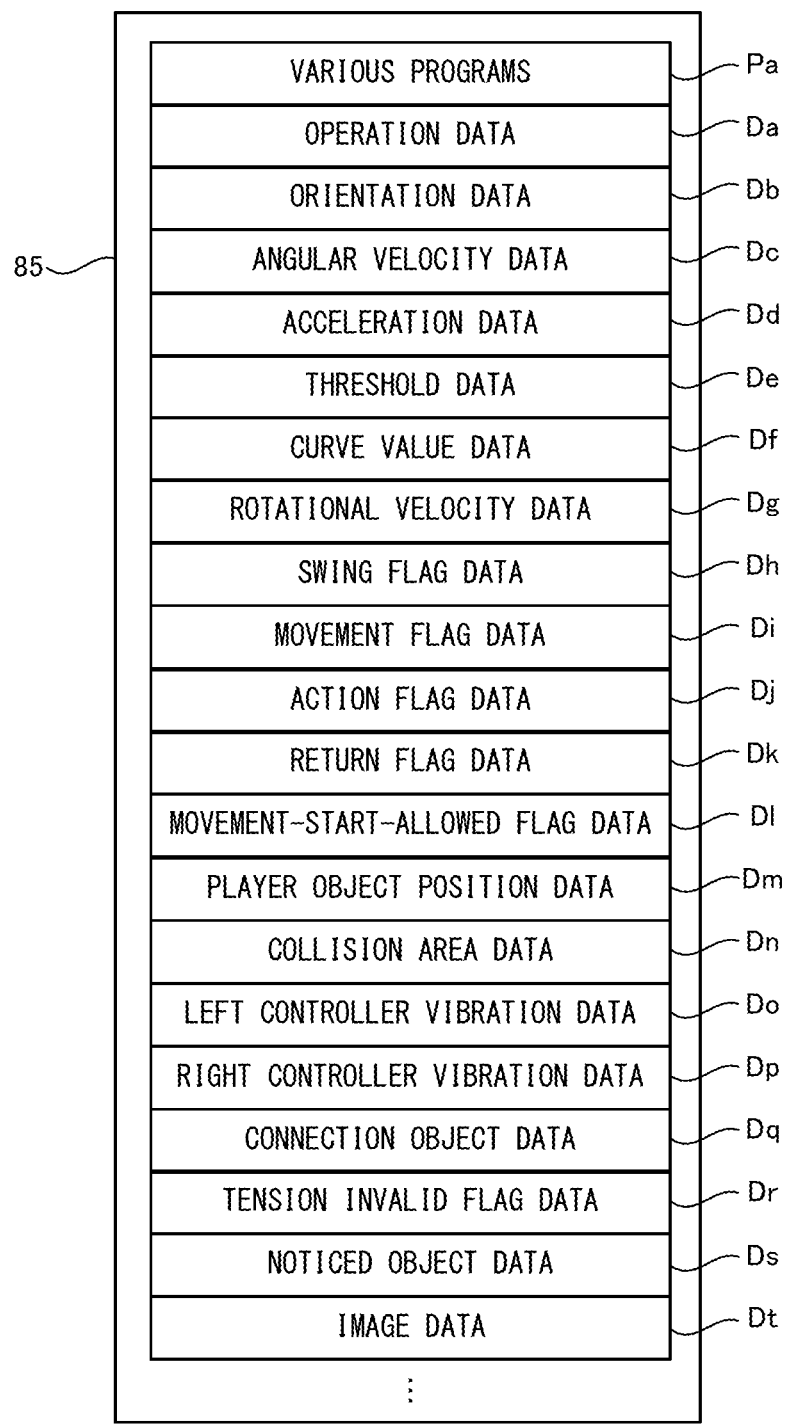
FIG. 27 is a diagram showing a non-limiting example of a data area set in a DRAM 85 of the main body apparatus 2 according to an exemplary embodiment.

Although not shown in FIG. 27, in the exemplary embodiment, among the various data shown in FIG. 27, data of the same type as the data set for the first player object P1 are also set for the second to fourth player objects P2 to P4. Further, data of the same type as the connection object data Dq set for the first connection object C1 are also set for the second connection object C2.

Figure 28:
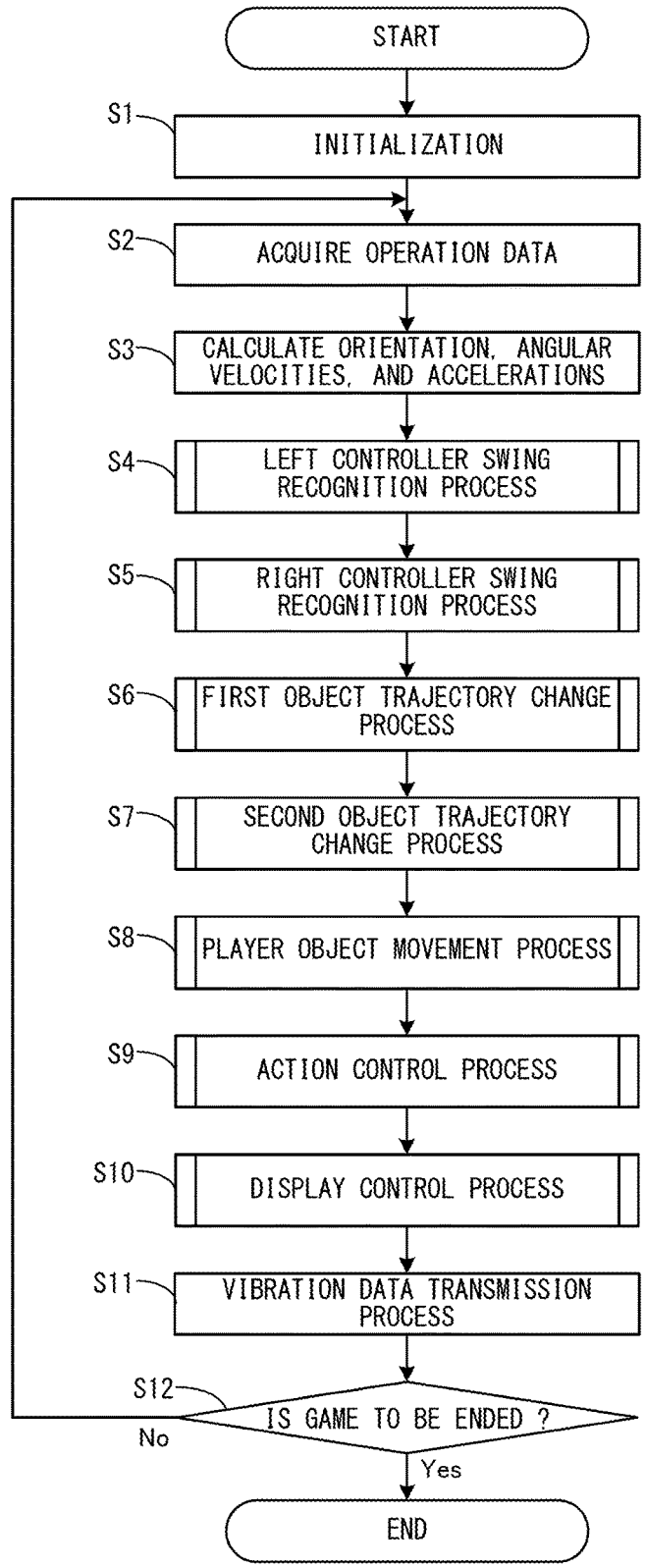
FIG. 28 is a flow chart showing a non-limiting example of game processing executed by the information processing system 1.
Figure 29:
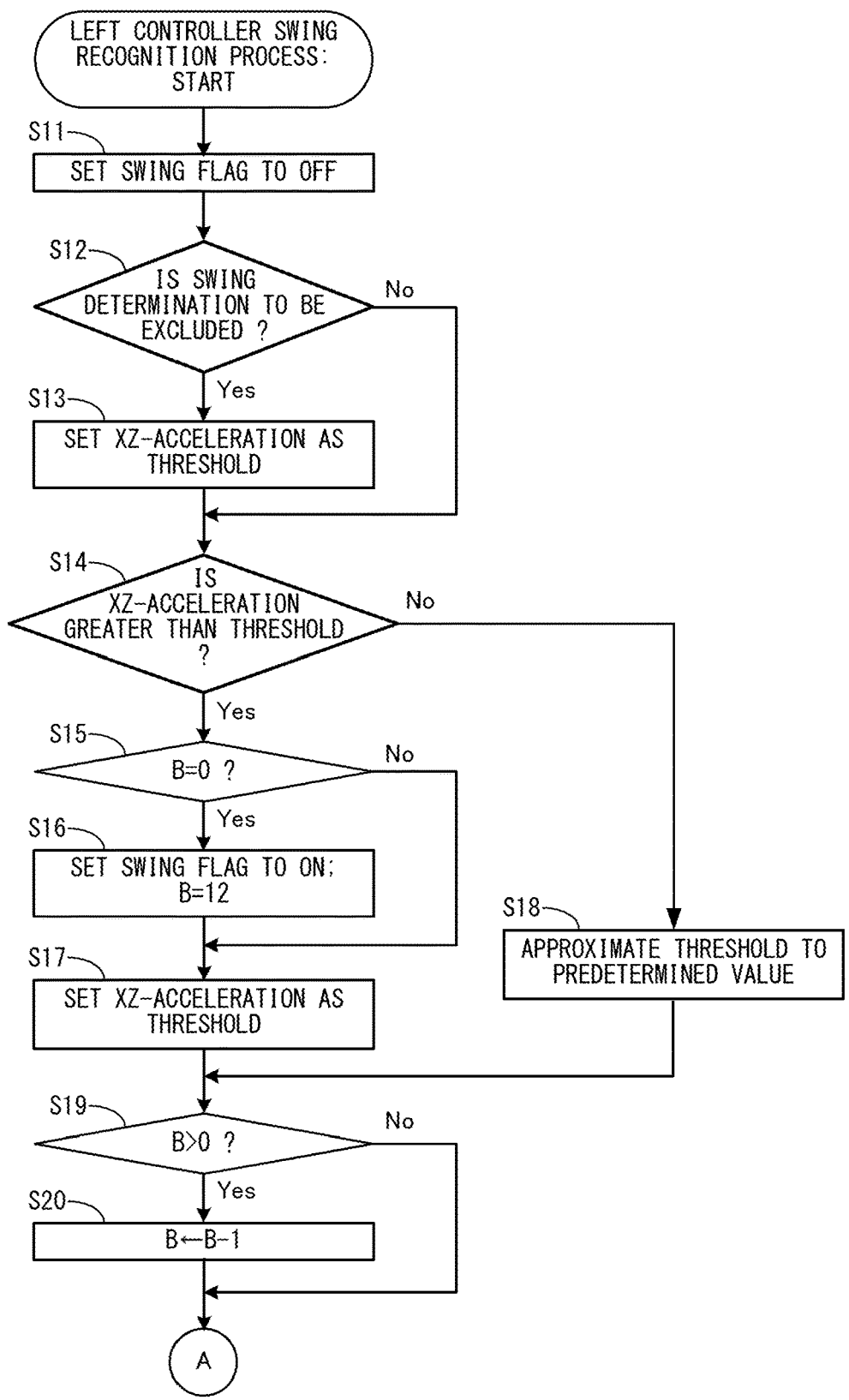
FIG. 29 is a subroutine showing non-limiting examples of the details of a controller swing recognition process performed in steps S4 and S5 in FIG. 28.
Figure 30:
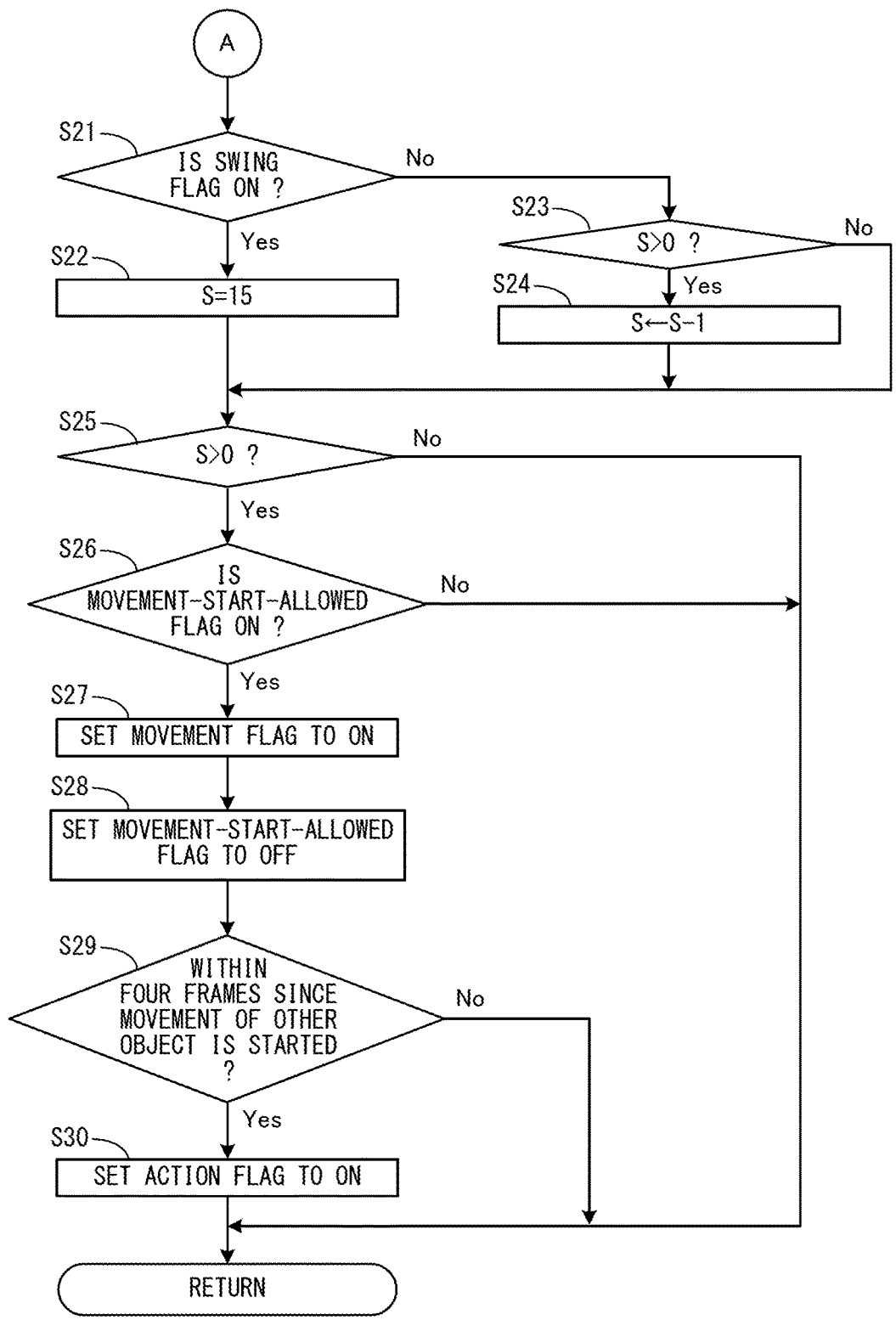
FIG. 30 is the subroutine showing non-limiting examples of the details of the controller swing recognition process performed in steps S4 and S5 in FIG. 28.
Figure 31:
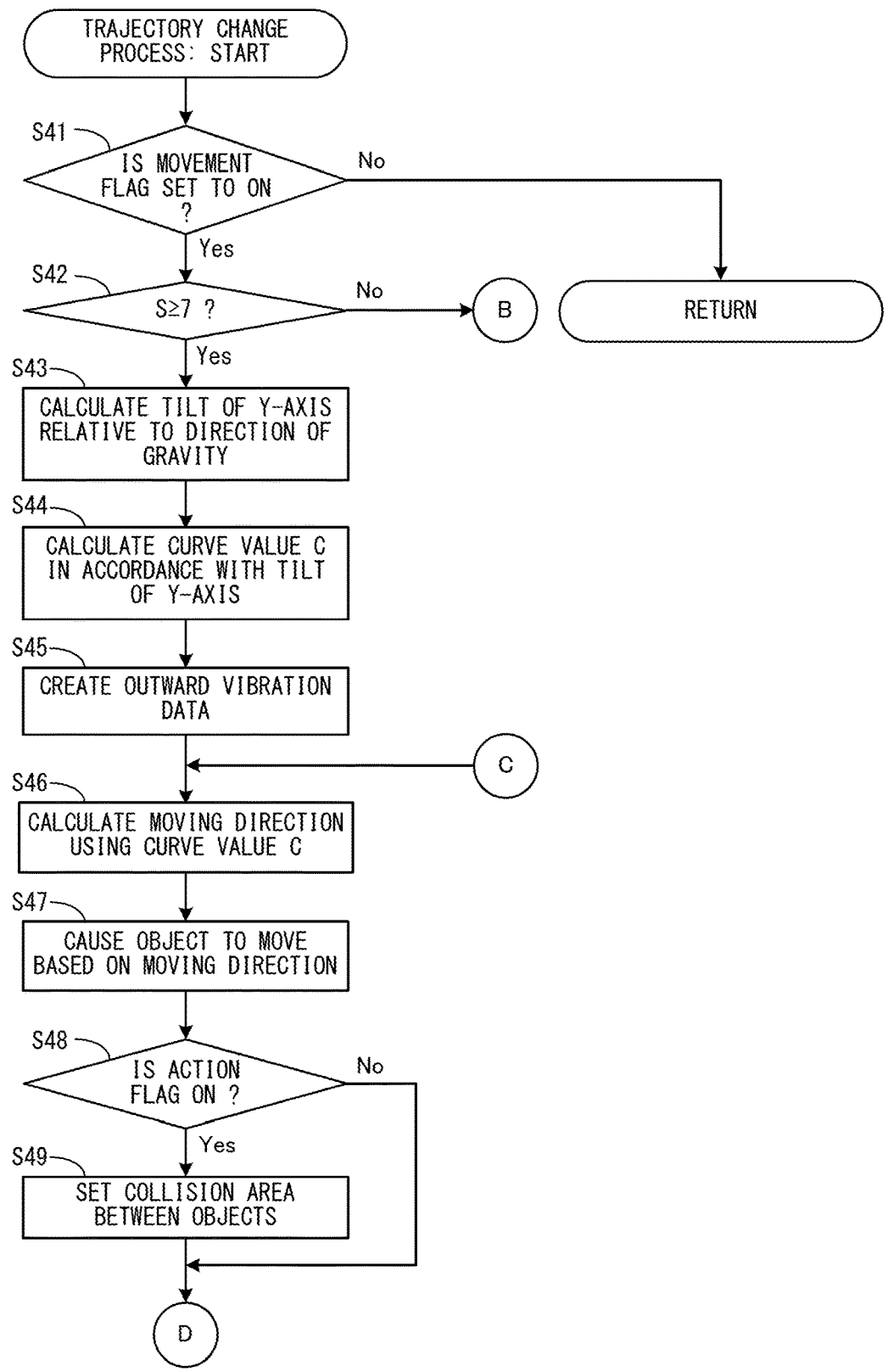
FIG. 31 is a subroutine showing non-limiting examples of the details of an object trajectory change process performed in steps S6 and S7 in FIG. 28.
Figure 32:
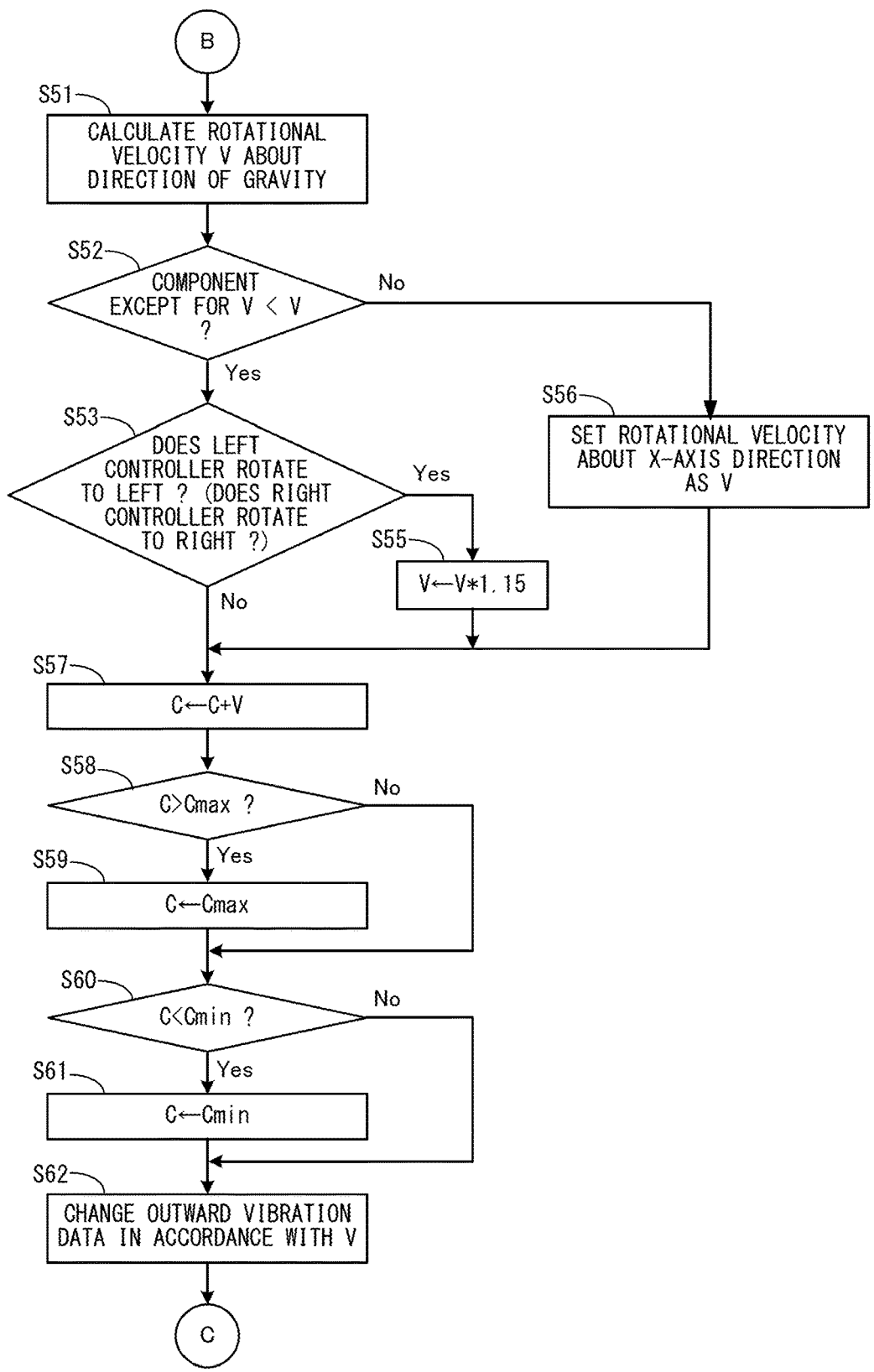
FIG. 32 is the subroutine showing non-limiting examples of the details of the object trajectory change process performed in steps S6 and S7 in FIG. 28.
Figure 33:
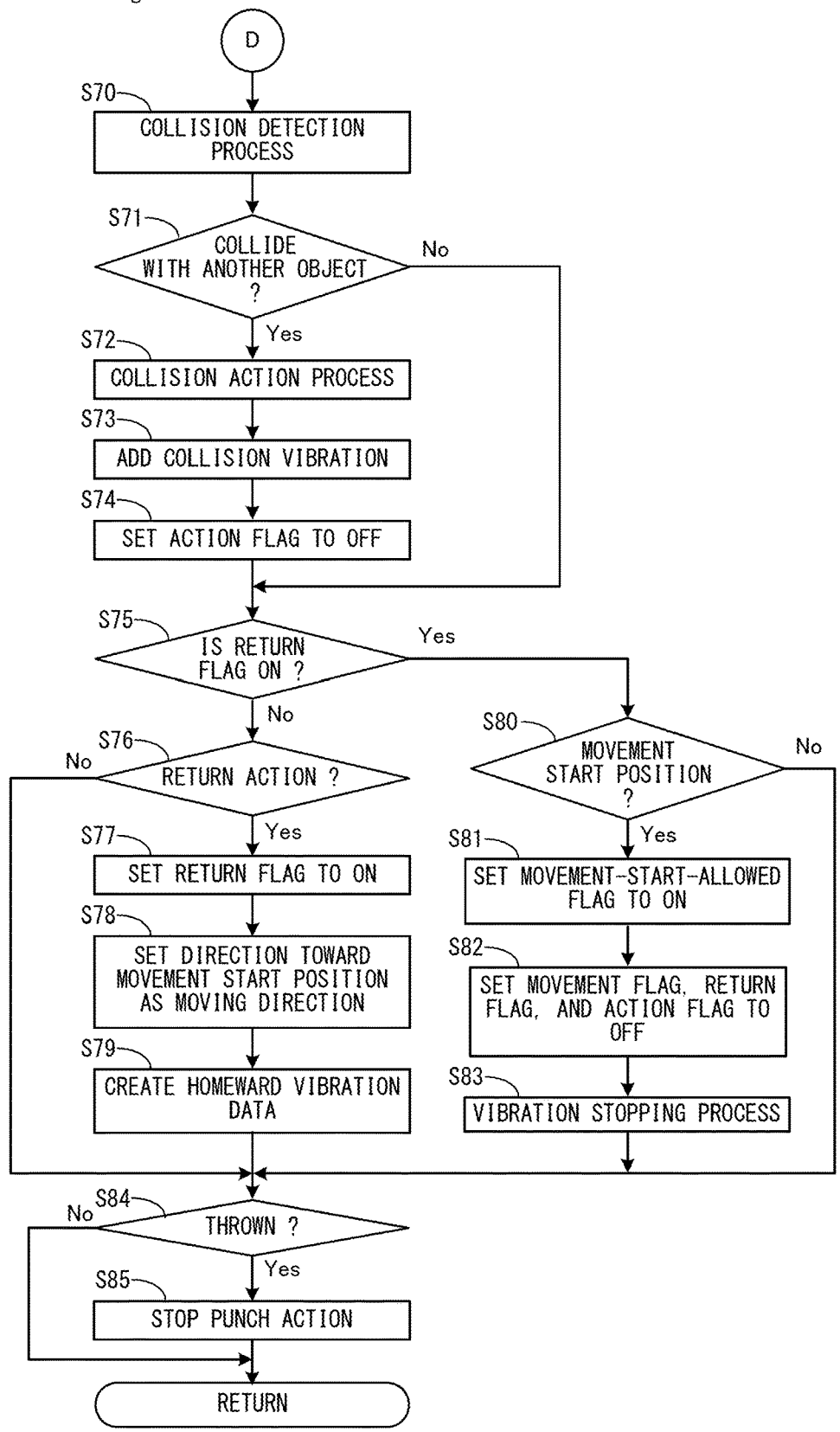
FIG. 33 is the subroutine showing non-limiting examples of the details of the object trajectory change process performed in steps S6 and S7 in FIG. 28.
Figure 34:
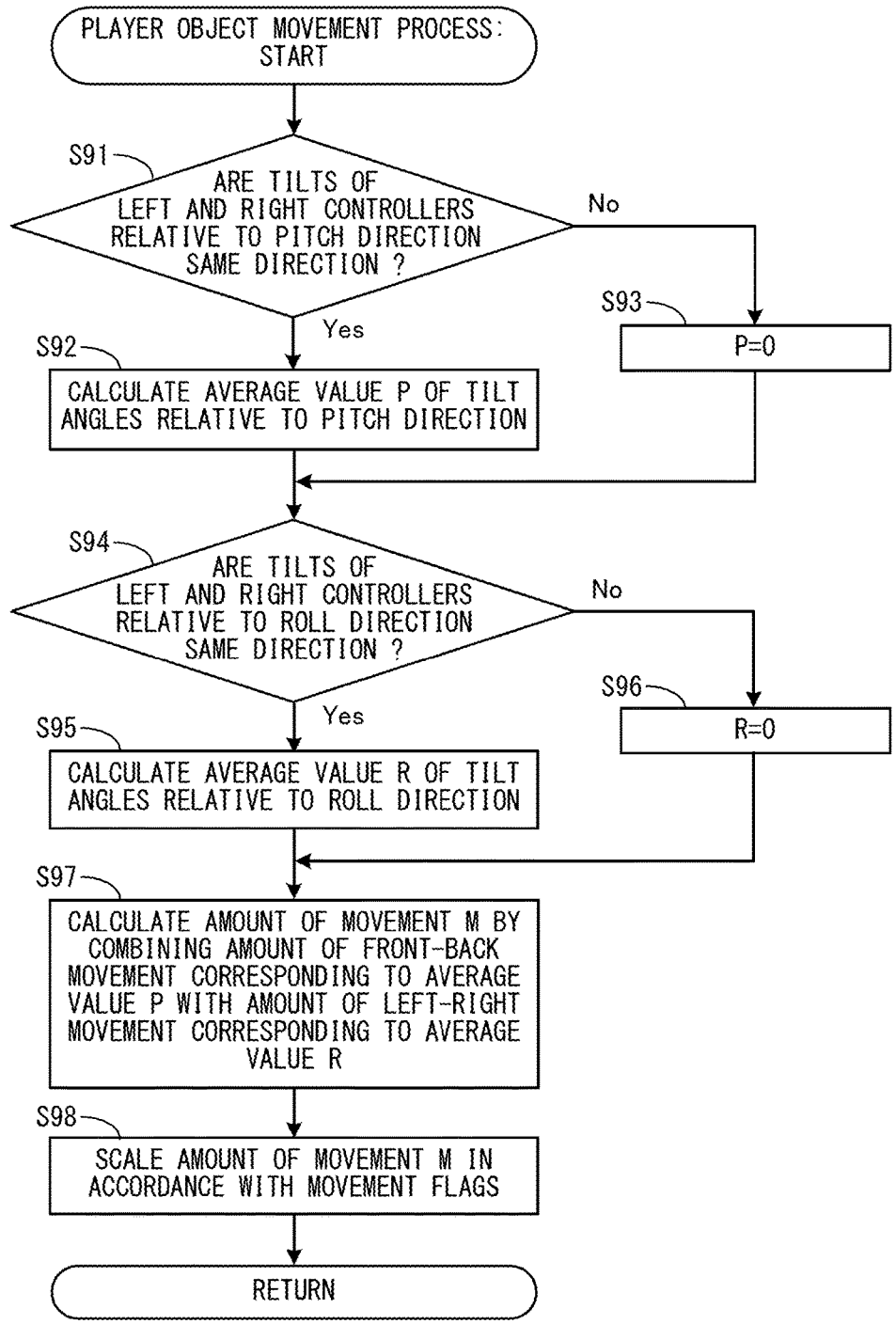
FIG. 34 is a subroutine showing non-limiting examples of the details of a player object movement process performed in step S8 in FIG. 28.
Figure 36:
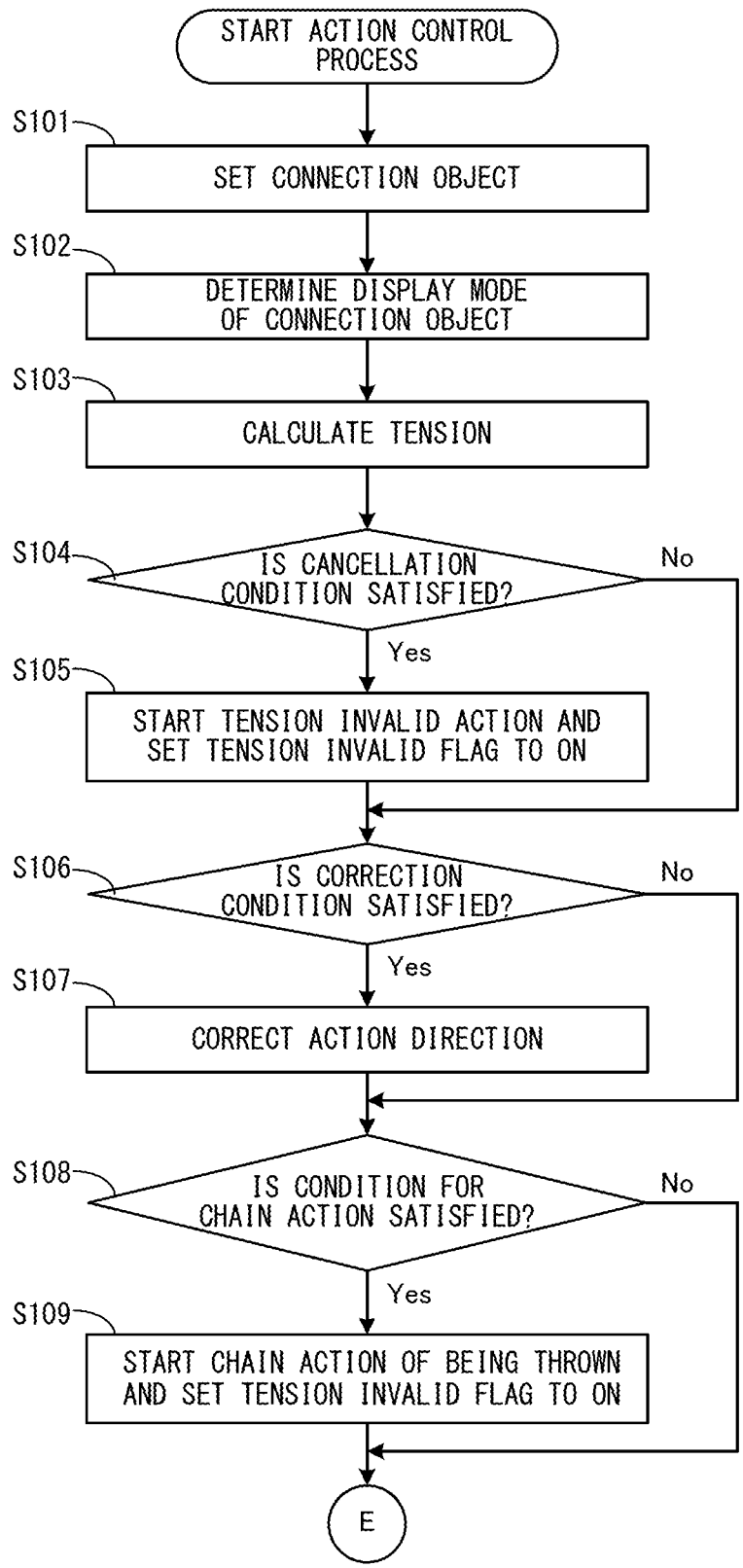
FIG. 36 is a subroutine showing non-limiting examples of the details of an action control process performed in step S9 in FIG. 28.
Figure 37:
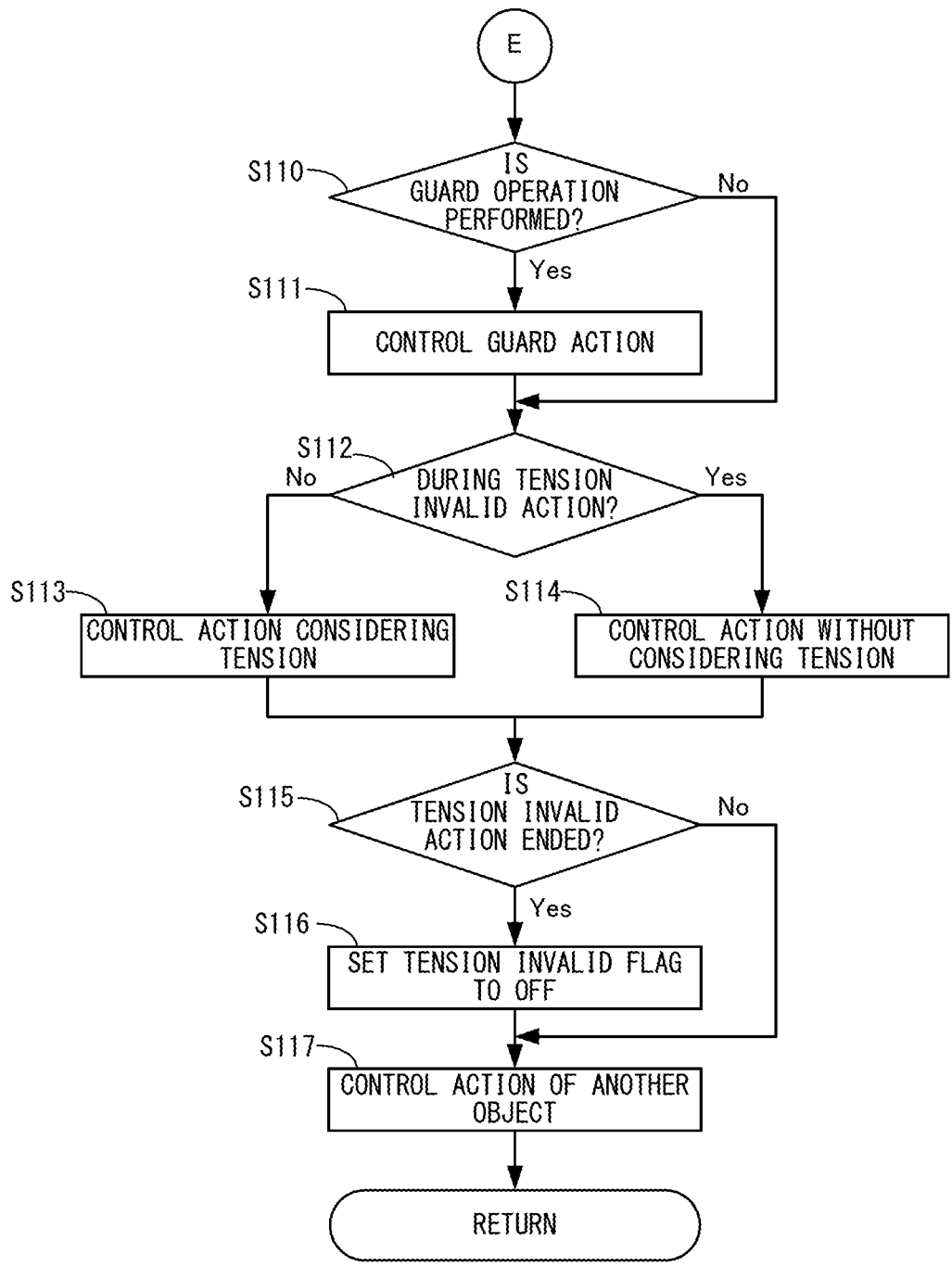
FIG. 37 is a subroutine showing non-limiting examples of the details of the action control process performed in step S9 in FIG. 28.
Figure 38:
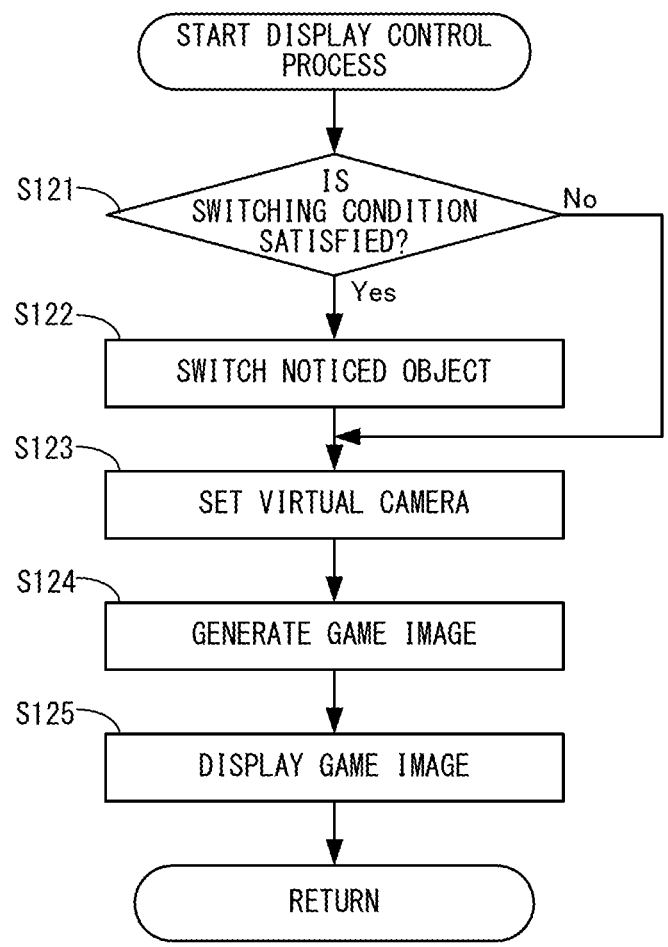
FIG. 38 is a subroutine showing non-limiting examples of the details of a display control process performed in step S10 in FIG. 28.

Next, a detailed example of information processing (game processing) according to the exemplary embodiment is described. FIG. 28 is a flow chart showing an example of game processing executed by the information processing system 1. FIGS. 29 and 30 are a subroutine showing examples of the details of a controller swing recognition process performed in steps S4 and S5 in FIG. 28. FIGS. 31 to 33 are a subroutine showing examples of the details of an object trajectory change process performed in steps S6 and S7 in FIG. 28. FIG. 34 is a subroutine showing examples of the details of a player object movement process performed in step S8 in FIG. 28. FIGS. 36 and 37 are a subroutine showing examples of the details of an action control process performed in step S9 in FIG. 28. FIG. 38 is a subroutine showing examples of the details of a display control process performed in step S10 in FIG. 28. In the exemplary embodiment, a series of processes shown in FIGS. 28 to 38 is performed by the CPU 81 executing the communication program and a predetermined application program (a game program) included in the various programs Pa. Further, the game processing shown in FIGS. 28 to 38 is started at any timing.

It should be noted that the processes of all of the steps in the flow charts shown in FIGS. 28 to 38 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU 81 performs the processes of all of the steps in the flow charts. Alternatively, a processor or a dedicated circuit other than the CPU 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 28 to 38 may be executed by the cooperation of a plurality of information processing apparatuses including the main body apparatus 2.

In FIG. 28, the CPU 81 performs initialization in the game processing (step S1), and the processing proceeds to the next step. For example, in the initialization, the CPU 81 initializes parameters for performing the processing described below. Further, in the initialization, the CPU 81 sets a game field for performing game play and sets the initial positions of the respective player objects on the game field, and initializes the moving directions of the left-fist object G1 and the right-fist object G2 to default values (e.g., front directions), thereby updating the player object data Dm. Further, the CPU 81 initializes the movement-start-allowed flag indicated by the movement-start-allowed flag data Dl to on. Further, the CPU 81 initializes the tension invalid flag indicated by the tension invalid flag data Dr to off. Further, the CPU 81 initializes the noticed object indicated by the noticed object data Ds to, for example, one of the enemy objects.

In the exemplary embodiment, a plurality of types of objects have been prepared in advance as each of the left-fist object and the right-fist object to be set on each player object. Before starting the game, a user can select a left-fist object and a right-fist object to be set on a player object that the user operates, from among the plurality of types of objects prepared. In the initial setting described above, the CPU 81 stores, in the DRAM 85, the player object data Dm including data indicating the types of the left-fist object and the right-fist object selected by the user.

Next, the CPU 81 acquires operation data from the left controller 3 and the right controller 4 and updates the operation data Da (step S2), and the processing proceeds to the next step.

Next, the CPU 81 calculates the orientation, the angular velocities, and the accelerations of each of the left controller 3 and the right controller 4 (step S3), and the processing proceeds to the next step. For example, the CPU 81 acquires data indicating accelerations generated in each of the left controller 3 and the right controller 4 from the operation data Da, calculates the direction of a gravitational acceleration acting on each of the left controller 3 and the right controller 4, and updates the orientation data Db using data indicating the direction. As a method for extracting a gravitational acceleration, any method may be used. For example, an acceleration component generated on average in each of the left controller 3 and the right controller 4 may be calculated and extracted as a gravitational acceleration. Then, the CPU 81 calculates, as the orientation of the left controller 3, the XYZ-axis directions of the left controller 3 with respect to the direction of the gravitational acceleration calculated for the left controller 3 and updates the orientation data Db using data indicating the orientation. Further, the CPU 81 calculates, as the orientation of the right controller 4, the XYZ-axis directions of the right controller 4 with respect to the direction of the gravitational acceleration calculated for the right controller 4 and updates the orientation data Db using data indicating the orientation. Further, the CPU 81 acquires data indicating angular velocities generated in each of the left controller 3 and the right controller 4 from the operation data Da, calculates angular velocities about the XYZ-axes of each of the left controller 3 and the right controller 4, and updates the angular velocity data Dc using data indicating the angular velocities. Further, the CPU 81 acquires data indicating accelerations generated in each of the left controller 3 and the right controller 4 from the operation data Da, removes the gravitational acceleration component from the accelerations in the XYZ-axis directions generated in each of the left controller 3 and the right controller 4, and updates the acceleration data Dd using data indicating the accelerations after the removal.

It should be noted that after the XYZ-axis directions with respect to the gravitational acceleration are calculated, the orientation of the left controller 3 or the right controller 4 may be updated in accordance with only the angular velocities about the XYZ-axes. However, to prevent the relationship between the orientation of the left controller 3 or the right controller 4 and the direction of the gravitational acceleration from shifting due to erroneous accumulation, the XYZ-axis directions relative to the direction of the gravitational acceleration may be calculated every predetermined cycle, and the orientation of the left controller 3 or the right controller 4 may be corrected.

Next, the CPU 81 performs a left controller swing recognition process (step S4), and the processing proceeds to the next step. With reference to FIGS. 29 and 30, a description is given below of the left controller swing recognition process performed in the above step S4.

In FIG. 29, the CPU 81 sets the swing flag set for the processing of the left controller 3 to off, thereby updating the swing flag data Dh (step S11). Then, the processing proceeds to the next step.

Next, the CPU 81 determines whether or not a swing determination regarding the left controller 3 is to be excluded (step S12). For example, when the left controller 3 is swung back, the CPU 81 excludes the swing determination. Then, when the swing determination regarding the left controller 3 is to be excluded, the processing proceeds to step S13. On the other hand, when the swing determination regarding the left controller 3 is to be made, the processing proceeds to step S14.

As a first example of the method for determining whether the left controller 3 is swung back, the CPU 81 acquires the angular velocity about the Y-axis of the left controller 3 with reference to the orientation data Db. When the left controller 3 rotates toward the near side (e.g., rotation in which the positive Z-axis direction is directed toward the near side), the determination is affirmative in the above step S12. As a second example of the method for determining the left controller 3 is swung back, the CPU 81 acquires the orientation of the left controller 3 with reference to the orientation data Db. When the left controller 3 is in the orientation in which the left controller 3 is tilted backward relative to the direction of the gravitational acceleration (e.g., the orientation in which the positive X-axis direction of the left controller 3 is directed above the horizontal direction in real space), the determination is affirmative in the above step S12. As a third example of the method for determining whether the left controller 3 is swung back, the CPU 81 acquires, with reference to the acceleration data Dd, the accelerations generated in the left controller 3. When the left controller 3 moves in the direction of the player (e.g., a negative X-axis direction component of the left controller 3 is included in the accelerations generated in the left controller 3), the determination is affirmative in the above step S12.

In step S13, when the magnitude of an acceleration generated in the left controller 3 at the current moment is greater than a threshold for the swing determination regarding the left controller 3, the CPU 81 sets as the threshold the magnitude of the acceleration generated in the left controller 3 at the current moment, thereby updating the threshold data De. Then, the processing proceeds to step S14. Here, as will be apparent later, in the exemplary embodiment, when the magnitude of, among the accelerations generated in the left controller 3, the acceleration (hereinafter referred to as an "XZ-acceleration") except for a Y-axis direction component exceeds the threshold, it is determined that the left controller 3 is swung. In the above step S13, when the magnitude of the acceleration generated in the left controller 3 at the current moment (i.e., the magnitude of, among the accelerations generated in the left controller 3, the acceleration except for a Y-axis direction component at the current moment) is greater than a predetermined value described later, the magnitude of the acceleration is set as a threshold used for the above swing determination, whereby the determination is negative in the above swing determination. That is, the above step S13 is a process executed when the left controller 3 is swung back. When the left controller 3 is swung back before and after the action of throwing a punch, it is possible to prevent an erroneous determination that the left controller 3 is swung so as to throw a punch.

In step S14, the CPU 81 determines whether or not the magnitude of the XZ-acceleration generated in the left controller 3 is greater than the above threshold. Then, when the magnitude of the XZ-acceleration generated in the left controller 3 is greater than the above threshold, the processing proceeds to step S15. On the other hand, when the magnitude of the XZ-acceleration generated in the left controller 3 is less than or equal to the above threshold, the processing proceeds to step S18. Here, in the exemplary embodiment, to determine whether or not the left controller 3 is swung so as to throw a punch, i.e., so as to move in the positive X-axis direction, the magnitude of, among the accelerations generated in the left controller 3, the XZ-acceleration except for a Y-axis direction component is compared with a predetermined value (the threshold set in the above step S13 or step S17 or S18 described later). Thus, in the above step S14, the CPU 81 acquires the accelerations generated in the X-axis direction and the Z-axis direction of the left controller 3 with reference to the acceleration data Dd and calculates the magnitude of the XZ-acceleration generated in the left controller 3 using the accelerations. Then, when the left controller 3 is not swung back, and if the magnitude of the XZ-acceleration exceeds a predetermined value or a threshold approximated to the predetermined value, it is determined that the left controller 3 is swung so as to throw a punch.

In step S15, the CPU 81 determines whether or not a temporary variable B is 0. Then, when the temporary variable B is 0, the processing proceeds to step S16. On the other hand, when the temporary variable B is not 0, the processing proceeds to step S17.

In step S16, the CPU 81 sets the swing flag set for the processing of the left controller 3 to on, thereby updating the swing flag data Dh. Then, the CPU 81 sets a predetermined number of frames as the temporary variable B, and the processing proceeds to step S17. As described above, when it is determined that the left controller 3 is swung so as to throw a punch, and the temporary variable B is 0, the swing flag set for the processing of the left controller 3 is set to on.

Here, in the above step S16, the predetermined number of frames set as the temporary variable B is used to temporarily set the period in which a next swing determination is excluded (the period in which the swing flag cannot be set to on) immediately after it is determined that the left controller 3 is swung so as to throw a punch and is set to, as an example, 12 frames in the exemplary embodiment. For example, even after it is determined that the left controller 3 is swung, the accelerations generated in the left controller 3 can continue to increase. In such a case, affirmative determinations continue in the swing determination in the above step S14. If, however, such affirmative determinations are all regarded as the state where the left controller 3 is swung so as to throw a punch, it is not possible to make an intended punch determination. Thus, in the exemplary embodiment, for a predetermined period (e.g., 12 frames) after it is determined that the left controller 3 is swung so as to throw a punch, this determination is excluded. It should be noted that, as another example, the period in which the accelerations generated in the left controller 3 continue to increase (specifically, the XZ-acceleration continues to increase) after it is determined that the left controller 3 is swung so as to throw a punch and the swing flag is set to on may be set as the period in which the swing flag cannot be set to on again.

In step S17, as a threshold for making the swing determination regarding the left controller 3, the CPU 81 sets the magnitude of the acceleration generated in the left controller 3 at the current moment, thereby updating the threshold data De. Then, the processing proceeds to step S19.

On the other hand, when it is determined in the above step S14 that the magnitude of the XZ-acceleration generated in the left controller 3 is less than or equal to the above threshold, the CPU 81 approximates the threshold for making the swing determination regarding the left controller 3 to a predetermined value determined in advance, thereby updating the threshold data De. Then, the processing proceeds to step S19. As an example, the CPU 81 approximates, by a predetermined amount, the threshold indicated by the threshold data De to the predetermined value to set a new threshold and updates the threshold data De using the threshold. As another example, the CPU 81 approximates, by a predetermined proportion, the threshold indicated by the threshold data De to the predetermined value to set a new threshold and updates the threshold data De using the threshold. As described above, the threshold for making the swing determination regarding the left controller 3 is approximated to a predetermined value determined in advance, whereby, even if the threshold increases by executing the above step S13 or step S17, it is possible to make the swing determination regarding the controller using an intended predetermined value after the lapse of a predetermined time.

In step S19, the CPU 81 determines whether or not the temporary variable B is greater than 0. Then, when the temporary variable B is greater than 0, the processing proceeds to step S20. On the other hand, when the temporary variable B is 0, the processing proceeds to step S21 (see FIG. 30).

In step S20, the CPU 81 subtracts 1 from the temporary variable B to set a new temporary variable B, and the processing proceeds to step S21 (see FIG. 30).

In FIG. 30, in step S21, the CPU 81 determines, with reference to the swing flag data Dh, whether or not the swing flag set for the processing of the left controller 3 is set to on. Then, when the swing flag set for the processing of the left controller 3 is set to on, the processing proceeds to step S22. On the other hand, when the swing flag set for the processing of the left controller 3 is set to off, the processing proceeds to step S23.

In step S22, the CPU 81 sets a predetermined number of frames as a temporary variable S for counting the number of processing frames after it is determined that the left controller 3 is swung so as to throw a punch, and the processing proceeds to step S25. Here, the predetermined number of frames set as the temporary variable S is a parameter corresponding to, when the left controller 3 enters the first movement-start-allowed state within a predetermined time after it is determined that the left controller 3 is swung so as to throw a punch, the predetermined time for performing the process of starting the movement of the left-first object G1 and is set to, as an example, 15 frames in the exemplary embodiment. Thus, even when the left controller 3 is not in the first movement-start-allowed state, but when the left controller 3 enters the first movement-start-allowed state within 15 frames after it is determined that the left controller 3 is swung so as to throw a punch, the process of starting the movement of the left-fist object G1 is performed.

On the other hand, when it is determined in the above step S21 that the swing flag is set to off, the CPU 81 determines whether or not the temporary variable S is greater than 0 (step S23). Then, when the temporary variable S is greater than 0, the processing proceeds to step S24. On the other hand, when the temporary variable S is 0, the processing proceeds to step S25.

In step S24, the CPU 81 subtracts 1 from the temporary variable S to set a new temporary variable S, and the processing proceeds to step S25.

In step S25, the CPU 81 determines whether or not the temporary variable S is greater than 0. Then, when the temporary variable S is greater than 0, the processing proceeds to step S26. On the other hand, when the temporary variable S is 0, the processing of this subroutine ends.

In step S26, the CPU 81 determines, with reference to the movement-start-allowed flag data Dl, whether or not the movement-start-allowed flag set for the processing of the left-fist object G1 is set to on. Then, when the movement-start-allowed flag set for the processing of the left-fist object G1 is set to on, the processing proceeds to step S27. On the other hand, when the movement-start-allowed flag set for the processing of the left-fist object G1 is set to off, the processing using this subroutine ends.

In step S27, the CPU 81 sets the movement flag set for the processing of the left-first object G1 to on, thereby updating the movement flag data Di. Then, the processing proceeds to the next step. As described above, not only when it is determined that the left controller 3 is swung so as to throw a punch, but also before a predetermined number of frames (e.g., 15 frames) elapses even after this determination, and when the movement-start-allowed flag is on (i.e., the first movement-start-allowed state), the movement flag set for the processing of the left-fist object G1 is set to on.

Next, the CPU 81 sets the movement-start-allowed flag set for the processing of the left-fist object G1 to off, thereby updating the movement-start-allowed flag data Dl (step S28). Then, the processing proceeds to the next step. As described above, when the movement flag indicating that the left-fist object G1 moves in the virtual space is set to on, the left controller 3 is not in the first movement-start-allowed state. Thus, the movement-start-allowed flag of the left-fist object G1 is set to off. It should be noted that in the state where the first player object P1 cannot attack the enemy object (e.g., the state where the first player object P1 is damaged and is temporarily down), the movement-start-allowed flag may be appropriately set to off, thereby setting the movement-start-allowed flag data Dl. In this case, when the first player object P1 recovers from the above state where the first player object P1 cannot attack the enemy object, the movement-start-allowed flag is set to on.

Next, the CPU 81 determines whether or not the current moment is within a predetermined number of frames (e.g., four frames) since the movement of the right-fist object G2 is started (step S29). For example, in step S5 described later, the CPU 81 performs a process similar to the left controller swing recognition process also on the right controller 4. Thus, when the current moment is within the predetermined number of frames since the movement flag set for the processing of the right controller 4 is set to on in step S5, the determination is affirmative in the above step S29. Then, when the current moment is within the predetermined number of frames since the movement of the right-fist object G2 is started, the processing proceeds to step S30. On the other hand, when the current moment is not within the predetermined number of frames since the movement of the right-fist object G2 is started, the processing using this subroutine ends.

In step S30, the CPU 81 sets the action flag to on, thereby updating the action flag data Dj. Then, the processing using this subroutine ends. As described above, when, within the predetermined number of frames since one of the left-fist object G1 and the right-fist object G2 starts moving, the other object starts moving, the action flag is set to on.

Referring back to FIG. 28, after the left controller swing recognition process in the above step S4, the CPU 81 performs a right controller swing recognition process (step S5), and the processing proceeds to the next step. It should be noted that the controller swing recognition process described with reference to FIGS. 29 and 30 is a subroutine used also in the right controller swing recognition process in the above step S5. That is, the left controller 3 and the left-fist object G1 as processing targets in the left controller swing recognition process are switched to the right controller 4 and the right-fist object G2, whereby it is possible to perform similar processing using the same subroutine. Thus, the details of the right controller swing recognition process in the above step S5 are not described here.

Next, the CPU 81 performs a first object trajectory change process (step S6), and the processing proceeds to the next step. With reference to FIGS. 31 to 33, a description is given of the first object trajectory change process performed in the above step S6.

In FIG. 31, the CPU 81 determines, with reference to the movement flag data Di, whether or not the movement flag set for the processing of the left-fist object G1 is set to on (step S41). Then, when the movement flag set for the processing of the left-fist object G1 is set to on, the processing proceeds to step S42. On the other hand, when the movement flag set for the processing of the left-fist object G1 is set to off, the processing using this subroutine ends.

In step S42, the CPU 81 determines whether or not the temporary variable S is equal to or greater than a predetermined number. Then, when the temporary variable S is equal to or greater than the predetermined number, the processing proceeds to step S43. On the other hand, when the temporary variable S is less than the predetermined number, the processing proceeds to step S51 (see FIG. 32). Here, in the above step S42, it is determined whether or not the current moment is in the period after it is determined that the left controller 3 is swung so as to throw a punch and before the punch operation ends. Then, different trajectory settings are made between when it is determined that the punch operation is being performed and when it is determined that the punch operation ends. Thus, the predetermined number used in the above step S42 may be set to the number of frames allowing the determination of the above period, and may be set such that, for example, the predetermined number=7.

In step S43, the CPU 81 calculates the tilt in the Y-axis direction of the left controller 3 relative to the direction of the gravitational acceleration, and the processing proceeds to the next step. For example, the CPU 81 acquires the orientation of the left controller 3 with reference to the orientation data Db and calculates the tilt in the Y-axis direction of the left controller 3 relative to the direction of the gravitational acceleration.

Next, in accordance with the tilt angle in the Y-axis direction of the left controller 3, the CPU 81 calculates the curve value C of the left-fist object G1, thereby updating the curve value data Df (step S44). Then, the processing proceeds to the next step. Here, the curve value C of the left-fist object G1 is a coefficient for changing the trajectory of the left-fist object G1 to the left and right and is set such that, for example, $-1 \leq C \leq 1$. Then, in the above step S44, when the Y-axis direction of the left controller 3 is tilted to the right relative to the positive X-axis direction, the curve value C is set to a positive value. When the Y-axis direction is tilted 40° to the right relative to the horizontal direction, the curve value C is set such that C=1. Even when the Y-axis direction is tilted 40° or more to the right relative to the horizontal direction, C is set to 1, which is the maximum value. Further, when the Y-axis direction of the left controller 3 is tilted to the left relative to the positive X-axis direction, the curve value C is set to a negative value. When the Y-axis direction is tilted 40° to the left relative to the horizontal direction, the curve value C is set such that C=−1. Even when the Y-axis direction is tilted 40° or more to the left relative to the horizontal direction, C is set to −1, which is the minimum value.

In the exemplary embodiment, as described above, there are a plurality of types of objects as the left-fist object G1 set on the first player object P1. The CPU 81 may calculate the curve value C so as to be different values depending on the type of the left-fist object G1. That is, the CPU 81 may calculate the curve value C by different calculation methods depending on the type of the left-fist object G1 (e.g., by using different calculation formulae depending on the type of the left-fist object G1). Thereby, since the degree of curve varies depending on the type of the left-fist object G1, variations of operation targets for the user can be increased, thereby enhancing the interest of the game.

Regarding the first objects, a parameter indicating a weight may be set for each of the types of the first object. At this time, when a certain player object and another player object both perform punch actions and thereby a first object of the certain player object and a first object of the other player object come into contact with each other, the behaviors of the first objects after the contact may be determined based on the types of the first objects. Specifically, in the above case, the behaviors of the first objects after the contact may be determined based on the weights of the first objects (more specifically, based on the relation between the weights of the two first objects that collide with each other). For example, in the above case, control may be performed such that, of the two first objects, the heavier first object blows away the lighter first object and continues to move. Alternatively, control may be performed such that, of the two first objects, the lighter first object is caused to fall down on the ground (i.e., the movement performed according to the punch operation is stopped). When the weights of the two first objects are the same, control may be performed such that both the two first objects are caused to fall down on the ground.

Next, the CPU 81 creates outward vibration data for vibrating the left controller 3 (step S45), and the processing proceeds to step S46. For example, in accordance with the type of the left-fist object G1, the CPU 81 generates an outward vibration waveform when the left-fist object G1 moves on the outward path, and based on the outward vibration waveform, the CPU 81 generates outward vibration data for vibrating the left controller 3, thereby updating the left controller vibration data Do. It should be noted that the CPU 81 may adjust the outward vibration waveform in accordance with the moving velocity or the moving direction of the left-first object G1 (the curve value C), or may generate the outward movement waveform regardless of the moving velocity or the moving direction. Further, the CPU 81 may add a vibration corresponding to the situation of the virtual space except for the left-fist object G1 to the vibration waveform. For example, the CPU 81 may add to the outward vibration waveform a vibration corresponding to the action of the first player object P1 or an impact imparted to the first player object P1, a vibration corresponding to the situation of the game field, a vibration corresponding to BGM or a sound effect, or the like. Further, when the action flag indicated by the action flag data Dj is set to on, the CPU 81 may generate outward vibration data (action outward vibration data) for the "both-hand punch action", thereby updating the left controller vibration data Dp.

On the other hand, as shown in FIG. 32, when the temporary variable S is less than the predetermined number, the CPU 81 calculates the rotational velocity V of the left controller 3 about the direction of the gravitational acceleration (step S51), and the processing proceeds to the next step. For example, with reference to the orientation data Db, the CPU 81 acquires the direction of the gravitational acceleration acting on the left controller 3. Further, with reference to the angular velocity data Dc, the CPU 81 acquires the angular velocities about the XYZ-axes generated in the left controller 3. Then, the CPU 81 calculates the angular velocity of the left controller 3 about the direction of the gravitational acceleration using the angular velocities about the XYZ-axes and the direction of the gravitational acceleration and calculates the rotational velocity V of the left controller 3 corresponding to the angular velocities, thereby updating the rotational velocity data Dg.

Next, the CPU 81 determines whether or not the magnitude of the rotational velocity V is greater than the magnitude of a component obtained by removing the angular velocities corresponding to the rotational velocity V from the angular velocities generated in the left controller 3 (step S52). Then, when the magnitude of the rotational velocity V is greater, the processing proceeds to step S53. On the other hand, when the magnitude of the rotational velocity V is smaller or the same, the processing proceeds to step S56. Here, the process of step S52 is performed to determine which direction the angular velocity generated in the left controller 3 is generated mainly about. It is determined whether the motion of the left controller 3 in real space is mainly a motion in the yaw direction, in which the left controller 3 rotates about the gravitational acceleration, or mainly a motion in which the left controller 3 rotates about another direction.

In step S53, based on the angular velocity of the left controller 3 about the direction of the gravitational acceleration, the CPU 81 determines whether or not the left controller 3 rotates in the left yaw direction about the direction of the gravitational acceleration. Then, when the left controller 3 rotates in the left yaw direction about the direction of the gravitational acceleration, the CPU 81 multiplies the rotational velocity V of the left controller 3 by 1.15, thereby updating the rotational velocity data Dg (step S55). Then, the processing proceeds to step S57. On the other hand, when the left controller 3 does not rotate in the left yaw direction about the direction of the gravitational acceleration, the processing immediately proceeds to step S57. Generally, considering the direction in which the wrist of a human being bends, it is more difficult to perform an operation in which the user rotates in the left yaw direction the left controller 3 held with their left hand, than an operation in which the user rotates the left controller 3 in the right yaw direction. The processes of steps S53 and S55 take into account the difficulty of such an operation. Even with the operation of moving the controller in the direction in which it is difficult to move the controller, it is possible to control the object similarly to another operation.

It should be noted that when this subroutine is used to perform the process of changing the trajectory of the right-fist object G2, then in the above step S53, it is determined whether or not the right controller 4 rotates in the right yaw direction about the direction of the gravitational acceleration. Then, when the right controller 4 rotates in the right yaw direction about the direction of the gravitational acceleration, the rotational velocity V of the right controller 4 is multiplied by 1.15, thereby updating the rotational velocity data Dg.

On the other hand, when the angular velocity corresponding to the rotational velocity V is smaller or the same, the CPU 81 calculates the rotational velocity V in accordance with the angular velocity about the X-axis direction of the left controller 3 (step S56), and the processing proceeds to step S57. For example, the CPU 81 acquires the angular velocity about the X-axis direction of the left controller 3 with reference to the angular velocity data Dc and calculates the rotational velocity V of the left controller 3 corresponding to the angular velocity, thereby updating the rotational velocity data Dg.

In step S57, the CPU 81 adds a value regarding the rotational velocity V of the left controller 3 to the curve value C of the left-fist object G1 to calculate a new curve value C, and the processing proceeds to the next step. For example, the CPU 81 acquires the curve value C of the left-fist object G1 and the rotational velocity V of the left controller 3 with reference to the curve value data Df and the rotational velocity data Dg and updates the curve value data Df using a new curve value C of the left-fist object G1 obtained by adding a value corresponding to the rotational velocity V to the curve value C.

Next, the CPU 81 determines whether or not the curve value C of the left-fist object G1 exceeds a predetermined maximum value Cmax (e.g., Cmax=1) (step S58). Then, when the curve value C of the left-fist object G1 exceeds the maximum value Cmax, the CPU 81 sets the maximum value Cmax as the curve value C of the left-fist object G1, thereby updating the curve value data Df (step S59). Then, the processing proceeds to step S60. On the other hand, when the curve value C of the left-fist object G1 does not exceed the maximum value Cmax, the processing immediately proceeds to step S60.

In step S60, the CPU 81 determines whether or not the curve value C of the left-first object G1 is smaller than a predetermined minimum value Cmin (e.g., Cmin=−1). Then, when the curve value C of the left-fist object G1 is smaller than the minimum value Cmin, the CPU 81 sets the minimum value Cmin as the curve value C of the left-fist object G1, thereby updating the curve value data Df (step S61). Then, the processing proceeds to step S62. On the other hand, when the curve value C of the left-fist object G1 is equal to or greater than the minimum value Cmin, the processing immediately proceeds to step S62.

In step S62, based on the rotational velocity V, the CPU 81 changes the outward vibration data for vibrating the left controller 3, and the processing proceeds to step S46 (see FIG. 31). For example, in accordance with the rotational velocity V calculated based on the angular velocities generated in the left controller 3, the CPU 81 calculates change parameters for changing the amplitude and/or the frequency of a vibration and changes the outward vibration data using the change parameters, thereby updating the left controller vibration data Do.

Figure 35:
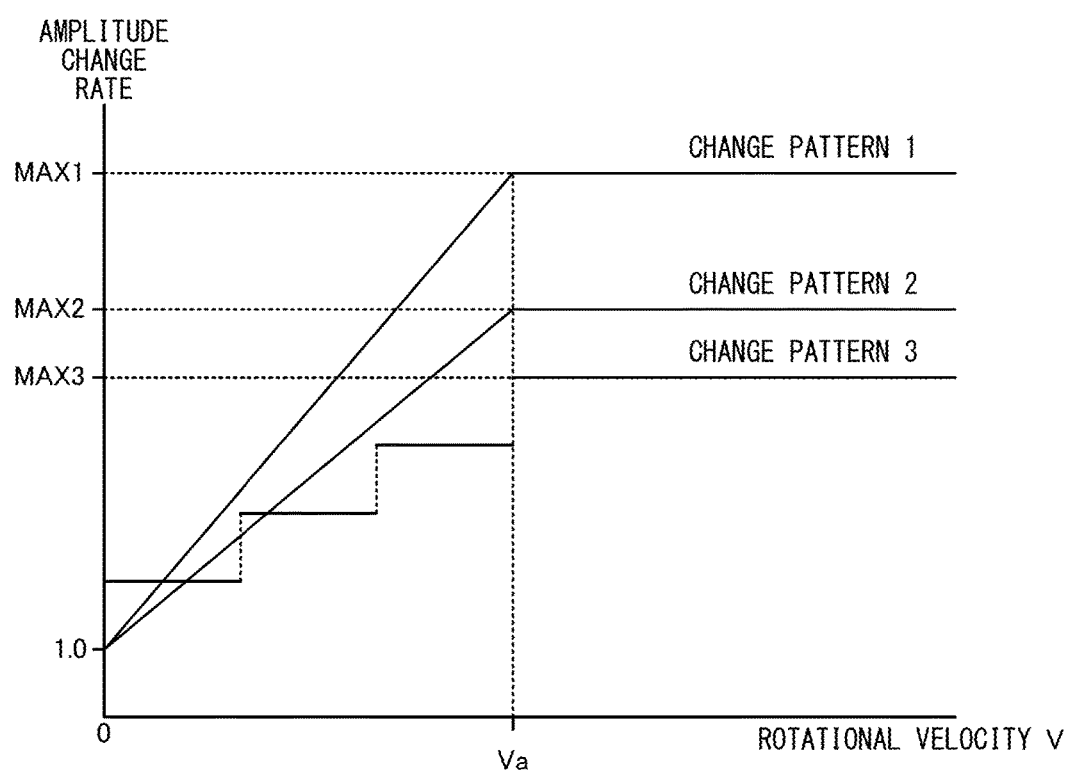
FIG. 35 is a diagram showing non-limiting examples of change patterns for changing the amplitude of an outward vibration waveform in accordance with a rotational velocity V.

For example, as shown in FIG. 35, when the amplitude of the outward vibration waveform is changed in accordance with the rotational velocity V, various change patterns are possible. For example, a change pattern 1 is a change pattern of the amplitude in which for a change in the rotational velocity V from 0 to Va, the amplitude change rate is linearly transformed from 1.0 to MAX1 (MAX1>1.0) and is constant at the amplitude change rate MAX1 at the rotational velocity Va or more. A change pattern 2 is a change pattern of the amplitude in which for a change in the rotational velocity V from 0 to Va, the amplitude change rate is linearly transformed from 1.0 to MAX2 (MAX1>MAX2>1.0) and is constant at the amplitude change rate MAX2 at the rotational velocity Va or more. A change pattern 3 is a change pattern of the amplitude which the amplitude change rate is transformed based on a table in which the amplitude change rate is gradually heightened from 1.0 to MAX3 (MAX3>1.0) in each certain range of the rotational velocity V from 0 to Va, and is constant at the amplitude change rate MAX3 at the rotational velocity Va or more.

When an amplitude change rate of 1.0 is calculated using the above change patterns, the amplitude of the outward vibration waveform is not changed, that is, the outward vibration data created in the above step S45 is set as it is as the left controller vibration data Do. Further, as is clear from the above, the rotational velocity V is calculated in accordance with the angular velocity of the left controller 3 about the direction of the gravitational acceleration (the angular velocity in the yaw direction) or the angular velocity about the X-axis direction of the left controller 3 (the angular velocity in the roll direction) and is a parameter based on a change in the motion or the orientation of the left controller 3. That is, when there is no change in the motion or the orientation of the left controller 3 in the yaw direction or the roll direction, the rotational velocity V is also 0. Thus, the amplitude change rate is also 1.0. That is, even when the amplitude of the outward vibration waveform changes by the generation of the rotational velocity V due to a change in the motion or the orientation of the left controller 3, the change in the motion or the orientation stops, whereby the amplitude change rate becomes 1.0, and the outward vibration waveform returns to the previous outward vibration waveform. Thus, a change in the outward vibration data in the above step S62 is used to temporarily change the outward vibration waveform generated in the above step S45. The change in the motion or the orientation of the left controller 3 stops, whereby the outward vibration data returns to the previous outward vibration waveform.

In the above step S62, the outward vibration data may be changed using various change patterns based on the rotational velocity V, and a change pattern to be selected may be set in accordance with the type of the left-fist object G1. Further, in FIG. 35, examples of the amplitude change rate for changing the amplitude so as to correspond to the rotational velocity V are exemplified. Alternatively, the frequency of the vibration may be changed using the same change pattern, or the frequency of the vibration may be changed using a change pattern different from that of the amplitude.

Further, in the above step S62, the outward vibration data is changed based on the rotational velocity V. Alternatively, the outward vibration data may be changed based on another parameter. For example, the outward vibration data may be changed based on the amount of change in the curve value C, or the outward vibration data may be changed based on the value of the curve value C itself. In the first case, it is possible to change the outward vibration data based on the amount of change in the curve value C subjected to the processes of the above steps S58 to S61, i.e., the amount of change in the curve value C limited to the minimum value Cmin and the maximum value Cmax.

As described above, in the exemplary embodiment, when it is determined that the punch operation is being performed (i.e., when the determination result in step S42 is positive), the CPU 81 calculates the curve value C based on the tilt of the left controller 3 (step S44). When it is determined that the punch operation ends (i.e., when the determination result in step S42 is negative), the CPU 81 calculates the curve value C based on the rotational velocity of the left controller 3 (step S57). Here, in the above two cases, a method for calculating the curve value C is optional. For example, in another exemplary embodiment, when it is determined that the punch operation is being performed, the curve value C may be calculated based on the rotational velocity of the left controller 3. When it is determined that the punch operation ends, the curve value C may be calculated based on the tilt of the left controller 3.

Referring back to FIG. 31, in step S46, the CPU 81 calculates the moving direction of the left-fist object G1 using the curve value C of the left-fist object G1, and the processing proceeds to the next step. For example, the CPU 81 acquires the curve value C of the left-fist object G1 with reference to the curve value data Df and acquires the moving direction of the left-first object G1 with reference to the player object data Dm. Then, when the acquired curve value C of the left-fist object G1 is a positive value, the CPU 81 changes the acquired moving direction of the left-fist object G1 to the right in accordance with the magnitude of the curve value and updates the player object data Dm using the changed moving direction of the left-fist object G1. Further, when the acquired curve value C of the left-fist object G1 is a negative value, the CPU 81 changes the acquired moving direction of the left-fist object G1 to the left in accordance with the magnitude of the curve value and updates the player object data Dm using the changed moving direction of the left-fist object G1.

It should be noted that when the left-fist object G1 moves on the homeward path in the virtual space for returning to the movement start position, then without changing the moving direction based on the curve value C of the left-fist object G1, the moving direction may be fixedly set to the direction in which the left-fist object G1 returns from the current position of the left-fist object G1 to the movement start position. The determination of whether or not the left-fist object G1 moves on the homeward path can be made based on whether or not the return flag described later is set to on.

Next, based on the moving direction of the left-fist object G1, the CPU 81 causes the left-fist object G1 to move (step S47), and the processing proceeds to the next step. For example, the CPU 81 acquires the position and the moving direction of the left-fist object G1 with reference to the player object data Dm, causes the left-fist object G1 to move from the position of the left-fist object G1 based on the moving direction, and updates the player object data Dm using the position of the moved left-fist object G1.

It should be noted that the moving velocity (the amount of movement) at which the left-fist object G1 is caused to move in the above step S47 may be such that, as an example, the moving velocity of the left-fist object G1 is set in accordance with a velocity corresponding to the type of the left-fist object G1. As another example, the moving velocity of the left-fist object G1 may be set in accordance with the magnitude of the acceleration when it is determined that the left controller 3 is swung so as to throw a punch. In this case, an initial velocity at which the left-fist object G1 starts moving may be set based on the magnitude of the XZ-acceleration when the swing flag is set to on, and the moving velocity after that may be appropriately changed based on the situation of the virtual space, a change in the moving direction, a predetermined algorithm, movement characteristics set for the left-fist object G1, or the like.

Next, the CPU 81 determines, with reference to the action flag data Dj, whether or not the action flag is set to on (step S48). Then, when the action flag is set to on, the processing proceeds to step S49. On the other hand, when the action flag is set to off, the processing proceeds to step S70 (see FIG. 33).

In step S49, the CPU 81 sets the collision area A between the left-fist object G1 and the right-fist object G2, and the processing proceeds to step S70 (see FIG. 33). For example, the CPU 81 acquires the position of the left-fist object G1 and the position of the right-first object G2 with reference to the player object data Dm and sets the position in the virtual space, the shape, and the range of the collision area A based on these positions, thereby updating the collision area data Dn. When the moving direction of the left-fist object G1 (and the moving direction of the right-fist object G2) and the position after the movement are set in the state where the action flag is thus set to on, the collision area A is set between the left-fist object G1 and the right-fist object G2.

In FIG. 33, the CPU 81 performs a collision detection process (step S70), and the processing proceeds to the next step. For example, with reference to the respective player object data and the collision area data Dn, the CPU 81 determines collision in the virtual space between the left-fist object G1 and the collision area A, and another object (e.g., the enemy object) in the virtual space.

Next, the CPU 81 determines whether or not at least one of the left-fist object G1 and the collision area A collides with another object in the virtual space (step S71). Then, when at least one of the left-fist object G1 and the collision area A collides with another object, the processing proceeds to step S72. On the other hand, when neither of the left-fist object G1 and the collision area A collides with another object, the processing proceeds to step S75.

In step S72, the CPU 81 performs a collision action process on another object, and the processing proceeds to the next step. For example, when the left-fist object G1 collides with the enemy object, the CPU 81 imparts damage corresponding to the collision to the enemy object and also sets a predetermined action corresponding to the damage (i.e., the action of being flown described above). Further, when the collision area A collides with the enemy object, the CPU 81 imparts damage corresponding to the collision to the enemy object and also sets the "both-hand punch action" in which the left-fist object G1 and the right-fist object G2 are a set.

It should be noted that in the exemplary embodiment, not only in the period in which the left-fist object G1 moves toward the enemy object, but also in the period in which the left-fist object G1 returns toward the first player object P1, and when the left-fist object G1 collides with another object, the collision action process is performed. However, when the collision action process is performed on another object only in the period in which the left-fist object G1 moves toward the enemy object, then in the period in which the left-fist object G1 returns toward the first player object P1 (the state where the return flag is on), it may be always determined in the above step S71 that the left-fist object G1 does not collide with another object, and the collision action process may not be performed.

Next, the CPU 81 adds a collision vibration (step S73), and the processing proceeds to the next step. For example, the CPU 81 generates a collision vibration waveform corresponding to the situation where the left-fist object G1 collides with another object. Then, the CPU 81 combines the collision vibration waveform with the vibration waveform indicated by the left controller vibration data Do to generate a new vibration waveform and updates the left controller vibration data Do using the new vibration waveform.

Next, the CPU 81 sets the action flag to off, thereby updating the action flag data Dj. The CPU 81 also sets the collision area data Dn to the state where there is no collision area (e.g., Null) (step S74), and the processing proceeds to step S75. As described above, when the action of any one of the left-fist object G1, the right-fist object G2, and the collision area A colliding with another object is set, the action flag is set to off, and also setting data regarding the collision area is erased.

In step S75, the CPU 81 determines, with reference to the return flag data Dk, whether or not the return flag set for the processing of the left-fist object G1 is set to on. Then, when the return flag set for the processing of the left-fist object G1 is set to off, the processing proceeds to step S76. On the other hand, when the return flag set for the processing of the left-first object G1 is set to on, the processing proceeds to step S80.

In step S76, the CPU 81 determines whether or not the left-fist object G1 performs the action of moving on the homeward path in the virtual space for returning to the movement start position. For example, the condition that the left-fist object G1 reaches a position a predetermined distance away from the movement start position, or the condition that a predetermined time elapses after the left-fist object G1 passes through the position of the enemy object, or the condition that a predetermined time elapses after the left-fist object G1 or the collision area A collides with another object, or the like is satisfied, it is determined that the left-first object G1 performs the action of moving on the homeward path. Then, when the left-fist object G1 performs the action of moving on the homeward path, the processing proceeds to step S77. On the other hand, when the left-fist object G1 does not perform the action of moving on the homeward path, the processing proceeds to step S84.

In step S77, the CPU 81 sets the return flag set for the processing of the left-fist object G1 to on, thereby updating the return flag data Dk. Then, the processing proceeds to the next step. As described above, when the action of the left-fist object G1 moving on the homeward path is set, the return flag set for the processing of the left-fist object G1 is set to on.

Next, the CPU 81 sets a direction toward the movement start position as the moving direction of the left-fist object G1 (step S78), and the processing proceeds to the next step. For example, the CPU 81 calculates a direction from the current position of the left-fist object G1 to the movement start position as the moving direction of the left-fist object G1 with reference to the player object data Dm, and updates the player object data Dm using this moving direction. It should be noted that the moving direction of the left-fist object G1 set in the above step S78 may be set to a direction along an object joined to the left-fist object G1 (e.g., an extended arm object of the first player object P1), or may be set to return on the trajectory when the left-fist object G1 moves from the movement start position.

Next, the CPU 81 creates homeward vibration data for vibrating the left controller 3 (step S79), and the processing proceeds to step S84. For example, in accordance with the type of the left-fist object G1, the CPU 81 generates a homeward vibration waveform when the left-fist object G1 moves on the homeward path, and based on the homeward vibration waveform, the CPU 81 generates homeward vibration data for vibrating the left controller 3, thereby updating the left controller vibration data Do. It should be noted that the CPU 81 may adjust the homeward vibration waveform in accordance with the moving velocity or the moving direction of the left-fist object G1, or may generate the homeward movement waveform regardless of the moving velocity or the moving direction. Further, the CPU 81 may add a vibration corresponding to the situation of the virtual space except for the left-fist object G1 to the vibration waveform. For example, the CPU 81 may add to the homeward vibration waveform a vibration corresponding to the action of the first player object P1 or an impact imparted to the first player object P1, a vibration corresponding to the situation of the game field, a vibration corresponding to BGM or a sound effect, or the like. Further, when the CPU 81 does not impart a vibration to the left controller 3 when the left-fist object G1 moves on the homeward path, the CPU 81 may set, in the left controller vibration data Do, vibration data indicating an amplitude of 0 or vibration data indicating that the left controller 3 is not to be vibrated.

On the other hand, when the return flag is set to on, the CPU 81 determines whether or not the left-fist object G1 returns to the movement start position (step S80). For example, with reference to the player object data Dm, when the position of the left-fist object G1 is set to the movement start position, the determination is affirmative in the above step S80. Then, when the left-fist object G1 returns to the movement start position, the processing proceeds to step S81. On the other hand, when the left-fist object G1 does not return to the movement start position, the processing proceeds to step S84.

In step S81, the CPU 81 sets the movement-start-allowed flag set for the processing of the left-fist object G1 to on, thereby updating the movement-start-allowed flag data Dl. Then, the processing proceeds to the next step. As described above, when the left-fist object G1 enters the state where the left-fist object G1 can move in the virtual space again, the current state is the first movement-start-allowed state. Thus, the movement-start-allowed flag of the left-fist object G1 is set to on. It should be noted that in the above step S81, when the left-fist object G1 returns to the movement start position, the movement-start-allowed flag of the left-fist object G1 is immediately set to on, and the current state is the first movement-start-allowed state. Alternatively, the first movement-start-allowed state may be started at another timing. For example, the first movement-start-allowed state may be started at the timing when a predetermined time (e.g., eight frames) elapses after the left-fist object G1 returns to the movement start position.

Next, the CPU 81 sets the movement flag and the return flag set for the processing of the left-fist object G1 to off, sets the action flag to off, and sets data regarding the collision area and the moving direction of the left-fist object G1 to the default values (step S82), and the processing proceeds to the next step. For example, the CPU 81 sets the movement flag and the return flag set for the processing of the left-fist object G1 to off, thereby updating the movement flag data Di and the return flag data Dk, respectively. Further, the CPU 81 sets the action flag to off, thereby updating the action flag data Dj. Further, the CPU 81 sets setting data regarding the collision area to the state where there is no collision area (e.g., Null), thereby updating the collision area data Dn. Further, the CPU 81 sets the moving direction of the left-fist object G1 to the default value (e.g., the front direction), thereby updating the player object data Dm.

Next, the CPU 81 performs the process of stopping the vibration of the left controller 3 (step S83), and the processing proceeds to step S84. For example, in accordance with the type of the left-fist object G1, the CPU 81 generates a vibration to occur when the left-first object G1 returns to the movement start position, and a vibration waveform for stopping the vibration after the vibration, and based on the vibration waveform, the CPU 81 generates vibration data for vibrating the left controller 3, thereby updating the left controller vibration data Do. It should be noted that when a vibration corresponding to the situation of the virtual space except for the movement of the left-fist object G1 is to be imparted even after the movement of the left-fist object G1 stops, the CPU 81 may add this vibration (a vibration corresponding to the action of the first player object P1 or an impact imparted to the first player object P1, a vibration corresponding to the situation of the game field, a vibration corresponding to BGM or a sound effect, or the like), thereby continuously vibrating the left controller 3.

In step S84, the CPU 81 determines whether or not the first player object P1 is thrown by another player object. Although the details will be described later (step S117), in this game processing, a series of processes in steps S2 to S9 are also executed for each of other player objects. Therefore, when a collision area A of another player object comes into contact with the first player object P1, the CPU 81 determines that the first player object P1 is thrown by the other player object. When the determination result in step S84 is positive, the process of step S85 is executed. On the other hand, when the determination result in step S84 is negative, the CPU 81 ends the processing of this subroutine.

In step S85, the CPU 81 sets stop of the punch action (here, an action to move the left-fist object G1) that is being performed by the first player object P1. Thus, in the exemplary embodiment, when the first player object P1 is thrown by the other player object while performing the punch action, the punch action is canceled even if the punch action is being performed. When stop of the punch action is set in step S85, the CPU 81, in step S113 or S114 described later, causes the first player object P1 to perform an action of returning the left-fist object G1 to the original position (in other words, the position before start of movement). After step S85, the CPU 81 ends the processing of this subroutine.

In another exemplary embodiment, also in a case where a player object receives a punch of another player object (e.g., an enemy object) while performing a punch action, the punch action of the player object may be canceled, as in the case of steps S84 and S85. That is, in step S84, the CPU 81 may determine whether or not the first player object P1 is thrown/punched by another player object.

A punch action performed by a player object may be prohibited in a case where a condition regarding execution of the punch action is satisfied. For example, a parameter indicating an endurance value may be set on a first object, and the CPU 81 may decrease the endurance value in accordance with the fact that the first object hits another object. At this time, the CPU 81 may prohibit the punch action by the player object for a predetermined time period (i.e., may prevents the player object from performing the punch action even when the player performs a punch operation) on the condition that the endurance value becomes 0. Thereby, strategic characteristics of the game can be enhanced, thereby enhancing the interest of the game.

Referring back to FIG. 28, after the first object trajectory change process in the above step S6, the CPU 81 performs a second object trajectory change process (step S7), and the processing proceeds to the next step. It should be noted that the object trajectory change process described with reference to FIGS. 31 to 33 is a subroutine used also in the second object trajectory change process in the above step S7. That is, the left controller 3 and the left-fist object G1 as processing targets in the first object trajectory change process are switched to the right controller 4 and the right-fist object G2, whereby it is possible to perform similar processing using the same subroutine. Thus, the details of the second object trajectory change process in the above step S7 are not described here.

Next, the CPU 81 performs a player object movement process (step S8), and the processing proceeds to the next step. With reference to FIG. 34, a description is given of the player object movement process performed in the above step S8.

In FIG. 34, the CPU 81 determines whether or not the tilts of the left controller 3 and the right controller 4 relative to the pitch direction in real space are the same direction (step S91). For example, with reference to the orientation data Db, when both the positive X-axis direction of the left controller 3 and the positive X-axis direction of the right controller 4 are an elevation direction or a depression direction with respect to the horizontal direction in real space, the determination is affirmative in the above step S91. Then, when the tilts of the left controller 3 and the right controller 4 relative to the pitch direction in real space are the same direction, the processing proceeds to step S92. On the other hand, when the tilts of the left controller 3 and the right controller 4 relative to the pitch direction in real space are not the same direction, the processing proceeds to step S93.

In step S92, the CPU 81 calculates an average value P of the tilt angles of the left controller 3 and the right controller 4 relative to the pitch direction in real space, and the processing proceeds to step S94. For example, with reference to the orientation data Db, the CPU 81 calculates the angle between the positive X-axis direction of the left controller 3 and the horizontal direction in real space, and the angle between the positive X-axis direction of the right controller 4 and the horizontal direction in real space and calculates the average value P of these angles. For example, each angle is calculated such that when the positive X-axis direction is a depression direction, the angle has a positive value, and when the positive X-axis direction is an elevation direction, the angle has a negative value.

On the other hand, when it is determined in the above step 91 that the tilts of the left controller 3 and the right controller 4 relative to the pitch direction in real space are not the same direction, the CPU 81 sets the average value P to 0 (step S93), and the processing proceeds to step S94.

In step S94, the CPU 81 determines whether or not the tilts of the left controller 3 and the right controller 4 relative to the roll direction in real space are the same direction. For example, with reference to the orientation data Db, when both the positive Y-axis direction of the left controller 3 and the positive Y-axis direction of the right controller 4 are an elevation direction or a depression direction with respect to the horizontal direction in real space, the determination is affirmative in the above step S94. Then, when the tilts of the left controller 3 and the right controller 4 relative to the roll direction in real space are the same direction, the processing proceeds to step S95. On the other hand, when the tilts of the left controller 3 and the right controller 4 relative to the roll direction in real space are not the same direction, the processing proceeds to step S96.

In step S95, the CPU 81 calculates an average value R of the tilt angles of the left controller 3 and the right controller 4 relative to the roll direction in real space, and the processing proceeds to step S97. For example, with reference to the orientation data Db, the CPU 81 calculates the angle between the positive Y-axis direction of the left controller 3 and the horizontal direction in real space, and the angle between the positive Y-axis direction of the right controller 4 and the horizontal direction in real space and calculates the average value R of these angles. For example, each angle is calculated such that when the positive Y-axis direction is a depression direction, the angle has a positive value, and when the positive Y-axis direction is an elevation direction, the angle has a negative value.

On the other hand, when it is determined in the above step 94 that the tilts of the left controller 3 and the right controller 4 relative to the roll direction in real space are not the same direction, the CPU 81 sets the average value R to 0 (step S96), and the processing proceeds to step S97.

In step S97, the CPU 81 calculates an amount of movement M by combining the amount of front-back movement corresponding to the average value P with the amount of left-right movement corresponding to the average value R, and the processing proceeds to the next step. For example, when the average value P is a positive value, the CPU 81 calculates, in accordance with the value of the average value P, the amount of front-back movement for moving forward in the virtual space. When the average value P is a negative value, the CPU 81 calculates, in accordance with the value of the average value P, the amount of front-back movement for moving backward in the virtual space. Further, when the average value R is a positive value, the CPU 81 calculates, in accordance with the value of the average value R, the amount of left-right movement for moving to the right in the virtual space. When the average value R is a negative value, the CPU 81 calculates, in accordance with the value of the average value R, the amount of left-right movement for moving to the left in the virtual space. Then, the CPU 81 calculates the amount of movement M relative to the virtual space by combining the amount of front-back movement with the amount of left-right movement.

Next, the CPU 81 scales the amount of movement M in accordance with the setting states of the movement flags (step S98), and the processing of this subroutine ends. For example, with reference to the movement flag data Di, when the movement flags set for the processing of the left-fist object G1 and the right-fist object G2 are both set to off, the CPU 81 sets the value of the amount of movement M as it is. Further, when only one of the movement flags set for the processing of the left-fist object G1 and the right-fist object G2 is set to on, the CPU 81 reduces the amount of movement M by a predetermined magnification (e.g., reduces the amount of movement M by 0.9 times). Further, when the movement flags set for the processing of the left-fist object G1 and the right-fist object G2 are both set to on, the CPU 81 sets the amount of movement M to 0. In step S113 described later, the action of the first player object P1 is controlled based on the amount of movement M set in the process of step S98.

Referring back to FIG. 28, after the player object movement process in step S8, the CPU 81 performs an action control process (step S9). The action control process is a process for controlling the actions of the respective player objects P1 to P4. Hereinafter, the action control process will be described with reference to FIGS. 36 and 37.

In step S101 shown in FIG. 36, the CPU 81 sets a connection object. That is, the CPU 81 calculates the position, the direction, and the length of the first connection object C1. The first connection object C1 is set in accordance with the method described in the above "[3-1. Outline of connection object]. Specifically, the first connection object C1 is set based on the positions of the first player object P1 and the second player object P2, which are indicated by the player object data stored in the DRAM 85. As described above, regarding the connection object, hitting with another object is not detected. Therefore, the CPU 81 sets the connection object based on only the player objects connected to each other by the connection object, regardless of whether the connection object comes into contact with another object. The CPU 81 stores, in the DRAM 85, the player object data Dm including data indicating the position, the direction, and the length of the calculated first connection object C1. It should be noted that the position, the direction, and the length of the second connection object C2 are calculated based on the positions of the third player object P3 and the fourth player object P4, which are indicated by the player object data, in a similar manner to that for the first connection object C1. Subsequent to step S101, a process in step S102 is executed.

In step S102, the CPU 81 determines the display mode of the connection object. That is, the CPU 81 determines the thickness of the connection object, based on the length of the connection object calculated in step S101, in accordance with the method described in the above "(Display mode of connection object)". Subsequent to step S102, a process in step S103 is executed.

In step S103, the CPU 81 calculates a tension to be applied to the first player object P1 by the first connection object C1. This tension is calculated in accordance with the method described in the above "[3-2. Tension caused by connection object]". Specifically, the CPU 81 calculates the direction and the magnitude of the tension, based on the direction and the length of the first connection object C1 which are indicated by the connection object data Dq stored in the DRAM 85. Further, the CPU 81 updates the tension data included in the player object data Dm so as to indicate the calculated tension. Subsequent to step S103, a process in step S104 is executed.

In step S104, the CPU 81 determines whether or not the cancellation condition described above is satisfied. The determination in step S104 is performed in accordance with the method described in the above "[3-3. Cancellation of restriction of connection object]". It should be noted that whether or not the action of being flown or the action of being thrown is performed can be determined based on the result of a process in step S117 described later (specifically, the process of step S117 finally executed). Whether or not the throwing action is performed can be determined based on the result of the process in step S72. When the determination result in step S104 is positive, a process in step S105 is executed. On the other hand, when the determination result in step S104 is negative, the process in step S105 is skipped and a process in step S106 is executed.

In step S105, the CPU 81 performs setting so as to cause the first player object P1 to start the tension invalid action. It should be noted that, in the exemplary embodiment, the player object data includes action data indicating the content of the action being performed by the player object (including the tension invalid action). After performing setting so as to cause the first player object P1 to perform the action, the CPU 81 updates the player object data Dm so as to include action data regarding the action. Further, in step S105, the CPU 81 sets the tension invalid flag to on. That is, the CPU 81 updates the tension invalid flag data Dr to the content indicating "ON". Subsequent to step S105, a process in step S106 is executed.

In step S106, the CPU 81 determines whether or not the condition for correcting the action direction of the first player object P1 is satisfied. That is, the CPU 81 determines whether or not the correction condition is satisfied, in accordance with the method described in the above "(Correction of action direction)". Information indicating the action contents and the action directions of the first and second player objects P1 and P2, which is used for the determination process in step S106, can be acquired with reference to the player object data. When the determination result in step S106 is positive, a process in step S107 is executed. On the other hand, when the determination result in step S106 is negative, the process in step S107 is skipped and a process in step S108 is executed.

In step S107, the CPU 81 corrects the action direction of the first player object P1. That is, the CPU 81 corrects the action direction in accordance with the method described in the above "(Correction of action direction)", and updates the player object data Dm so as to indicate the corrected action direction. Subsequent to step S107, the process in step S108 is executed.

In step S108, the CPU 81 determines whether or not the chain-action condition described above is satisfied. The determination in step S108 is performed in accordance with the method described in the above "(Chain action caused by connection object)". Information indicating the content of the action being performed by the second player object P2 and information indicating the length of the first connection object C1, which are used for the determination process in step S108, can be acquired with reference to the player object data and the connection object data Dq, respectively. When the determination result in step S108 is positive, a process in step S109 is executed. On the other hand, when the determination result in step S108 is negative, the process in step S109 is skipped and a process in step S110 shown in FIG. 37 is executed.

In step S109, the CPU 81 performs setting so as to cause the first player object P1 to start the chain action (specifically, the action of being thrown). That is, the CPU 81 updates the player object data Dm so as to include action data indicating the action of being thrown. Also in step S109, as in step S105, the CPU 81 sets the tension invalid flag to on. Subsequent to step S109, a process in step S110 shown in FIG. 37 is executed.

In step S110 shown in FIG. 37, the CPU 81 determines whether or not a guard operation for causing the first player object P1 to perform the guard operation is performed. Specifically, the CPU 81, with reference to the orientation data Db, determines whether or not both the left controller 3 and the right controller 4 are tilted inward at a predetermined angle or more. When the determination result in step S110 is positive, a process in step S111 is executed. On the other hand, when the determination result in step S110 is negative, the process in step S111 is skipped and a process in step S112 is executed.

In step S111, the CPU 81 performs setting so as to cause the first player object P1 to perform the guard action. That is, the CPU 81 updates the player object data Dm so as to include action data indicating the guard action. Subsequent to step S111, the process in step S112 is executed.

In step S112, the CPU 81 determines whether or not the first player object P1 is being performing the tension invalid action. The determination in step S112 is performed by, with reference to the tension invalid flag data, determining whether or not the tension invalid flag is set to on. When the determination result in step S112 is negative, a process in step S113 is executed. On the other hand, when the determination result in step S112 is positive, a process in step S114 is executed.

In step S113, the CPU 81 controls the action of the first player object P1, with restriction being imposed by the tension of the first connection object C1. In step S113, the CPU 81, based on the processing results in steps S4 to S8, causes the first player object P1 to perform the punch action and the moving action, or the CPU 81, based on the user operation for causing the first player object P1 to perform a predetermined action (e.g., the jumping action or the guard action), causes the first player object P1 to perform the predetermined action. Specifically, the CPU 81 determines the appearance state (specifically, the position, the direction, and the posture) of the first player object P1 in the current frame. At this time, the CPU 81 determines the appearance state while considering the tension. It should be noted that the CPU 81 updates the player object data Dm so as to indicate the determined appearance state of the first player object P1. Subsequent to step S113, a process in step S115 is executed.

In step S114, the CPU 81 controls the action of the first player object P1 without considering the tension. In step S114, the CPU 81 causes the first player object P1 to perform the tension invalid action described above, and determines the appearance state of the first player object P1 in the current frame. At this time, the CPU 81 determines the appearance state without considering the tension (in other words, with the tension being ignored). The CPU 81 updates the player object data Dm so as to indicate the determined appearance state of the first player object P1. Subsequent to step S114, the process in step S115 is executed.

In step S115, the CPU 81 determines whether or not the tension invalid action is finished. That is, the CPU 81 determines that the tension invalid action is finished when, as the result of the action control in step S114, the first player object P1 falls down on the ground or the throwing action of the first player object P1 is finished. When the determination result in step S115 is positive, a process in step S116 is executed. On the other hand, when the determination result in step S115 is negative, the process in step S116 is skipped and a process in step S117 is executed.

In step S116, the CPU 81 sets the tension invalid flag to off. That is, the CPU 81 updates the tension invalid flag data Dr to the content indicating "OFF". Subsequent to step S116, the process in step S117 is executed.

In step S117, the CPU 81 performs an action control regarding the other player objects. Specifically, the CPU 81 executes, for each of the second to fourth player objects P2 to P4, the processes (specifically, a series of processes in steps S2 to S8, and a series of processes in steps S103 to S116) for controlling the action thereof. After step S117, the CPU 81 ends the action control process shown in FIGS. 36 and 37.

Referring back to FIG. 28, after the action control process in step S9, the CPU 81 performs a display control process (step S10). The display control process is a process of generating a game image representing a game space, and displaying the game image on a display device (stationary monitor 6). Hereinafter, the display control process will be described with reference to FIG. 38.

In step S121 shown in FIG. 38, the CPU 81 determines whether or not a condition for switching the noticed object is satisfied. That is, when a switching operation is performed by the user or the automatic switching condition is satisfied, the CPU 81 determines that the condition for switching the noticed object is satisfied. On the other hand, when a switching operation is not performed by the user and the automatic switching condition is not satisfied, the CPU 81 determines that the condition for switching the noticed object is not satisfied. When the determination result in step S121 is positive, a process in step S122 is executed. On the other hand, when the determination result in step S121 is negative, the process in step S122 is skipped and a process in step S123 is executed.

In step S122, the CPU 81 switches the noticed object. That is, the CPU 81 updates the noticed object data Ds so as to indicate the noticed object after the switching. Subsequent to step S122, the process in step S123 is executed.

In step S123, the CPU 81 sets a virtual camera. Specifically, the CPU 81 sets the position, the direction, and the angle-of-view of the virtual camera, based on the player object data and the noticed object data Ds. In step S123, the direction of the virtual camera is set such that the virtual camera is directed in a direction from the first player object P1 side to the noticed object side. It should be noted that the virtual camera need not be exactly directed in the direction from the first player object P1 to the noticed object. The position and the angle-of-view of the virtual camera are set such that the first player object P1 and the noticed object are included in the field-of-view range of the virtual camera. Subsequent to step S123, a process in step S124 is executed.

In step S124, the CPU 81 generates a game image based on the virtual camera set through the process in step S123. For example, the CPU 81 arranges the respective player objects (including the left-fist object and the right-fist object) on the game field by using the player object data. Further, when the action flag indicating the action flag data Dj is set to on and the setting data regarding the collision area A is set in the collision area data Dn, the CPU 81 arranges an object corresponding to the collision area A between the left-fist object G1 and the right-fist object G2. The CPU 81 generates a game image indicating the game space in which the various objects are arranged as described above, as seen from the virtual camera. It should be noted that, at this time, the CPU 81 performs, for a connection object, rendering in accordance with the display mode determined in step S102. Subsequent to step S124, a process in step S125 is executed.

In step S125, the CPU 81 causes a display device (here, the stationary monitor 6) to display the game image generated by the process in step S124. After step S125, the CPU 81 ends the display control process. A processing loop of steps S2 to S12 shown in FIG. 28 is repeatedly executed such that the process in step S125 is executed once every predetermined time period (i.e., one frame time).

Referring back to FIG. 28, after the display control process in step D10, the CPU 81 executes a vibration data transmitting process (step S11). Specifically, the CPU 81 performs the process of, in each cycle of transmitting vibration data, transmitting vibration data corresponding to this cycle to the left controller 3 and the right controller 4, and the processing proceeds to the next step. For example, with reference to the left controller vibration data Do, the CPU 81 transmits vibration data for a vibration length corresponding to the transmission cycle to the left controller 3. Further, with reference to the right controller vibration data Do, the CPU 81 transmits vibration data for a vibration length corresponding to the transmission cycle to the right controller 4. The vibration data for vibrating the two controllers is thus transmitted to the left controller 3 and the right controller 4, whereby the left controller 3 and the right controller 4 receiving the vibration data vibrate based on vibration waveforms corresponding to the vibration data.

Next, the CPU 81 determines whether or not the game is to be ended (step S12). In the above step S12, examples of a condition for ending the game include: the fact that the result of the above game is settled; and the fact that the user performs the operation of ending the game. If the game is not to be ended, the processing returns to the above step S2, and the process of step S2 is repeated. If the game is to be ended, the processing of the flow chart ends. Hereinafter, the series of processes in steps S2 to S12 are repeatedly executed until it is determined in step S12 that the game is to be ended.

5. Function and Effect of Exemplary Embodiment, and Modifications

According to the exemplary embodiment described above, the game program causes a computer (specifically, the CPU 81 of the main body apparatus 2) included in an information processing apparatus for performing game processing in which a first group including a first object and a second object operated by a user competes with a second group including a third object and a fourth object, to function as means as follows:

- object arrangement means configured to arrange, in a virtual three-dimensional space, the first object, the second object, the third object, the fourth object, a first connection object connecting the first object and the second object, and a second connection object connecting the third object and the fourth object (steps S1, S124);
- action control means configured to control actions of the first object and the second object, with restriction being imposed on movements of the first object and the second object based on the first connection object, and control actions of the third object and the fourth object, with restriction being imposed on movements of the third object and the fourth object based on the second connection object (steps S113, S117);
- virtual camera control means configured to control a virtual camera arranged in the virtual three-dimensional space such that at least one of the third object and the fourth object is included in a field-of-view range (step S123);
- virtual space image generation means configured to generate a virtual space image acquired based on the virtual camera (step S124); and
- display control means configured to cause a display device to display the virtual space image (step S125).

As described above, in the exemplary embodiment, each player object is restricted in movement by a connection object. Here, since the exemplary embodiment provides a game in which a player object competes with an enemy object by performing a punch action, namely, an action of stretching a hand to move a first object, the player object performs the action at a certain distance from the enemy object. Therefore, even when the movement of the player object is restricted by the connection object, the game balance is not considerably degraded, and the restriction of movement is sufficiently acceptable by the user.

In the exemplary embodiment, the game in which the moving object operated by the user is the first object of the player object, is described as an example. However, the type of the moving object may be optional. The moving object may be an object the moving direction of which can be operated by the user while the object is moving, as in the exemplary embodiment, or may be an object the moving direction of which cannot be operated by the user after the movement is started. Further, the moving object may be an object that returns to the position of the player object as in the exemplary embodiment, or may be an object that does not return to the position of the player object but continues to move forward, or may be an object that disappears (e.g., is exploded) when coming into contact with another object.

In the exemplary embodiment, the case where the number of player objects included in one group is two, is described as an example. However, the number of player objects included in one group may be any number as long as it is not less than 2. For example, in another exemplary embodiment, three player objects may be included in one group. At this time, the main body apparatus 2 may use three connection objects similar to the connection object of the exemplary embodiment, and each connection object may connect any two of the three player objects included in the group. Alternatively, the connection object may be an object representing an area enclosing the three player objects. The area may have a spherical shape, or a shape as shown in FIG. 22.

According to the exemplary embodiments described above, the game program is defined as follows. The game program defined as follows can provide a novel game.

(1-1) A game program executed by a computer of an information processing apparatus, the game program causing the computer to function as:

first movement start means configured to start a process of moving a first portion of a player object arranged in a virtual space, the first portion being different from a main portion of the player object, in a direction away from the main portion, in accordance with a first operation of a user of the information processing apparatus;

second movement start means configured to start a process of moving a second portion of the player object, the second portion being different from the main portion and the first portion, in the direction away from the main portion, in accordance with a second operation of the user;

third movement start means configured to start a process of moving the first portion and the second portion together, in the direction away from the main portion, in accordance with a third operation of the user;

first movement change means configured to change the moving direction of the first portion in accordance with a fourth operation of the user performed after the movement of the first portion is started;

second movement change means configured to change the moving direction of the second portion in accordance with a fifth operation of the user performed after the movement of the second portion is started;

third movement change means configured to change the moving direction of the first portion and the second portion in accordance with a sixth operation of the user performed after the process of moving the first portion and the second portion together is started;

first return means configured to execute a process of moving the first portion so as to be gradually returned to the main portion, in a case where a first return condition is satisfied after the movement of the first portion is started in accordance with the first operation;

second return means configured to execute a process of moving the second portion so as to be gradually returned to the main portion, in a case where a second return condition is satisfied after the movement of the second portion is started in accordance with the second operation; and third return means configured to execute a process of moving the first portion and the second portion so as to be gradually returned to the main portion, in a case where a third return condition is satisfied after the movement of the first portion and the second portion is started in accordance with the third operation.

In the above description, "moving the first portion and the second portion together" means that the first portion and the second portion are moved in substantially the same direction at substantially the same speed, and the first portion and the second portion are not necessarily moved in a contact state.

(1-2) The game program according to the above (1-1), the game program further causing the computer to function as:

first processing means configured to, when one of the first portion and the second portion moving independently from each other collides with a target object, execute a first process for the target object; and second processing means configured to, when the first portion and the second portion moving together collide with the target object, execute a second process, different from the first process, for the target object.

(1-3) The game program according to the above (1-2), wherein when the state of the target object is changed from a first state to a second state, and if one of the first portion and the second portion collides with the target object, the first processing means makes the first process invalid, and even when the state of the target object is changed from the first state to the second state, if the first portion and the second portion collide with the target object, the second processing means executes the second process.

(1-4) The game program according to the above (1-1) or (1-2), the game program further causing the computer to function as state change means configured to execute a process of changing the state of the player object in accordance with a seventh operation of the user.

(1-5) The game program according to any one of the above (1-1) to (1-4), the game program further causing the computer to function as movement control means configured to move the player object in the virtual space in accordance with an eighth operation of the user.

(1-6) The game program according to any one of the above (1-1) to (1-5), the game program further causing the computer to function as display control means configured to, when the process of moving the first portion and the second portion together is started by the third movement start means, causes an effect image regarding the first portion and the second portion to be displayed.

(1-7) The game program according to any one of the above (1-1) to (1-6), wherein the third operation is an operation in which the first operation and the second operation are performed at substantially the same timing.

(1-8) The game program according to any one of the above (1-1) to (1-7), the game program further causing the computer to function as type determination means configured to determine, based on a selection instruction of the user, the type of the first portion to be set on the player object; and the first movement change means controls the movement of the first portion, with a movement control method being changed in accordance with the type of the first portion.

(1-9) The game program according to the above (1-8), the game program further causing the computer to function as determination means configured to, when the first portion that is moving collides with a third portion, of the target object, different from a main portion of the target object, determine whether or not the movement of the first portion should be stopped, based on the type of the first portion and the type of the third portion which are determined by the type determination means.

(2-1) A non-transitory computer-readable storage medium having, stored thereon, an information processing program executable by a computer included in an information processing apparatus configured to execute an information process based on an operation made by use of an operation device, the information processing program causing the computer to execute:

starting moving an object in a first movement direction in a virtual space based on first operation data including data representing position movement of the operation device; and controlling the object to move in a direction curved from the first movement direction based on second operation data including data representing a rotation or an attitude of the operation device after the position movement of the operation device.

(2-2) The non-transitory computer-readable storage medium according to the above (2-1), wherein controlling the object to move in the direction curved from the first movement direction includes controlling, based on the second operation data, the object to move so as to be curved, from the first movement direction, in a direction of the rotation of the operation device, the rotation being performed after the position movement of the operation device.

(2-3) The non-transitory computer-readable storage medium according to the above (2-1) or (2-2), wherein controlling the object to move in the direction curved from the first movement direction includes controlling the movement direction of the object by use of data representing a rotation around a gravitational direction in a real space, as the data representing the rotation of the operation device.

(2-4) The non-transitory computer-readable storage medium according to the above (2-1) or (2-2), wherein controlling the object to move in the direction curved from the first movement direction includes controlling the movement direction of the object by use of data representing a rotation of the operation device around a direction of the position movement of the operation device in a real space, as the data representing the rotation of the operation device.

(2-5) The non-transitory computer-readable storage medium according to the above (2-1) to (2-4), wherein controlling the object to move in the direction curved from the first movement direction includes controlling the movement direction of the object by use of data representing an inclination with respect to a gravitational direction in a real space, as the data representing the attitude of the operation device.

(2-6) The non-transitory computer-readable storage medium according to the above (2-1) to (2-5), wherein:

the first operation data is based on a detection result provided by an acceleration sensor included in the operation device; and the second operation data is based on a detection result provided by a gyrosensor or an acceleration sensor included in the operation device.

(2-7) The non-transitory computer-readable storage medium according to the above (2-1) to (2-5), wherein:

the first operation data is generated in accordance with a swinging operation of swinging the operation device; and the second operation data is generated in accordance with a curving operation by which curving with respect to the swinging operation is realized.

(2-8) The non-transitory computer-readable storage medium according to the above (2-1) to (2-5), wherein:

the first operation data includes data representing the rotation or the attitude of the operation device; and starting moving the object includes determining the first movement direction based on the data representing the rotation or the attitude of the operation device included in the first operation data.

(2-9) The non-transitory computer-readable storage medium according to the above (2-8), wherein:

the data representing the rotation of the operation device included in the first operation data is data representing an angular velocity generated in the operation device; and starting moving the object includes:

in the case where a magnitude of a component of the angular velocity around a gravitational direction in a real space is larger than a magnitude obtained as a result of subtracting the component around the gravitational direction from the angular velocity, determining the first movement direction by use of the component of the angular velocity around the gravitational direction; and in the case where the magnitude of the component of the angular velocity around the gravitational direction in the real space is smaller than, or equal to, the magnitude obtained as a result of subtracting the component around the gravitational direction from the angular velocity, determining the first movement direction by use of a component of the angular velocity around the direction of the position movement of the operation device in the real space.

(2-10) The non-transitory computer-readable storage medium according to the above (2-9), wherein starting moving the object includes, in the case where the first movement direction is determined by use of the component of the angular velocity around the direction of the position movement, determining the first movement direction while a value of degree, by which the first movement direction of the object is curved with respect to a magnitude of the data representing the rotation of the operation device, is made different in accordance with whether the component of the angular velocity around the direction of the position movement is of a positive value or a negative value.

(2-11) The non-transitory computer-readable storage medium according to the above (2-1) to (2-10), wherein:

the first movement direction is a front-rear direction as seen from a virtual camera generating a virtual image including the object; and controlling the object to move in the direction curved from the first movement direction includes controlling, based on the second operation data, the movement direction of the object to be curved from the first movement direction in an upward direction, a downward direction, a leftward direction or a rightward direction as seen from the virtual camera.

(2-12) The non-transitory computer-readable storage medium according to the above (2-1) to (2-11), wherein controlling the object to move in the direction curved from the first movement direction includes, in the case where the object moves in a direction of returning to a movement start position in the virtual space, not changing the movement direction of the object based on the second operation data based on the second operation data.

(2-13) The non-transitory computer-readable storage medium according to the above (2-1) to (2-12), wherein the object is a first of a player character in the virtual space.

(2-14) The non-transitory computer-readable storage medium according to the above (2-1) to (2-13), wherein:

the information processing apparatus is configured to execute an information process based on an operation made by use of two of the operation devices;

starting moving the object includes executing a process of starting moving each of two of the objects based on an operation made on each of the two operation devices, and controlling the object to move in the direction curved from the first movement direction includes executing a process of curving the movement direction of each of the two objects based on an operation made on each of the two operation devices.

(2-15) The non-transitory computer-readable storage medium according to the above (2-14), wherein the information processing program causes the computer to execute moving a player character including the object to move in the virtual space based on an operation made on each of the two operation devices.

In the exemplary embodiment described above, in addition to the game program described in the above (1-1) to (1-8) and (2-1) to (2-15), an information processing apparatus and an information processing system each including the respective means described in the above (1-1) to (1-8) and (2-1) to (2-15) are disclosed. Further, in the exemplary embodiment described above, a game processing method executed in the information processing apparatus according to the above (1-1) to (1-8) and (2-1) to (2-15) is disclosed.

In the exemplary embodiment described above, to vibrate the left controller 3 and the right controller 4, when the temporary variable S is equal to or greater than 7, outward vibration data is generated in step S195, and when the temporary variable S is less than 7, the outward vibration data is changed based on the rotational velocity V in step S222. Here, the temporary variable S is the following variable. When it is determined that the left controller 3 or the right controller 4 is swung so as to throw a punch, the temporary variable S is set to a predetermined number (step S22), and then, 1 is subtracted from the temporary variable S in accordance with the progress of the processing. That is, immediately after it is determined based on the accelerations that the left controller 3 and the right controller 4 are swung so as to throw a punch, the left controller 3 and the right controller 4 vibrate based on outward vibration data, and after that, vibrate based on vibration data changing based on the rotational velocity V. Thus, in the exemplary embodiment, it is possible to variedly vibrate the left controller 3 and/or the right controller 4 and also enable realistic game play. Further, vibration data for vibrating the left controller 3 and the right controller 4 can be changed in accordance with the motions and the orientations of the left controller 3 and/or the right controller 4 and can also be changed in accordance with an analog output by a tilt operation or the like on an analog stick. Thus, it is possible to perform flexible control corresponding to an operation form.

It should be noted that in the above exemplary embodiment, an example has been used where, when an acceleration generated in a controller satisfies a predetermined condition, predetermined outward vibration data is generated, and when an angular velocity generated in the controller in the period in which the outward vibration data is output satisfies a predetermined condition, vibration data for temporarily changing the amplitude and/or the frequency of a vibration is generated and output. Alternatively, vibration data may be generated in another form. For example, a parameter for determining whether or not the operation of throwing a punch using a controller may not be an acceleration generated in the controller, and may be determined using an angular velocity generated in the controller or both an acceleration and an angular velocity generated in the controller. Further, a condition for determining whether or not vibration data is to be temporarily changed may not be a condition based on an angular velocity generated in the controller, and may be a condition based on an acceleration generated in the controller or a condition based on both an acceleration and an angular velocity generated in the controller. Further, the above determination may be made based on an operation on an operation button or a direction indication section provided in the controller.

Further, a temporary change in vibration data corresponding to the rotational velocity V may occur multiple times. For example, as is apparent from the above flow charts, when the rotational velocity V is generated multiple times during the outward movement of the left-fist object G1 or the right-fist object G2, outward vibration data temporarily changes every time the rotational velocity V is generated. If the processing of the above flow charts is performed, it is possible to temporarily change outward vibration data multiple times.

Further, in the above exemplary embodiment, an example has been used where, when a change in the motion or the orientation of a controller satisfies a predetermined condition in the period in which predetermined outward vibration data is output, vibration data for temporarily changing the amplitude and/or the frequency of a vibration is output. Alternatively, a vibration parameter for making a temporarily change may be set in another form. As a first example, in accordance with the fact that a change in the motion or the orientation of a controller satisfies a predetermined condition when the controller intermittently vibrates in a predetermined cycle, vibration data may be output in which the period in which the cycle or the vibration is interrupted and/or the time in which the vibration is applied change. As a second example, when a change in the motion or the orientation of a controller satisfies a predetermined condition in the period in which predetermined outward vibration data is output, a single vibration having an amplitude greater than that of a vibration waveform based on the outward vibration data may be added a predetermined number of times, thereby outputting vibration data to be temporarily changed. As a third example, in a case where an object to which predetermined outward vibration data is output is a particular type of object, and even when a change in the motion or the orientation of a controller satisfies a predetermined condition, a vibration may not be changed, and the outward vibration data may continue to be output.

Further, in the above exemplary embodiment, an example has been used where outward vibration data is generated with the movement of the left-fist object G1 or the right-fist object G2 that starts moving in accordance with the motion of the left controller 3 or the right controller 4. Alternatively, the left-fist object G1 or the right-fist object G2 may start moving in accordance with another operation. For example, in accordance with a user operation on a predetermined operation section (e.g., an operation button or a direction indication section) provided in the left controller 3 or the right controller 4, the left-fist object G1 or the right-fist object G2 may start moving, and outward vibration data may be generated with the movement of the left-fist object G1 or the right-fist object G2.

Further, in the above exemplary embodiment, even during the movements of the left-fist object G1 and the right-fist object G2, the trajectories of the left-fist object G1 and the right-fist object G2 change due to an operation using the left controller 3 or the right controller 4. Thus, as a result, the above processing is based on the premise that the time from when the first movement-start-allowed state ends to when the current state enters a next first movement-start-allowed state, and the time from when the second movement-start-allowed state ends to when the current state enters a next second movement-start-allowed state are long. As described above, in a game where the time until a next movement can be started is long, game specifications are effective in which the operation of causing an object to start moving (a swing operation) is received in a preceding manner. However, it goes without saying that a game may be used where the time until a next movement can be started is long based on other specifications. For example, in the above exemplary game, the arm of the first player object P1 extends, whereby it is possible to control a motion during the movement of the first player object P1. Alternatively, the exemplary embodiment may be applied to a game where another part (e.g., the leg) of the body of the player object extends, or a game where an object (a whip object, a pleated object, or the like) owned by the player object extends. Yet alternatively, the exemplary embodiment may be applied to a game where an object (e.g., a radio-controlled object, a robot, a rocket punch, or the like) that can be remotely operated by the player object is operated during the movement of the player object, and when the object returns to a hand portion of the player object again, a next movement can be made. Yet alternatively, the exemplary embodiment may be applied to a game where an object (a bird, a boomerang, a bowling ball, or the like) once shot returns.

Further, the above "both-hand punch action" has been described using an example where the left-fist object G1 and the right-fist object G2 as a set perform a predetermined action. Alternatively, the left-fist object G1 and the right-fist object G2 as a set may simply move. In this case, as the movement form of the left-fist object G1 and the right-fist object G2 represented as a game image, the left-fist object G1 and the right-fist object G2 as a set simply move. Alternatively, when at least one of the left-fist object G1 and the right-fist object G2 collides with the enemy object, damage greater than that in the case where the left-fist object G1 or the right-fist object G2 solely collides with the enemy object may be imparted to the enemy object.

Further, in the above exemplary embodiment, an example has been used where in accordance with an operation using the left controller 3 or the right controller 4, the positions of the left-fist object G1 and the right-fist object G2 in the left-right direction in the virtual space are controlled, and a vibration temporarily changes in accordance with this operation. Alternatively, the positions of the left-fist object G1 and the right-fist object G2 in the up-down direction in the virtual space and/or the positions of the left-fist object G1 and the right-fist object G2 in the front-back direction may be configured to be controlled. In this case, the positions of the left-fist object G1 and/or the right-fist object G2 in the up-down direction in the virtual space may be configured to be controlled in accordance with the motions of the left controller 3 and/or the right controller 4 in the up-down direction in real space and/or the orientations of the left controller 3 and/or the right controller 4 in the pitch direction, and a vibration may temporarily change in accordance with this operation. Yet alternatively, the positions of the left-fist object G1 and/or the right-fist object G2 in the front-back direction in the virtual space may be configured to be controlled in accordance with the motions of the left controller 3 and/or the right controller 4 in the front-back/rear direction in real space and/or the orientations of the left controller 3 and/or the right controller 4 in the pitch direction, and a vibration may temporarily change in accordance with this operation. Yet alternatively, the orientations of the left-fist object G1 and the right-fist object G2 in the virtual space may be configured to be controlled in accordance with an operation using the left controller 3 or the right controller 4. In this case, the orientations of the left-fist object G1 and/or the right-fist object G2 relative to the roll direction in the virtual space may be configured to be controlled in accordance with the orientations of the left controller 3 and/or the right controller 4 in the roll direction in real space, and a vibration may temporarily change in accordance with this operation. Yet alternatively, the orientations of the left-fist object G1 and/or the right-fist object G2 relative to the pitch direction in the virtual space may be configured to be controlled in accordance with the orientations of the left controller 3 and/or the right controller 4 in the pitch direction in real space, and a vibration may temporarily change in accordance with this operation. Yet alternatively, the orientations of the left-fist object G1 and/or the right-fist object G2 relative to the yaw direction in the virtual space may be configured to be controlled in accordance with the orientations of the left controller 3 and/or the right controller 4 in the yaw direction in the real space, and a vibration may temporarily change in accordance with this operation.

Further, in the above exemplary embodiment, the method for detecting the motions and the orientations of the left controller 3 and the right controller 4 is merely illustrative, and the motions and the orientations of the left controller 3 and the right controller 4 may be detected using another method or other data. For example, the acceleration sensors 104 and 114 and the angular velocity sensors 105 and 115 in the above exemplary embodiment are examples of the orientation sensors for calculating the motions and the orientations of the left controller 3 and the right controller 4. For example, in another exemplary embodiment, the left controller 3 or the right controller 4 may include a magnetic sensor in addition to (or instead of) the acceleration sensor or the angular velocity sensor, and may calculate the motions and the orientations of the left controller 3 and the right controller 4 using magnetism. For example, in another exemplary embodiment, the main body apparatus 2 may capture the left controller 3 or the right controller 4 using an image capturing apparatus and calculate the motions and the orientations of the left controller 3 and the right controller 4 using the captured image. Further, in the above exemplary embodiment, a game image corresponding to an operation using the left controller 3 or the right controller 4 is displayed on the stationary monitor 6. Alternatively, the game image may be displayed on the display 12 of the main body apparatus 2. Further, a controller for controlling the actions of the left-fist object G1 and/or the right-fist object G2 may not only be a set of the left controller 3 and the right controller 4, but also be obtained by combining another controller with the left controller 3 and/or the right controller 4, or combining other controllers together.

Further, in the above exemplary embodiment, a game has been used where a plurality of objects are operated using a pair of the left controller 3 and the right controller 4. Alternatively, a game may be used where a single object is operated using a single controller. In this case, when a change in the motion or the orientation of the controller satisfies a predetermined condition in the period in which outward vibration data for vibrating the single controller is output in accordance with the movement of the single object, vibration data for temporarily changing the amplitude and/or the frequency of a vibration is output. Consequently, even in a game where a single object is operated using a single controller, it is possible to temporarily change the vibration of the single controller.

Further, in another exemplary embodiment, the main body apparatus 2 may be able to directly communicate with the stationary monitor 6. For example, the main body apparatus 2 and the stationary monitor 6 may be able to directly perform wired communication with each other, or directly perform wireless communication with each other. In this case, based on whether or not the main body apparatus 2 and the stationary monitor 6 can directly communicate with each other, the main body apparatus 2 may determine the display destination of an image.

Further, the analog sticks 32 and 52 are examples of an operation device capable of acquiring an operation detection result as an analog value and outputting analog operation data indicating the analog value. Alternatively, another operation device capable of acquiring an analog value may be provided in the left controller 3 or the right controller 4. For example, a press button capable of acquiring an analog value corresponding to the amount of pressing of the user pressing the button, or a touch panel or a touch pad capable of acquiring an analog value corresponding to the position where the user performs a touch may be provided in the left controller 3 or the right controller 4.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the information processing system 1 may be any apparatus, and may be a mobile game apparatus, any mobile electronic device (a PDA (Personal Digital Assistant), a mobile phone, a personal computer, a camera, a tablet, or the like) or the like. Further, the left controller 3 and/or the right controller 4 may be any apparatus, and may be any mobile electronic device (a PDA (Personal Digital Assistant), a mobile phone, a personal computer, a camera, a tablet, a mobile game apparatus, or the like) or the like.

Further, the above descriptions have been given using an example where the information processing system 1 performs information processing (game processing) and a communication process. Alternatively, another apparatus may perform at least some of the processing steps. For example, if the information processing system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the CPU 81 of the information processing system 1 executing a predetermined program. Alternatively, part or all of the processing of the flow charts may be performed by a dedicated circuit included in the information processing system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the information processing system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment described above can be used as, for example, a game system, a game apparatus, a game program, and the like, for the purpose of presenting a game situation in an easy-to-understand manner to a user.

What is claimed is:

1. A non-transitory computer-readable storage medium having stored therein a game program executed by a computer included in an information processing apparatus for performing game processing in which a first group including a first object and a second object operated by a user competes with a second group including a third object and a fourth object, the game program causing the computer to execute:

arranging, in a virtual three-dimensional space, the first object, the second object, the third object, the fourth object, a first connection object connecting the first object and the second object, and a second connection object connecting the third object and the fourth object;

controlling actions of the first object and the second object, with restriction being imposed on movements of the first object and the second object based on the first connection object, and controlling actions of the third object and the fourth object, with restriction being imposed on movements of the third object and the fourth object based on the second connection object;

controlling a virtual camera arranged in the virtual three-dimensional space such that at least one of the third object and the fourth object is included in a field-of-view range of the virtual camera;

generating a virtual space image acquired based on the virtual camera; and causing a display to display the virtual space image.

2. The storage medium according to claim 1, wherein the game program causes the computer to execute:

controlling the actions of the first object and the second object, with the restriction being imposed on the movements of the first object and the second object based on a state of the first connection object; and controlling the actions of the third object and the fourth object, with the restriction being imposed on the movements of the third object and the fourth object based on a state of the second connection object.

3. The storage medium according to claim 1, wherein the game program causes the computer to execute:

imposing the restriction on the movements of the first object and the second object by using a virtual first tension that is applied to the first object and the second object by the first connection object; and imposing the restriction on the movements of the third object and the fourth object by using a virtual second tension that is applied to the third object and the fourth object by the second connection object.

4. The storage medium according to claim 3, wherein the first tension in a case where a length of the first connection object is a first length is set to be greater than the tension in a case where the length of the first connection object is a second length shorter than the first length, and the second tension in a case where a length of the second connection object is the first length is set to be greater than the tension in a case where the length of the second connection object is the second length.

5. The storage medium according to claim 4, wherein the second direction is a vertical direction in the virtual three-dimensional space.

6. The storage medium according to claim 3, wherein the first tension is calculated by decreasing a component of a tension directed in a direction to the first connected object, the component regarding a second direction orthogonal to a first direction in the virtual three-dimensional space, and the second tension is calculated by decreasing a component, regarding the second direction, of a tension directed in a direction to the second connected object.

7. The storage medium according to claim 1, wherein a state of the first connection object is determined based on the first object and the second object, regardless of whether the first connection object comes into contact with another object in the virtual three-dimensional space.

8. The storage medium according to claim 1, wherein the game program causes the computer to execute generating the virtual space image by changing a display mode of the first connection object in accordance with a distance between the first object and the second object, and changing a display mode of the second connection object in accordance with a distance between the third object and the fourth object.

9. The storage medium according to claim 1, wherein the game program causes the computer to execute controlling the action of the first object, with the restriction regarding the movement of the first object being canceled while a cancellation condition regarding the first object is satisfied.

10. The storage medium according to claim 9, wherein the cancellation condition is that the first object is performing a first action.

11. The storage medium according to claim 10, wherein the game program causes the computer to execute:
controlling the action of the second object, with the restriction regarding the movement of the second object being canceled while the second object is performing a second action that is the same as or different from the first action; and
in a case where the first object is performing the first action and the second object is performing the second action, and if a direction of the first action and a direction of the second action satisfy a correction condition, correcting at least one of the direction of the first action and the direction of the second action.

12. The storage medium according to claim 1, wherein the game program causes the computer to execute causing a moving object regarding the first object to move from the first object toward the third object or the fourth object, in accordance with an operation performed by the user.

13. The storage medium according to claim 12, wherein a moving direction of the moving object that is moving is changed in accordance with an operation performed by the user while the moving object is moving.

14. The storage medium according to claim 12, wherein movement of the moving object is stopped in a case where, while the moving object is moving, the first object is caused to move in the virtual three-dimensional space by an action of the third object or the fourth object.

15. The storage medium according to claim 12, wherein the game program causes the computer to execute acquiring motion data indicating a motion of an input device, and
an action of the first object is controlled based on the motion data.

16. The storage medium according to claim 1, wherein the game program causes the computer to execute, in a case where the second object is caused to move in the virtual three-dimensional space by an action of the third object or the fourth object, causing the first object to move in conjunction with the movement of the second object so that a length of the first connection object maintains a predetermined state.

17. The storage medium according to claim 1, wherein the virtual camera is controlled so as to be directed in a direction from the first object to one of the third object and the fourth object.

18. The storage medium according to claim 17, wherein the virtual camera is controlled such that an object to which the virtual camera is directed is switched between the third object and the fourth object, in accordance with an operation performed by the user.

19. An information processing apparatus configured to perform game processing in which a first group including a first object and a second object operated by a user competes with a second group including a third object and a fourth object, the information processing apparatus comprising one or more processor configured to:
arrange, in a virtual three-dimensional space, the first object, the second object, the third object, the fourth object, a first connection object connecting the first object and the second object, and a second connection object connecting the third object and the fourth object;
control actions of the first object and the second object, with restriction being imposed on movements of the first object and the second object based on the first connection object, and control actions of the third object and the fourth object, with restriction being imposed on movements of the third object and the fourth object based on the second connection object;
control a virtual camera arranged in the virtual three-dimensional space such that at least one of the third object and the fourth object is included in a field-of-view range of the virtual camera;
generate a virtual space image acquired based on the virtual camera; and
cause a display to display the virtual space image.

20. An information processing system configured to perform game processing in which a first group including a first object and a second object operated by a user competes with a second group including a third object and a fourth object, the information processing system comprising one or more processor configured to:
arrange, in a virtual three-dimensional space, the first object, the second object, the third object, the fourth object, a first connection object connecting the first object and the second object, and a second connection object connecting the third object and the fourth object;
control actions of the first object and the second object, with restriction being imposed on movements of the first object and the second object based on the first connection object, and control actions of the third object and the fourth object, with restriction being imposed on movements of the third object and the fourth object based on the second connection object;
control a virtual camera arranged in the virtual three-dimensional space such that at least one of the third object and the fourth object is included in a field-of-view range of the virtual camera;
generate a virtual space image acquired based on the virtual camera; and
cause a display to display the virtual space image.

21. A game processing method executed in an information processing system configured to perform game processing in which a first group including a first object and a second object operated by a user competes with a second group including a third object and a fourth object, the information processing system being configured to:
arrange, in a virtual three-dimensional space, the first object, the second object, the third object, the fourth object, a first connection object connecting the first object and the second object, and a second connection object connecting the third object and the fourth object;

control actions of the first object and the second object, with restriction being imposed on movements of the first object and the second object based on the first connection object, and control actions of the third object and the fourth object, with restriction being imposed on movements of the third object and the fourth object based on the second connection object;

control a virtual camera arranged in the virtual three-dimensional space such that at least one of the third object and the fourth object is included in a field-of-view range of the virtual camera;

generate a virtual space image acquired based on the virtual camera; and cause a display to display the virtual space image.

* * * * *